US010411292B2

(12) United States Patent
Makino et al.

(10) Patent No.: US 10,411,292 B2
(45) Date of Patent: Sep. 10, 2019

(54) ALL SOLID STATE SECONDARY BATTERY, SOLID ELECTROLYTE COMPOSITION USED THEREFOR, ELECTRODE SHEET FOR BATTERY, AND METHOD FOR MANUFACTURING ELECTRODE SHEET FOR BATTERY AND ALL SOLID STATE SECONDARY BATTERY

(71) Applicant: FUJIFILM Corporation, Tokyo (JP)

(72) Inventors: Masaomi Makino, Kanagawa (JP); Hiroaki Mochizuki, Kanagawa (JP); Tomonori Mimura, Kanagawa (JP); Katsuhiko Meguro, Kanagawa (JP)

(73) Assignee: FUJIFILM Corporation, Tokyo (JP)

( * ) Notice: Subject to any disclaimer, the term of this patent is extended or adjusted under 35 U.S.C. 154(b) by 71 days.

(21) Appl. No.: 15/636,001

(22) Filed: Jun. 28, 2017

(65) Prior Publication Data

US 2017/0301947 A1 Oct. 19, 2017

Related U.S. Application Data

(63) Continuation of application No. PCT/JP2016/052822, filed on Jan. 29, 2016.

(30) Foreign Application Priority Data

Feb. 12, 2015 (JP) ................................ 2015-025075

(51) Int. Cl.
*H01M 10/056* (2010.01)
*C08F 38/02* (2006.01)
(Continued)

(52) U.S. Cl.
CPC ............. *H01M 10/056* (2013.01); *C08F 2/58* (2013.01); *C08F 38/02* (2013.01); *C08G 61/10* (2013.01);
(Continued)

(58) Field of Classification Search
CPC ........ H01M 4/13; H01M 4/139; H01M 4/505; H01M 4/525; H01M 4/587; H01M 4/62;
(Continued)

(56) References Cited

U.S. PATENT DOCUMENTS 5,011,501 A * 4/1991 Shackle .............. H01M 10/052 29/623.1
5,238,758 A * 8/1993 Lee ....................... H01M 6/181 429/311
(Continued)

FOREIGN PATENT DOCUMENTS

CN 1950968 A 4/2007
CN 101682031 A 3/2010
(Continued)

OTHER PUBLICATIONS

International Search Report for PCT/JP2016/052822 dated May 10, 2016.
(Continued)

*Primary Examiner* — Amanda C. Walke
(74) *Attorney, Agent, or Firm* — Sughrue Mion, PLLC

(57) ABSTRACT

Provided are an all solid state secondary battery having a positive electrode active material layer, an inorganic solid electrolyte layer, and a negative electrode active material layer in this order, in which at least one layer of the positive electrode active material layer, the inorganic solid electrolyte layer, or the negative electrode active material layer includes an electrolytic polymerizable compound and an inorganic solid electrolyte, in which the electrolytic polymerizable compound is an electrolytic polymerizable compound having a molecular weight of less than 1,000 which is represented by any one of Formulae (1) to (5) below, and the inorganic solid electrolyte contains a metal belonging to
(Continued)

Group I or II of the periodic table and has an ion conductivity of the metal being contained, an electrode sheet for a battery, and method for manufacturing an electrode sheet for a battery and an all solid state secondary battery.

(1)

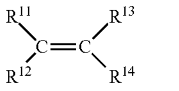

(2)

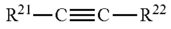

(3)

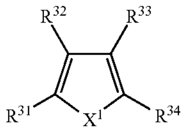

(4)

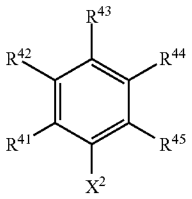

(5)

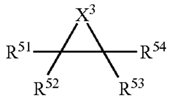

Reference signals each independently represent a specific atom, substituent, or linking group.

18 Claims, 1 Drawing Sheet

(51) Int. Cl.

| | |
|---|---|
| ***C08F 2/58*** | (2006.01) |
| ***C08G 61/10*** | (2006.01) |
| ***C08G 61/12*** | (2006.01) |
| ***C08G 73/00*** | (2006.01) |
| ***H01M 4/13*** | (2010.01) |
| ***H01M 4/139*** | (2010.01) |
| ***H01M 4/62*** | (2006.01) |
| ***H01M 10/0562*** | (2010.01) |
| ***H01M 4/505*** | (2010.01) |
| ***H01M 4/525*** | (2010.01) |
| ***H01M 4/587*** | (2010.01) |
| ***H01M 10/0525*** | (2010.01) |

(52) U.S. Cl.

CPC ............. *C08G 61/12* (2013.01); *C08G 73/00* (2013.01); *H01M 4/13* (2013.01); *H01M 4/139* (2013.01); *H01M 4/505* (2013.01); *H01M 4/525* (2013.01); *H01M 4/587* (2013.01); *H01M 4/62* (2013.01); *H01M 4/622* (2013.01); *H01M 4/624* (2013.01); *H01M 10/0525* (2013.01); *H01M 10/0562* (2013.01); *H01M 2300/0065* (2013.01); *H01M 2300/0071* (2013.01); *H01M 2300/0082* (2013.01); *H01M 2300/0091* (2013.01)

(58) Field of Classification Search

CPC .... H01M 4/622; H01M 4/624; H01M 10/056; H01M 10/0525; H01M 10/562; C08F 2/58; C08F 38/02; C08F 61/10

USPC .......................................................... 429/310

See application file for complete search history.

(56) References Cited

U.S. PATENT DOCUMENTS

| | | | | |
|---|---|---|---|---|
| 5,340,368 | A * | 8/1994 | Koksbang ............... | H01M 4/04 29/623.5 |
| 9,276,263 | B2 | 3/2016 | Yoshida et al. | |
| 2007/0040145 | A1 * | 2/2007 | Muramoto .......... | C08F 290/062 252/62.2 |
| 2014/0004257 | A1 | 1/2014 | Kubo et al. | |
| 2014/0127579 | A1 | 5/2014 | Yoshida et al. | |
| 2016/0093916 | A1 * | 3/2016 | Moon ................. | H01M 10/052 429/303 |
| 2017/0005367 | A1 * | 1/2017 | Van Berkel ....... | H01M 10/0565 |
| 2017/0110759 | A1 * | 4/2017 | Boeckmann ........ | H01M 10/052 |
| 2017/0301950 | A1 * | 10/2017 | Mimura ................... | H01B 1/08 |
| 2018/0076481 | A1 * | 3/2018 | Makino .................... | H01B 1/06 |

FOREIGN PATENT DOCUMENTS

| | | | |
|---|---|---|---|
| JP | 10-3943 | A | 1/1998 |
| JP | 2002-42876 | A | 2/2002 |
| JP | 3297595 | B2 | 7/2002 |
| JP | 2003-22839 | A | 1/2003 |
| JP | 2012-212652 | A | 11/2012 |
| JP | 2013-008611 | A | 1/2013 |
| JP | 2014-112485 | A | 6/2014 |
| JP | 5652344 | B2 | 1/2015 |
| KR | 10-1999-0086413 | A | 12/1999 |
| WO | 2012/173089 | A1 | 12/2012 |

OTHER PUBLICATIONS

Communication dated Sep. 13, 2018, issued by the Korean Intellectual Property Office in corresponding Korean Application No. 10-2017-7017754.

Communication dated Oct. 31, 2018 from the State Intellectual Property Office of the P.R.C. in counterpart Application No. 201680004182.7.

Communication dated Oct. 27, 2017, from European Patent Office in counterpart application No. 16749072.1.

* cited by examiner

ALL SOLID STATE SECONDARY BATTERY, SOLID ELECTROLYTE COMPOSITION USED THEREFOR, ELECTRODE SHEET FOR BATTERY, AND METHOD FOR MANUFACTURING ELECTRODE SHEET FOR BATTERY AND ALL SOLID STATE SECONDARY BATTERY

CROSS-REFERENCE TO RELATED APPLICATIONS

This application is a Continuation of PCT International Application No. PCT/JP2016/052822 filed on Jan. 29, 2016, which claims priority under 35 U.S.C. § 119 (a) to Japanese Patent Application No. JP2015-025075 filed in Japan on Feb. 12, 2015. Each of the above applications is hereby expressly incorporated by reference, in its entirety, into the present application.

BACKGROUND OF THE INVENTION

1. Field of the Invention

The present invention relates to an all solid state secondary battery, a solid electrolyte composition used therefor, an electrode sheet for a battery, and a method for manufacturing an electrode sheet for a battery and an all solid state secondary battery.

2. Description of the Related Art

For lithium ion batteries, electrolytic solutions have been used. Attempts are underway to produce all solid state secondary batteries in which all constituent materials are solid by replacing electrolytic solutions with solid electrolytes. Reliability in terms of all performances of batteries is an advantage of techniques of using inorganic solid electrolytes. For example, to electrolytic solutions being used for lithium ion secondary batteries, flammable materials such as carbonate-based solvents are applied as media. In spite of the employment of a variety of safety measures, there may be a concern that disadvantages may be caused during overcharging and the like and there is a demand for additional efforts. All solid state secondary batteries in which non-flammable electrolytes can be used are considered as a fundamental solution thereof.

Another advantage of all solid state secondary batteries is the suitability for increasing energy density by means of the stacking of electrodes. Specifically, it is possible to produce batteries having a structure in which electrodes and electrolytes are directly arranged in series. At this time, metal packages sealing battery cells and copper wires or bus-bars connecting battery cells may not be provided, and thus the energy density of batteries can be significantly increased. In addition, favorable compatibility with positive electrode materials capable of increasing potentials and the like can be considered as advantages.

From the viewpoint of the respective advantages described above, active development of next-generation lithium ion secondary batteries is underway (New Energy and Industrial Technology Development Organization (NEDO), Fuel Cell and Hydrogen Technologies Development Department, Electricity Storage Technology Development Section, "NEDO 2008 Roadmap for the Development of Next Generation Automotive Battery Technology" (June, 2009)). Meanwhile, in inorganic all solid state secondary batteries, since hard solid electrolytes are used, improvement is also required. For example, interface resistances increase among solid particles, between solid particles and agglomerates, and the like. In order to improve interface resistances, there are techniques of using acrylic binders, fluorine-containing binders, rubber binders such as butadiene, or the like (JP2012-212652A and the like).

SUMMARY OF THE INVENTION

Binders for which the polymer disclosed by JP2012-212652A is used are still not favorable enough to satisfy the continuously intensifying need for the improvement of the performance of lithium ion batteries, and there is a demand for additional improvement.

Therefore, an object of the present invention is to provide an all solid state secondary battery capable of realizing a high ion conductivity (high battery voltage) and high cycle characteristics, a solid electrolyte composition used therefor, an electrode sheet for a battery, and a method for manufacturing an electrode sheet for a battery and an all solid state secondary battery.

Regarding materials being combined with inorganic solid electrolytes, the present inventors repeated studies and experiments from a variety of aspects in consideration of the above-described object. As a result, it was found that, when an electrolytic polymerizable compound represented by any one of Formulae (1) to (5) below is used in combination with an inorganic solid electrolyte, it is possible to improve the moisture resistance of all solid state secondary batteries while maintaining a favorable ion conductivity and favorable cycle characteristics. The present invention was completed on the basis of this finding.

The object of the present invention was achieved by the following means.

(1) An all solid state secondary battery comprising a positive electrode active material layer; an inorganic solid electrolyte layer; and a negative electrode active material layer in this order, in which at least one layer of the positive electrode active material layer, the inorganic solid electrolyte layer, or the negative electrode active material layer includes an electrolytic polymerizable compound and an inorganic solid electrolyte, the electrolytic polymerizable compound is an electrolytic polymerizable compound having a molecular weight of less than 1,000 which is represented by any one of Formulae (1) to (5) below, and an inorganic solid electrolyte contains a metal belonging to Group I or II of the periodic table and has an ion conductivity of the metal being contained.

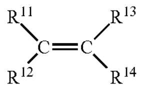

(1)

$$R^{21}—C\equiv C—R^{22}$$

(2)

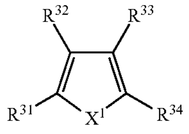

(3)

-continued (4)

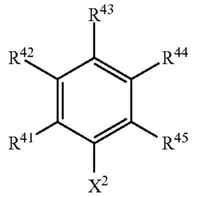

(5)

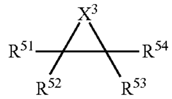

In Formulae (1) to (5), $R^{11}$ to $R^{14}$, $R^{21}$, $R^{22}$, $R^{31}$ to $R^{34}$, $R^{41}$ to $R^{45}$, and $R^{51}$ to $R^{54}$ each independently represent a hydrogen atom, an alkyl group, an alkenyl group, an alkynyl group, an aryl group, a heteroaryl group, an alkylcarbonyl group, an alkylcarbonyloxy group, an alkyloxycarbonyl group, a carbamoyl group, an acylamino group, an alkoxy group, a formyl group, an aryloxy group, a cyano group, a carboxyl group, a hydroxyl group, a mercapto group, an amino group, or a halogen atom. $X^1$ represents an oxygen atom, a sulfur atom, or $NR^{35}$. $R^{35}$ represents a hydrogen atom, an alkyl group, or an aryl group. $X^2$ represents $OR^{46}$, $SR^{47}$, or $NR^{48}R^{49}$, $R^{46}$ to $R^{49}$ each independently represent a hydrogen atom, an alkyl group, or an aryl group. $X^3$ represents a methylene group or an ethylene group.

$R^{11}$ and $R^{12}$, $R^{13}$ and $R^{14}$, $R^{11}$ and $R^{13}$, $R^{12}$ and $R^{14}$, $R^{21}$ and $R^{22}$, $R^{31}$ and $R^{32}$, $R^{32}$ and $R^{33}$, $R^{33}$ and $R^{34}$, $X^1$ and $R^{31}$, $X^1$ and $R^{34}$, $R^{41}$ and $R^{42}$, $R^{42}$ and $R^{43}$, $R^{43}$ and $R^{44}$, $R^{44}$ and $R^{45}$, $X^2$ and $R^{41}$, $X^2$ and $R^{45}$, and $X^3$ and $R^{51}$ may form a ring together through a single bond or a linking group. In addition, substituents of $R^{11}$ to $R^{14}$, $R^{21}$, $R^{22}$, $R^{31}$ to $R^{35}$, $R^{41}$ to $R^{49}$, and $R^{51}$ to $R^{54}$ may further have a substituent.

(2) The all solid state secondary battery according to (1), electrolytic compound is represented by any one of Formulae (1a) to (5a) below.

(1a)

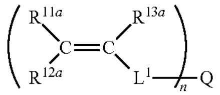

(2a)

$(R^{21a}-C\equiv C-L^1)_n-Q$ (3a)

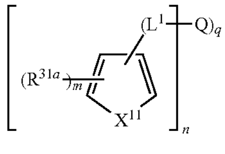

(4a)

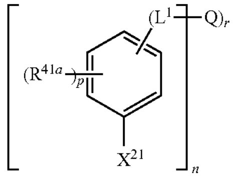

(5a)

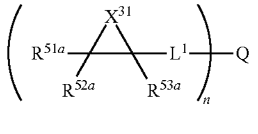

In Formulae (1a) to (5a), to $R^{11a}$ to $R^{13a}$, $R^{21a}$, $R^{31a}$, $R^{41a}$ and $R^{51a}$ to $R^{53a}$ each independently represent a hydrogen atom, an alkyl group, an alkenyl group, an alkynyl group, an aryl group, a heteroaryl group, an alkylcarbonyl group, an alkylcarbonyloxy group, an alkyloxycarbonyl group, a carbamoyl group, an acylamino group, an alkoxy group, a formyl group, an aryloxy group, a cyano group, a carboxyl group, a hydroxyl group, a mercapto group, an amino group, or a halogen atom. $X^{11}$ represents an oxygen atom, a sulfur atom, or $NR^{35a}$. $R^{35a}$ represents a hydrogen atom, an alkyl group, or $-L^1-Q$. $X^{21}$ represents $OR^{46a}$, $SR^{47a}$, or $N(R^{48a})(R^{49a})$. $R^{46a}$ to $R^{49a}$ each independently represent a hydrogen atom, an alkyl group, or $-L^1-Q$. $X^{31}$ represents a methylene group or an ethylene group. $R^{11a}$ and $R^{12a}$, $R^{11a}$ and $R^{13a}$, $X^{11}$ and $R^{31a}$, $X^{21}$ and $R^{41a}$, and $X^{31}$ and $R^{51a}$ may form a ring together through a single bond or a linking group. In a case in which there are a plurality of $R^{31a}$'s and $R^{41a}$'s, and $R^{31a}$'s and $R^{41a}$'s may form a ring together through a single bond or a linking group, $L^1$ represents a single bond or a divalent linking group, and Q represents a single bond or a di- to octavalent organic group. n represents an integer of 2 to 8, m represents an integer of 0 to 4, p represents an integer of 0 to 5, q represents 0 or 1, and r represents 0 or 1. Here, in the case of q=0, $X^{11}$ is $NR^{35a}$ and $R^{35a}$ is $-L^1-Q$, and, in the case of r=0, $R^{46a}$, $R^{47a}$, and $R^{48a}$ or $R^{49a}$ is $-L^1-Q$.

(3) The all solid state secondary battery according to (1), in which the electrolytic polymerizable compound represented by Formula (1) is a (meth)acrylic acid compound, a (meth)acrylamide compound, a styrene compound, or a vinyl compound, the electrolytic polymerizable compound represented by Formula (2) is an acetylene compound, the electrolytic polymerizable compound represented by Formula (3) is a thiophene compound, a furan compound, or a pyrrole compound, the electrolytic polymerizable compound represented by Formula (4) is an aniline compound, a thiophenol compound, or a phenol compound, and the electrolytic polymerizable compound represented by Formula (5) is a cyclopropane compound or a cyclobutane compound.

(4) The all solid state secondary battery according to (3), wherein the electrolytic polymerizable compound represented by Formulae (1) to (5) is an electrolytic polymerizable compound represented by Formulae (1a) to (5a).

(1a)

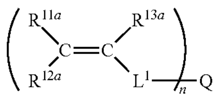

(2a)

$(R^{21a}-C\equiv C-L^1)_n-Q$ (3a)

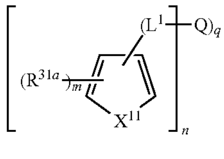

(4a)

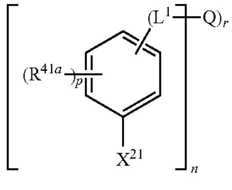

-continued (5a)

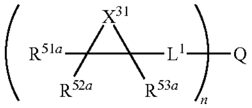

In Formulae (1a) to (5a), $R^{11a}$ to $R^{13a}$, $R^{21a}$, $R^{31a}$, $R^{41a}$ and $R^{51a}$ to $R^{53a}$ each independently represent a hydrogen atom, an alkyl group, an alkenyl group, an alkynyl group, an aryl group, a heteroaryl group, an alkylcarbonyl group, an alkylcarbonyloxy group, an alkyloxycarbonyl group, a carbamoyl group, an acylamino group, an alkoxy group, a formyl group, an aryloxy group, a cyano group, a carboxyl group, a hydroxyl group, a mercapto group, an amino group, or a halogen atom. $X^{11}$ represents an oxygen atom, a sulfur atom, or $NR^{35a}$. $R^{35a}$ represents a hydrogen atom, an alkyl group, or $-L^1$-Q. $X^{21}$ represents $OR^{46a}$, $SR^{47a}$, or $N(R^{48a})(R^{49a})$. $R^{46a}$ to $R^{49a}$ each independently represent a hydrogen atom, an alkyl group, or $-L^1$-Q. $X^{31}$ represents a methylene group or an ethylene group. $R^{11a}$ and $R^{12a}$, $R^{11a}$ and $R^{13a}$, $X^{11}$ and $R^{31a}$, $X^{21}$ and $R^{41a}$, and $X^{31}$ and $R^{51a}$ may form a ring together through a single bond or a linking group. In a case in which there are a plurality of and $R^{31a}$'s, and $R^{41a}$'s, and $R^{41a}$'s may form a ring together through a single bond or a linking group, $L^1$ represents a single bond or a divalent linking group, and Q represents a single bond or a di- to octavalent organic group, n represents an integer of 2 to 8, m represents an integer of 0 to 4, p represents an integer of 0 to 5, q represents 0 or 1, and r represents 0 or 1. Here, in the case of q=0, $X^{11}$ is $NR^{35a}$ and $R^{35a}$ is $-L^1$-Q, and, in the case of r=0, $R^{46a}$, $R^{47a}$, and $R^{48a}$ or $R^{49a}$ is $-L^1$-Q.

(5) The all solid state secondary battery according to any one of (1) to (4), in which a molecular weight of the electrolytic polymerizable compound is 300 or more and less than 1,000.

(6) The all solid state secondary battery according to any one of (1) to (5), in which a melting point of the electrolytic polymerizable compound at normal pressure is lower than 80° C., and a boiling point of the electrolytic polymerizable compound at normal pressure is 200° C. or higher.

(7) The all solid state secondary battery according to any one of (1) to (6), in which at least one layer of the positive electrode active material layer, the negative electrode active material layer, or the inorganic solid electrolyte layer further contains a polymerization initiator.

(8) The all solid state secondary battery according to (7), in which the polymerization initiator is an onium salt compound.

(9) The all solid state secondary battery according to any one of (1) to (8), in which at least one layer of the positive electrode active material layer, the negative electrode active material layer, or the inorganic solid electrolyte layer further contains a binder.

(10) The all solid state secondary battery according to any one of (1) to (9), in which the inorganic solid electrolyte is a sulfide-based inorganic solid electrolyte.

(11) The all solid state secondary battery according to any one of (1) to (9), in which the inorganic solid electrolyte is an oxide-based inorganic solid electrolyte.

(12) The all solid state secondary battery according to (11), in which the inorganic solid electrolyte is selected from compounds of the following formulae.

$Li_{xa}La_{ya}TiO_3$ xa=0.3 to 0.7, ya=0.3 to 0.7

$Li_7La_3Zr_2O_{12}$ $Li_{3.5}Zn_{0.25}GeO_4$ $LiTi_2P_3O_{12}$ $Li_{1+xb+yb}(Al,Ga)_{xb}(Ti,Ge)_{2-xb}Si_{yb}P_{3-yb}O_{12}$ $0 \leq xb \leq 1$, $0 \leq yb \leq 1$ $Li_3PO_4$ LiPON LiPOD D is at least one selected from Ti, V, Cr, Mn, Fe, Co, Ni, Cu, Zr, Nb, Mo, Ru, Ag, Ta, W, Pt, or Au.

LiAON

A is at least one selected form Si, B, Ge, Al, C, or Ga.

(13) A solid electrolyte composition being used for an all solid state secondary battery, comprising: an electrolytic polymerizable compound having a molecular weight of less than 1,000 which is represented by any one of Formulae (1) to (5) below; and an inorganic solid electrolyte containing a metal belonging to Group I or II of the periodic table and having an ion conductivity of the metal being contained.

(1)

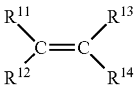

(2)

$R^{21}-C\equiv C-R^{22}$ (3)

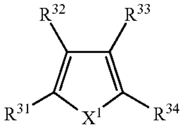

(4)

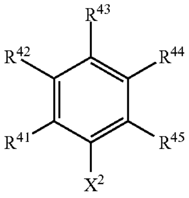

(5)

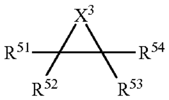

In Formulae (1) to (5), $R^{11}$ to $R^{14}$, $R^{21}$, $R^{22}$, $R^{31}$ to $R^{34}$, $R^{41}$ to $R^{45}$, and $R^{51}$ to $R^{54}$ each independently represent a hydrogen atom, an alkyl group, an alkenyl group, an alkynyl group, an aryl group, a heteroaryl group, an alkylcarbonyl group, an alkylcarbonyloxy group, an alkyloxycarbonyl group, a carbamoyl group, an acylamino group, an alkoxy group, a formyl group, an aryloxy group, a cyano group, a carboxyl group, a hydroxyl group, a mercapto group, an amino group, or a halogen atom. $X^1$ represents an oxygen atom, a sulfur atom, or $NR^{35}$. $R^{35}$ represents a hydrogen atom, an alkyl group, or an aryl group. $X^2$ represents $OR^{46}$, $SR^{47}$, or $NR^{48}R^{49}$. $R^{46}$ to $R^{49}$ each independently represent a hydrogen atom, an alkyl group, or an aryl group. $X^3$ represents a methylene group or an ethylene group.

$R^{11}$ and $R^{12}$, $R^{13}$ and $R^{14}$, $R^{11}$ and $R^{13}$, $R^{12}$ and $R^{14}$, $R^{21}$ and $R^{22}$, $R^{31}$ and $R^{32}$, $R^{32}$ and $R^{33}$, $R^{33}$ and $R^{34}$, $X^1$ and $R^{31}$, $X^1$ and $R^{34}$, $R^{41}$ and $R^{42}$, $R^{42}$ and $R^{43}$, $R^{43}$ and $R^{44}$, $R^{44}$ and $R^{45}$, $X^2$ and $R^{41}$, $X^2$ and $R^{45}$, and $X^3$ and $R^{51}$ may form a ring together through a single bond or a linking group. In addition, substituents of $R^{11}$ to $R^{14}$, $R^{21}$, $R^{22}$, $R^{31}$ to $R^{35}$, $R^{41}$ to $R^{49}$, and $R^{51}$ to $R^{54}$ may further have a substituent.

(14) The solid electrolyte composition according to (13), in which a content of the electrolytic polymerizable compound is 0.1 parts by mass or more and 20 parts by mass or less with respect to 100 parts by mass of the inorganic solid electrolyte.

(15) An electrode sheet for a battery, in which a film of the solid electrolyte composition according to (13) or (14) is formed on a metal foil.

(16) A method for manufacturing an electrode sheet for a battery, comprising: forming a film of the solid electrolyte composition according to (13) or (14) on a metal foil.

(17) A method for manufacturing an all solid state secondary battery, in which an all solid state secondary battery is manufactured using the electrode sheet for a battery according to (15).

(18) An all solid state secondary battery which is formed by means of electrolytic oxidation polymerization or electrolytic reduction polymerization of an electrolytic polymerizable compound by charging or discharging the all solid state secondary battery according to any one of (1) to (12) at least once.

In the present specification, numerical ranges expressed using "to" include numerical values before and after the "to" as the lower limit value and the upper limit value.

In the present specification, when a plurality of substituents or linking groups represented by specific symbols are present or a plurality of substituents or the like are simultaneously or selectively determined (similarly, the number of substituents is determined), the respective substituents and the like may be identical to or different from each other. In addition, when coming close to each other, a plurality of substituents or the like may be bonded or condensed to each other and form a ring.

In addition, regarding "(meth)" used to express (meth) acryloyl groups, (meth)acryl groups, or resins, for example, (meth)acryloyl groups are collective terms of acryloyl groups and methacryloyl groups and may be any one or both thereof.

Since "(poly)" may be considered as "poly" or "mono", a (poly)ester bond may be a single ester bond or a plurality of ester bonds.

In the present specification, regarding the determination of substituents, there are cases in which broader-concept groups and narrower-concept groups, for example, an alkyl group and a carboxyalkyl group or an alkyl group and an aralkyl group are listed. In this case, for example, in the relationship between "a carboxyalkyl group" and "an alkyl group", "the alkyl group" refers not to an unsubstituted alkyl group but to an alkyl group which may be substituted with a substituent other than "a carboxyl group". That is, among "alkyl groups", attention is paid particularly to "a carboxyalkyl group".

The all solid state secondary battery of the present invention exhibits an excellent ion conductivity (favorable battery voltage) and excellent cycle characteristics.

In addition, the solid electrolyte composition and the electrode sheet for a battery of the present invention enable the manufacturing of all solid state secondary batteries having the above-described excellent performance. In addition, according to the manufacturing method of the present invention, it is possible to efficiently manufacture the electrode sheet for a battery and the all solid state secondary battery of the present invention which has the above-described excellent performance.

The above-described and other characteristics and advantages of the present invention will be further clarified by the following description with appropriate reference to the accompanying drawings.

DESCRIPTION OF THE PREFERRED EMBODIMENTS

An all solid state secondary battery of the present invention is an all solid state secondary battery having a positive electrode active material layer; an inorganic solid electrolyte layer; and a negative electrode active material layer in this order, in which at least one layer of the positive electrode active material layer, the inorganic solid electrolyte layer, or the negative electrode active material layer has an electrolytic polymerizable compound which is represented by any one of Formulae (1) to (5) and capable of electrolytic oxidation polymerization or electrolytic reduction polymerization and an inorganic solid electrolyte.

Hereinafter, a preferred embodiment thereof will be described.

Figure 1:
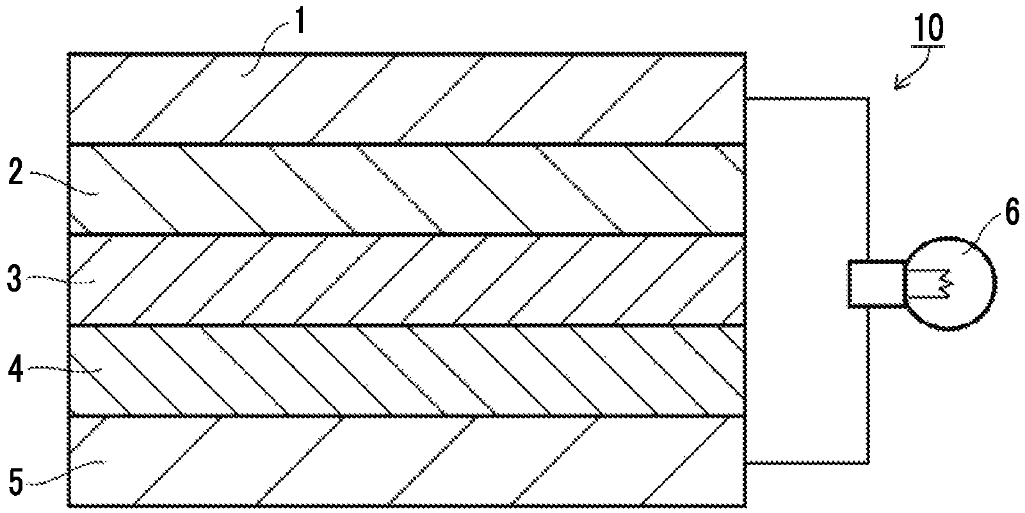
FIG. 1 is a schematic cross-sectional view illustrating an all solid state lithium ion secondary battery according to a preferred embodiment of the present invention.

FIG. 1 is a schematic cross-sectional view illustrating an all solid state secondary battery (lithium ion secondary battery) according to a preferred embodiment of the present invention. When described from the negative electrode side, an all solid state secondary battery 10 of the present embodiment has a negative electrode collector 1, a negative electrode active material layer 2, a solid electrolyte layer 3, a positive electrode active material layer 4, and a positive electrode collector 5. The respective layers have a structure in which the layers are in contact with each other and laminated together. Due to the above-described structure, during charging, electrons ($e^-$) are supplied to the negative electrode side, and lithium ions ($Li^+$) are accumulated on the negative electrode side. On the other hand, during discharging, the lithium ions ($Li^+$) accumulated on the negative electrode side return to the positive electrode, and electrons are supplied to an operation portion 6. In an example illustrated in the drawing, an electric bulb is exemplified as the operation portion 6 and is lighted by discharging. A solid electrolyte composition of the present invention is preferably used as a material used to form the negative electrode active material layer, the positive electrode active material layer, and the solid electrolyte layer and, among these, is preferably used to form the negative electrode active material layer or the positive electrode active material layer.

The thicknesses of the positive electrode active material layer 4, the solid electrolyte layer 3, and the negative electrode active material layer 2 are not particularly limited, but are preferably 1,000 μm or less, more preferably 1 to 1,000 μm, and still more preferably 3 to 400 μm in consideration of the dimensions of ordinary batteries.

Hereinafter, a solid electrolyte composition that can be preferably used to manufacture the all solid state secondary battery of the present invention will be described.

The solid electrolyte composition of the present invention has an electrolytic polymerizable compound having a molecular weight of less than 1,000 which is capable of electrolytic oxidation polymerization or electrolytic reduction polymerization and represented by any one of Formulae (1) to (5) below and an inorganic solid electrolyte.

The solid electrolyte composition of the present invention is preferably used for solid electrolytes in all solid state secondary batteries and more preferably used for inorganic solid electrolytes.

<Solid Electrolyte Composition>

(Inorganic Solid Electrolyte)

The inorganic solid electrolyte refers to a solid electrolyte made of an inorganic substance, and the solid electrolyte refers to a solid-form electrolyte capable of migrating ions therein. From this viewpoint, there are cases in which the inorganic solid electrolyte will be referred to as the ion-conductive inorganic solid electrolyte in consideration of distinction from lithium salts which are electrolyte salts described below (supporting electrolytes).

The inorganic solid electrolyte does not include organic substances (carbon atoms) and is thus clearly differentiated from organic solid electrolytes, high-molecular electrolytes represented by polyethylene oxide (PEO), and organic electrolyte salts represented by lithium bistrifluoromethanesulfonylimide (LiTFSI) and the like. In addition, the inorganic solid electrolyte is solid in a steady state and is thus not dissociated or liberated into cations and anions. Therefore, the inorganic solid electrolyte is also clearly differentiated from inorganic electrolyte salts that are disassociated or liberated into cations and anions in electrolytic solutions or polymers ($LiPF_6$, $LiBF_4$, LiFSI [lithium bis(fluorosulfonyl) imide], LiCl, and the like). The inorganic solid electrolyte is not particularly limited as long as the inorganic solid electrolyte includes a metal belonging to Group I or II of the periodic table and has a conductivity of these metal ions (preferably lithium ions) and generally does not have an electron conductivity.

The inorganic solid electrolyte being used in the present invention has a conductivity of ions of a metal belonging to Group I or II of the periodic table. As the inorganic solid electrolyte, it is possible to appropriately select and use solid electrolyte materials being applied to this kind of products. Typical examples of the inorganic solid electrolyte include (i) sulfide-based inorganic solid electrolytes and (ii) oxide-based inorganic solid electrolytes.

(i) Sulfide-Based Inorganic Solid Electrolytes

Sulfide-based inorganic solid electrolytes (hereinafter, also simply referred to as sulfide solid electrolytes) are preferably inorganic solid electrolytes which contain sulfur atoms (S), have an ion conductivity of metals belonging to Group I or II of the periodic table, and has electron-insulating properties. Examples thereof include lithium ion-conductive inorganic solid electrolytes satisfying a compositional formula represented by Formula (A) below.

$$Li_{a1}M_{b1}P_{c1}S_{d1} \quad \text{Formula (A)}$$

In Formula (A), represents an element selected from B, Zn, Si, Cu, Ga, and Ge. a1 to d1 represent the compositional ratios among the respective elements, and a1:b1:c1:d1 respectively satisfy 1 to 12:0 to 1:1:2 to 9.

Regarding the compositional ratios among Li, M, P, and S in Formula (A), it is preferable that b1 is zero, it is more preferable that b1 is zero and the compositional ratio (a1:c1:d1) of a1, c1, and d1 is 1 to 9:1:3 to 7, and it is still more preferable that b1 is zero and a1:c1:d1 is 1.5 to 4:1:3.25 to 4.5. The compositional ratios among the respective elements can be controlled by adjusting the amounts of raw material compounds blended during the manufacturing of the sulfide-based solid electrolyte.

The sulfide-based solid electrolyte may be non-crystalline (glass) or crystallized (made into glass ceramic) or may be only partially crystallized.

The ratio between $Li_2S$ and $P_2S_5$ in Li—P—S-based glass and Li—P—S-based glass ceramic is preferably 65:35 to 85:15 and more preferably 68:32 to 75:25 in terms of the molar ratio between $Li_2S$:$P_2S_5$. When the ratio between $Li_2S$ and $P_2S_5$ is set in the above-described range, it is possible to increase the lithium ion conductivity. Specifically, the lithium ion conductivity can be preferably set to $1\times10^{-2}$ S/m or more and more preferably set to 0.1 S/m or more.

Specific examples of the compound include compounds formed using a raw material composition containing, for example, $Li_2S$ and a sulfide of an element of Groups XIII to XV.

More specific examples thereof include $Li_2S$—$P_2S_5$, $Li_2S$—$GeS_2$, $Li_2S$—$GeS_2$—ZnS, $Li_2S$—$Ga_2S_3$, $Li_2S$—$GeS_2$—$Ga_2S_3$, $Li_2S$—$GeS_2$—$P_2S_5$, $Li_2S$—$GeS_2$—$Sb_2S_5$, $Li_2S$—$GeS_2$—$Al_2S_3$, $Li_2S$—$SiS_2$, $Li_2S$—$Al_2S_3$, $Li_2S$—$SiS_2$—$Al_2S_3$, $Li_2S$—$SiS_2$—$P_2S_5$, $Li_2S$—$SiS_2$—LiI, $Li_2S$—$SiS_2$—$Li_4SiO_4$, $Li_2S$—$SiS_2$—$Li_3PO_4$, and $Li_{10}GeP_2S_{12}$. Among these, crystalline and/or amorphous raw material compositions made of $Li_2S$—$P_2S_5$, $Li_2S$—$GeS_2$—$Ga_2S_3$, $Li_2S$—$GeS_2$—$P_2S_5$, $Li_2S$—$SiS_2$—$P_2S_5$, $Li_2S$—$SiS_2$—$Li_4SiO_4$, or $Li_2S$—$SiS_2$—$Li_3PO_4$ are preferred due to their high lithium ion conductivity.

Examples of a method for synthesizing sulfide solid electrolyte materials using the above-described raw material compositions include an amorphorization method. Examples of the amorphorization method include a mechanical milling method and a melting quenching method. Among these, the mechanical milling method is preferred since treatments at normal temperature become possible, and it is possible to simplify manufacturing steps.

The sulfide solid electrolyte can be synthesized with reference to, for example, non-patent documents such as T. Ohtomo, A. Hayashi, M. Tatsumisago, Y. Tsuchida, S. Hama, K. Kawamoto, Journal of Powder Sources, 233, (2013), pp. 231 to 235 and A. Hayashi, S. Hama, H. Morimoto, M. Tatsumisago, T. Minami, Chem. Lett, (2001), pp. 872 and 873.

(ii) Oxide-Based Inorganic Solid Electrolytes

Oxide-based inorganic solid electrolytes (hereinafter, also simply referred to as oxide-based solid electrolytes) are preferably inorganic solid electrolytes which contain oxygen atoms (O), include a metal belonging to Group I or II of the periodic table, has an ion conductivity, and has electron-insulating properties.

Specific examples thereof include $Li_{xa}La_{ya}TiO_3$ [xa=0.3 to 0.7 and ya=0.3 to 0.7](LET), $Li_7La_3Zr_2O_{12}$ (LLZ, lithium lanthanum zirconate), $Li_{3.5}Zn_{0.25}GeO_4$ having a lithium super ionic conductor (LISICON)-type crystal structure, $LiTi_2P_3O_{12}$ having a natrium super ionic conductor (NASICON)-type crystal structure, $Li_{1+xb+yb}(Al, Ga)_{xb}(Ti, Ge)_{2-xb}Si_{yb}P_{3-yb}O_{12}$ (here, $0\le xb\le 1$ and $0\le yb\le 1$), $Li_7La_3Zr_2O_{12}$ having a garnet-type crystal structure.

In addition, phosphorus compounds including Li, P, and O are also preferred. Examples thereof include lithium phosphate ($LI_3PO_4$), LiPON in which part of oxygen atoms in lithium phosphate are substituted with nitrogen atoms, and LiPOD (D represents at least one element selected from Ti, V, Cr, Mn, Fe, Co, Ni, Cu, Zr, Nb, Mo, Ru, Ag, Ta, W, Pt, Au, or the like). In addition, LiAON (A represents at least one selected from Si, B, Ge, Al, C, Ga, or the like) and the like can also be preferably used.

Among these, $Li_{1+xb+yb}(Al, Ga)_{xb}(Ti, Ge)_{2-xb}Si_{yb}P_{3-yb}O_{12}$ (here, $0 \leq xb \leq 1$ and $0 \leq yb \leq 1$) is preferred since $Li_{1+xb+yb}(Al, Ga)_{xb}(Ti, Ge)_{2-xb}Si_{yb}P_{3-yb}O_{12}$ has a high lithium ion conductivity, is chemically stable, and can be easily handled. These compounds may be used singly or two or more compounds may be used in combination.

The lithium ion conductivity of the oxide-based solid electrolyte is preferably $1\times10^{-4}$ S/m or more, more preferably $1\times10^{-3}$ S/m or more, and still more preferably $5\times10^{-3}$ S/m or more.

The average particle diameter of the inorganic solid electrolyte is not particularly limited, but is preferably 0.01 μm or more and more preferably 0.1 μm or more. The upper limit is preferably 100 μm or less and more preferably 50 μm or less. The average particle diameter of the inorganic solid electrolyte is measured using a method described in the section of examples described below.

When the satisfaction of both of the battery performance and an effect of reducing or maintaining the interface resistance is taken into account, the concentration of the inorganic solid electrolyte in the solid electrolyte composition is preferably 50% by mass or more, more preferably 80% by mass or more, and still more preferably 90% by mass or more with respect to 100% by mass of the solid component. From the same viewpoint, the upper limit is preferably 99.9% by mass or less, more preferably 99% by mass or less, and still more preferably 98% by mass or less.

Meanwhile, in the present specification, the solid content refers to a component that does not volatilize or evaporate and thus disappear when dried at 170° C. for six hours, and typically, refers to a component other than dispersion media described below.

(Electrolytic Polymerizable Compound)

The electrolytic polymerizable compound being used in the present invention is a compound having a molecular weight of less than 1,000 which is capable of electrolytic oxidation polymerization or electrolytic reduction polymerization and represented by any one of Formulae (1) to (5) below. Here, the electrolytic polymerizable compound is not a radical compound.

Here, the electrolytic polymerizable compound is a compound that is electrolytic-oxidation-polymerized or electrolytic-reduction-polymerized during the charging and discharging of the all solid state secondary battery and preferably a compound in which, during the charging and discharging of the all solid state secondary battery, reduction polymerization is initiated from a charging and discharging potential ($Li/Li^+$-based) of 1.5 V or more and a polymerized body is generated in the negative electrode active material layer or a compound in which, during the charging and discharging of the all solid state secondary battery, oxidation polymerization is initiated from a charging and discharging potential ($Li/Li^+$-based) of less than 4.5 V and a polymerized body is generated in the positive electrode active material layer.

Specifically, an electrode sheet for a secondary battery or an all solid state secondary battery is produced by replacing the electrolytic polymerizable compound A-1 or A-2 of the present invention being contained in the positive electrode layer, the solid electrolyte layer, and the negative electrode layer in the electrode sheet for a secondary battery or the all solid state secondary battery of Test No. 101 of an example described below with a compound that needs to be checked, the electrode sheet for a secondary battery or the all solid state secondary battery is charged once or discharged once, then, the positive electrode layer, the solid electrolyte layer, and the negative electrode layer are removed from the all solid state secondary battery, the cure degrees of the respective layers are measured, and the cure degrees are compared with the cure degrees before charging or discharging or instrumental analyses such as $^{1}H$-NMR or $^{13}C$-NMR are carried out, whereby the electrolytic polymerizable compound can be confirmed.

In the present invention, it is confirmed that the electrolytic polymerizable compound used in the electrode sheets for a secondary battery or the all solid state secondary batteries of Test Nos. 101 to 110 produced in examples described below are all electrolytic-polymerized.

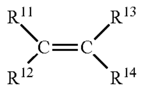

(1)

$R^{21}—C\equiv C—R^{22}$ (2)

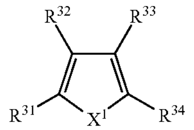

(3)

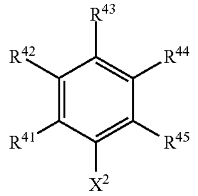

(4)

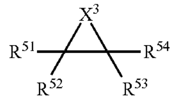

(5)

In Formulae (1) to (5), $R^{11}$ to $R^{14}$, $R^{21}$, $R^{22}$, $R^{31}$ to $R^{34}$, $R^{41}$ to $R^{45}$, and $R^{51}$ to $R^{54}$ each independently represent a hydrogen atom, an alkyl group, an alkenyl group, an alkynyl group, an aryl group, a heteroaryl group, an alkylcarbonyl group, an alkylcarbonyloxy group, an alkyloxycarbonyl group, a carbamoyl group, an acylamino group, an alkoxy group, a formyl group, an aryloxy group, a cyano group, a carboxyl group, a hydroxyl group, a mercapto group, an amino group, or a halogen atom. $X^1$ represents an oxygen atom, a sulfur atom, or $NR^{35}$. $R^{35}$ represents a hydrogen atom, an alkyl group, or an aryl group. $X^2$ represents $OR^{46}$, $SR^{47}$, or $NR^{48}R^{49}$. $R^{46}$ to $R^{49}$ each independently represent a hydrogen atom, an alkyl group, or an aryl group. $X^3$ represents a methylene group or an ethylene group.

$R^{11}$ and $R^{12}$, $R^{13}$ and $R^{14}$, $R^{11}$ and $R^{13}$, $R^{12}$ and $R^{14}$, $R^{21}$ and $R^{22}$, $R^{31}$ and $R^{32}$, $R^{32}$ and $R^{33}$, $R^{33}$ and $R^{34}$, $X^1$ and $R^{31}$, $X^1$ and $R^{34}$, $R^{41}$ and $R^{42}$, $R^{42}$ and $R^{43}$, $R^{43}$ and $R^{44}$, $R^{44}$ and $R^{45}$, $X^2$ and $R^{41}$, $X^2$ and $R^{45}$, and $X^3$ and $R^{51}$ may form a ring together through a single bond or a linking group. In addition, substituents of $R^{11}$ to $R^{14}$, $R^{21}$, $R^{22}$, $R^{31}$ to $R^{35}$, $R^{41}$ to $R^{49}$, and $R^{51}$ to $R^{54}$ may further have a substituent.

The substituent that the substituents of $R^{11}$ to $R^{14}$, $R^{21}$, $R^{22}$, $R^{31}$ to $R^{35}$, $R^{41}$ to $R^{49}$, and $R^{51}$ to $R^{54}$ may have refers to a substituent in which one hydrogen atom in the substituent is replaced with a polyvalent linking group which may contain a single bond or a hetero atom and the compound represented by any one of Formula (1) to (5) is bonded thereto.

In addition, the substituent may be a substituent having a substituent T described below.

The substituents of $R^{11}$ to $R^{14}$, $R^{21}$, $R^{22}$, $R^{31}$ to $R^{34}$, $R^{41}$ to $R^{45}$, and $R^{51}$ to $R^{54}$ will be described below.

The number of carbon atoms in the alkyl group is preferably 1 to 30, more preferably 1 to 25, and still more preferably 1 to 20. Specific examples thereof include methyl, ethyl, propyl, isopropyl, butyl, t-butyl, octyl, dodecyl, and stearyl.

Meanwhile, examples of an alkyl group substituted with the substituent T described below include carboxy-substituted alkyl groups (8-carboxyoctyl and the like) and halogenated alkyl groups (the halogen atom substituting the hydrogen atom is preferably a fluorine atom, for example, trifluoromethyl).

The number of carbon atoms in the alkenyl group is preferably 2 to 30, more preferably 2 to 25, and still more preferably 2 to 20. Specific examples thereof include vinyl, allyl, oleyl, 1,3-dibutenyl, styryl, and linoleyl.

The number of carbon atoms in the alkynyl group is preferably 2 to 30, more preferably 2 to 25, and still more preferably 2 to 20. Specific examples thereof include ethynyl, butadiynyl, phenylethynyl, and 2-pyridinylethynyl.

The number of carbon atoms in the aryl group is preferably 6 to 30, more preferably 6 to 20, and still more preferably 6 to 14. Specific examples thereof include phenyl, 1-naphthyl, tolyl, xylyl, anthracenyl and pyrenyl.

Meanwhile, examples of an aryl group substituted with the substituent described below include alkoxyaryl groups (4-methoxyphenyl and the like) and halogenated aryl groups (the halogen atom substituting the hydrogen atom is preferably a fluorine atom, for example, 2,4,6-trifluorophenyl).

The heteroaryl group is preferably a five-membered ring or six-membered ring having at least one oxygen atom, sulfur atom, or nitrogen atom as the ring-constituting atom, and the number of carbon atoms is preferably 1 to 10. Specific examples of heteroaryl rings include pyrrole, pyridine, furan, pyran, and thiophene. In addition, the heteroaryl ring may be condensed with a benzene ring or a hetero ring.

The number of carbon atoms in the alkylcarbonyl group is preferably 2 to 30, more preferably 2 to 25, and still more preferably 2 to 20. Specific examples thereof include acetyl and propionyl.

The number of carbon atoms in the alkylcarbonyl group is preferably 2 to 30, more preferably 2 to 25, and still more preferably 2 to 20. Specific examples thereof include acetoxy.

The number of carbon atoms in the alkyloxycarbonyloxy group is preferably 2 to 30, more preferably 2 to 25, and still more preferably 2 to 20. Specific examples thereof include methoxycarbonyl and butoxycarbonyl.

The number of carbon atoms in the carbamoyl group is preferably 1 to 20, more preferably 1 to 12, and still more preferably 1 to 8. Specific examples thereof include carbamoyl, N-ethylcarbamoyl, N,N-dimethylcarbamoyl, and N-phenylcarbamoyl.

The number of carbon atoms in the acylamino group is preferably 1 to 20, more preferably 1 to 12, and still more preferably 1 to 8. Specific examples thereof include formylamino, acetylamine, acryloylamino, methacryloylamino, benzoylamino, and nicotinoylamino.

The number of carbon atoms in the alkoxy group is preferably 1 to 20, more preferably 1 to 12 and still more preferably 1 to 8. Specific examples thereof include methoxy, ethoxy, isopropyloxy, and benzyloxy.

The number of carbon atoms in the aryloxy group is preferably 6 to 20, more preferably 6 to 12, and still more preferably 6 to 10. Specific examples thereof include phenoxy, 1-naphthyloxy, 3-methylphenoxy, and 4-methoxyphenoxy.

The number of carbon atoms in the amino group is preferably 0 to 10, more preferably 0 to 8, and still more preferably 0 to 6. Specific examples thereof include an alkylamino group, an alkenylamino group, an alkynylamino group, an arylamino group, and a heterocyclic amino group, and include, for example, amino, N,N-dimethylamino, N,N-diethylamino, N-ethylamino, N-allylamino, N-ethynylamino, anilino, and 4-pyridylamino.

Examples of the halogen atom include a fluorine atom, a chlorine atom, a bromine atom, and an iodine atom, and a fluorine atom is preferred.

$R^{11}$ to $R^{14}$ are preferably a hydrogen atom, an alkyl group, an alkenyl group, a halogenated alkyl group, an aryl group, a halogenated aryl group, an alkylcarbonyl group, an alkylcarbonyloxy group, an alkyloxycarbonyl group, an alkoxy group, an aryloxy group, a carboxyl group, a cyano group, a hydroxyl group, a mercapto group, an amino group, or a halogen atom and more preferably a hydrogen atom, an alkyl group, a halogenated alkyl group, an alkylcarbonyloxy group, an alkyloxycarbonyl group, an alkoxy group, a carboxyl group, a cyano group or a halogen atom.

$R^{21}$ to $R^{22}$ are preferably a hydrogen atom, an alkyl group, a halogenated alkyl group, an aryl group, an alkylcarbonyl group, an alkyloxycarbonyl group, a carboxyl group, a cyano group or a halogen atom and more preferably a hydrogen atom, an alkyl group, a halogenated alkyl group, an alkyloxycarbonyl group, a carboxyl group, a cyano group, or a halogen atom.

$R^{31}$ to $R^{34}$ are preferably a hydrogen atom, an alkyl group, an aryl group, a heteroaryl group, or a halogen atom and more preferably a hydrogen atom or an alkyl group.

$R^{41}$ to $R^{45}$ are preferably a hydrogen atom, an alkyl group, an aryl group, an alkoxy group, a hydroxyl group, an amino group, or a halogen atom and more preferably a hydrogen atom, an alkyl group, a hydroxyl group, or an amino group.

$R^{51}$ to $R^{54}$ are preferably a hydrogen atom, an alkyl group, an aryl group, or a halogen atom and more preferably a hydrogen atom, an alkyl group, or a halogen atom.

The number of carbon atoms in the alkyl group as $R^{35}$ is preferably 1 to 20, more preferably 1 to 15, and still more preferably 1 to 12. Specific examples thereof include benzyl, dodecyl, and stearyl.

The number of carbon atoms in the aryl group is preferably 6 to 20, more preferably 6 to 18, and still more preferably 6 to 12. Specific examples thereof include phenyl, naphthyl, anthracenyl, pyrenyl.

$R^{35}$ is preferably methyl, ethyl, butyl, hexyl, octyl, dodecyl, stearyl, or benzyl, more preferably octyl, dodecyl, stearyl, or benzyl, and still more preferably benzyl or dodecyl.

X1 is preferably a sulfur atom or $NR^{35}$ ($R^{35}$ is preferably a hydrogen atom or an alkyl group) and more preferably a sulfur atom.

The number of carbon atoms in the alkyl group as $R^{46}$ to $R^{49}$ is preferably 1 to 20, more preferably 1 to 12, and still more preferably 1 to 8, and specific examples thereof include benzyl, methyl, ethyl, and octyl.

The number of carbon atoms in the aryl group is preferably 6 to 20, more preferably 6 to 18, and still more preferably 6 to 12, and specific examples thereof include phenyl, naphthyl, anthracenyl, and pyrenyl.

$R^{46}$ to $R^{49}$ are preferably a hydrogen atom an alkyl group, or an aryl group, more preferably a hydrogen atom or an alkyl group, and still more preferably a hydrogen atom.

$X^2$ is preferably OH, SH, or $NH_2$ and more preferably $NH_2$.

Rings formed by bonding $R^{11}$ and $R^{12}$, $R^{13}$ and $R^{14}$, $R^{11}$ and $R^{13}$, $R^{12}$ and $R^{14}$, $R^{21}$ and $R^{22}$, $R^{31}$ and $R^{32}$, $R^{32}$ and $R^{33}$, $R^{33}$ and $R^{34}$, $X^1$ and $R^{31}$, $X^1$ and $R^{34}$, $R^{41}$ and $R^{42}$, $R^{42}$ and $R^{43}$, $R^{43}$ and $R^{44}$, $R^{44}$ and $R^{45}$, $X^2$ and $R^{41}$. $X^2$ and $R^{45}$, or $X^3$ and $R^{51}$ are five-membered rings or six-membered rings which may contain a hetero atom, examples thereof include a benzene ring, a cyclohexane ring, a cyclohexanone ring, a cyclopentane ring, a cyclopentanone ring, a tetrahydrofuran ring, a tetrahydropyran ring, a tetrahydropyrene ring, and an ethylene carbonate ring, an ethylene carbonate ring, a benzene ring, and a cyclohexane ring are preferred, and a benzene ring and a cyclohexane ring are more preferred.

Examples of the linking group used in a case in which the ring is formed include linking groups L described below, and divalent organic groups, particularly, an alkylene group and a carbonyl group are preferred.

Meanwhile, when the ring is formed, the ring is preferably formed through a single bond.

The electrolytic polymerizable compound being used in the present invention is more preferably represented by any one of Formula (1a) to (5a) below since the crosslinking point increases, and strong bonding properties between the active material and the inorganic solid electrolyte are imparted to the all solid state secondary battery.

(1a)

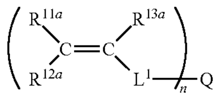

(2a)

$(R^{21a}-C\equiv C-L^1)_n-Q$ (3a)

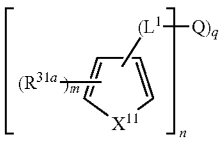

(4a)

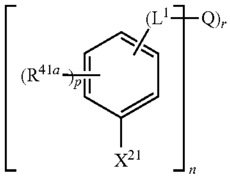

(5a)

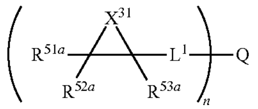

In Formulae (1a) to (5a), $R^{11a}$ to $R^{13a}$, $R^{21a}$, $R^{31a}$, $R^{41a}$ and $R^{51a}$ to $R^{53a}$ each independently represent a hydrogen atom, an alkylgroup, an alkenyl group, an alkynyl group, an aryl group, a heteroaryl group, an alkylcarbonyl group, an alkylcarbonyloxy group, an alkyloxycarbonyl group, a carbamoyl group, an acylamino group, an alkoxy group, a formyl group, an aryloxy group, a cyano group, a carboxyl group, a hydroxyl group, a mercapto group, an amino group, or a halogen atom. $X^{11}$ represents an oxygen atom, a sulfur atom, or $NR^{35a}$. $R^{35a}$ represents a hydrogen atom, an alkyl group, an aryl group, or $-L^1-Q$. $X^{21}$ represents $OR^{46a}$, $SR^{47a}$, $N(R^{48a})(R^{49a})$. $R^{46a}$ to $R^{49a}$ each independently represent a hydrogen atom, an alkyl group, an aryl group, or $-L^1-Q$. $X^{31}$ represents a methylene group or an ethylene group. $R^{11a}$ and $R^{12a}$, $R^{11a}$ and $R^{13a}$, $X^{11}$ and $R^{31a}$, $X^{21}$ and $R^{41a}$, and $X^{31}$ and $R^{51a}$ may form a ring together through a single bond or a linking group. In a case in which there are a plurality of $R^{31a}$'s and $R^{41a}$'s, $R^{31a}$'s and $R^{41a}$'s may form a ring together through a single bond or a linking group. $L^1$ represents a single bond or a divalent linking group, and Q represents a single bond or a di- to octavalent organic group. n represents an integer of 2 to 8, m represents an integer of 0 to 4, p represents an integer of 0 to 5, q represents 0 or 1, and r represents 0 or 1. Here, in the case of q=0, $X^{11}$ is $NR^{35a}$ and $R^{35a}$ is $-L^1-Q$, and, in the case of r=0, $R^{46a}$, $R^{47a}$, and $R^{48a}$ or $R^{49a}$ is $-L^1-Q$.

Meanwhile, $-L^1-Q$ as $R^{35a}$ and $R^{46a}$ to $R^{49a}$ is, similar to $-L^1-Q$ described in Formulae (3a) and (4a), bonded to a structure represented by an n-attached large parenthesis [ ] through Q. For example, in a case in which $X^{11}$ is $N(-L^1-Q)$ in Formula (3a), the electrolytic polymerizable compound may have the following structure.

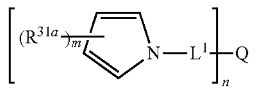

In the structure, $R^{31a}$, $L^1$, Q, n, and m are the same as $R^{31a}$, $L^1$, Q, n, and m in Formula (3a).

The substituents of $R^{11a}$ to $R^{13a}$, $R^{21a}$, $R^{31a}$, $R^{41a}$, and $R^{51a}$ to $R^{53a}$ are the same as $R^{11}$ to $R^{14}$, $R^{21}$, $R^{22}$, $R^{31}$ to $R^{34}$, $R^{41}$ to $R^{45}$, and $R^{51}$ to $R^{54}$ in Formulae (1) to (5), and preferred ranges thereof are also identical.

The alkyl group and the aryl group as $R^{35a}$ and $R^{46a}$ to $R^{49a}$ are the same as $R^{35}$ and $R^{46}$ to $R^{49}$ in Formulae (1) to (5), and preferred ranges thereof are also identical.

$X^{11}$ to $X^{31}$ are the same as $X^1$ to $X^3$ in Formulae (3) to (5), and preferred ranges thereof are also identical.

Examples of the divalent linking group as $L^1$ include linking groups L described below, an alkyleneoxy group, an alkylenecarbonyl group, an alkyleneoxy carbonyl group, an alkylene carbamido group, an alkylene group, or an arylene group are preferred, and an alkylene group or an arylene group is more preferred.

$L^1$ is, among these, preferably a single bond or an alkylene group, the alkylene group is preferably an alkylene group having 1 to 5 carbon atoms, and a methylene group, an ethylene group, and a trimethylene group are more preferred.

Q is preferably a di- to octavalent organic group and more preferably a tri- to hexavalent organic group.

The organic group as Q is preferably a residue obtained by removing one or more hydrogen atoms from an alkyl group having 1 to 12 carbon atoms (preferably methyl, propyl, isopropyl, butyl, t-butyl, or octyl), a halogenated alkyl group having 1 to 12 carbon atoms (the halogen atom is preferably a fluorine atom, preferably, difluoromethyl, 3,3,3-trifluoropropyl, or 1,1,1,3,3,3-hexafluoro-2-propyl), an aryl group having 6 to 12 carbon atoms (preferably phenyl or naphthyl), a heteroaryl group having 1 to 20 carbon atoms (preferably a heteroaryl group of a five or six-membered ring having at least one oxygen atom, sulfur atom, or nitrogen atom as the ring-constituting atom; specifically, the heteroaryl ring may be condensed with a benzene ring or a hetero ring), an aralkyl group having from 7 to 12 carbon atoms (preferably benzyl or phenethyl an alkoxy group having 1 to 20 carbon atoms (preferably methoxy, ethoxy, isopropyloxy, or benzyloxy), an acyl group having 1 to 10 carbon atoms (preferably formyl, acetyl, pivaloyl, acryloyl, methacryloyl, benzoyl, or nicotinoyl), an alkylsulfonyl group having 1 to 12 carbon atoms (preferably methanesulfonyl, ethanesulfonyl, trifluoromethanesulfonyl, or nonafluorobutanesulfonyl), an arylsulfonyl group having 6 to 12 carbon atoms (preferably benzenesulfonyl or toluenesulfonyl), an alkoxycarbonyl group having 2 to 10 carbon atoms (preferably methoxycarbonyl, ethoxycarbonyl, or benzyloxycarbonyl), an aryloxycarbonyl group having 7 to 13 carbon atoms (preferably phenoxycarbonyl), or an alkenyl group having 2 to 12 carbon atoms (preferably aryl) or a combination of these residues.

The combination of these residues is preferably a combined structure of an alkyl group; and an aryl group, a combined structure of an alkyl group and an alkoxy group, a combined structure of an aryl group and an alkoxy group, or a combined structure of an alkyl group, an aryl group, and an alkoxy group and more preferably a combined structure of an alkyl group; and an aryl group.

$X^{11}$ is preferably a sulfur atom or $NR^{35a}$ ($R^{35a}$ is preferably a hydrogen atom or an alkyl group) and more preferably a sulfur atom.

$X^{21}$ is preferably OH, SH, or $NH_2$ and more preferably $NH_2$.

Preferred examples of the rings formed by bonding $R^{11a}$ and $R^{12a}$, $R^{11a}$ and $R^{13a}$, $X^{11}$ and $R^{31a}$, and $X^{21}$ and $R^{41a}$ include phenyl.

Preferred examples of the rings formed by bonding a plurality of $R^{31a}$'s and $R^{41a}$'s together include benzene rings.

n is preferably an integer of 2 to 6.

m is preferably an integer of 0 to 1, and p is preferably an integer of 0 to 2.

As Q, it is possible to use a polyvalent linking group having a mother nucleus structure $Q^1$ illustrated below. Meanwhile, the present invention is not limited to the polyvalent linking group having the mother nucleus structure $Q^1$ illustrated below.

Here, Y in the following structure represents a linking portion (a portion included in Q and bonded to $L^1$) for the linkage with the linking group $L^1$ in Formulae (1a) to (5a) and represents a divalent linking group including a single bond or a hetero atom.

Examples of the divalent linking group including a hetero atom include —O—, —$NR^N$—, —S—, —SO—, —$SO_2$—, —C(═O)—, —C(═O)—O—, —O—C(═O)—, —O—C(═O)—O—, —C(═S)—, —C(═O)—S—, —S—C(═O)—, —C(═S)—S—, —S—C(═S)—, —C(═O)—$NR^N$—, —O—C(═O)—$NR^N$—, —$NR^N$—C(═O)—O—, —$NR^N$—C(═O)—, —$NR^N$—C(═O)—$NR^N$—, —$SO_2$—$NR^N$—, and —$NR^N$—$SO_2$—. Here, $R^N$ represents hydrogen atom or a substituent.

Meanwhile, a plurality of Y's may be identical to or different from each other, but are preferably identical to each other.

Y is preferably a single bond, —O—, —S—, —O—C(═O)—, or —C(═O)—O— and more preferably a single bond, —O—, —S—, —O—C(═O)—[$Q^1$-O—C(═O)—].

In addition, a to f in the compound represent the number of repetition of the structure in the parenthesis and are respectively an arbitrary integer of 0 or more.

(Q-1)

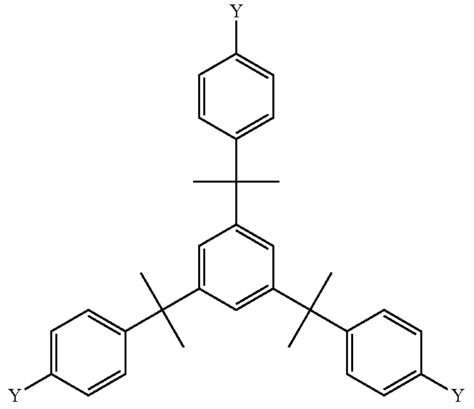

(Q-2)

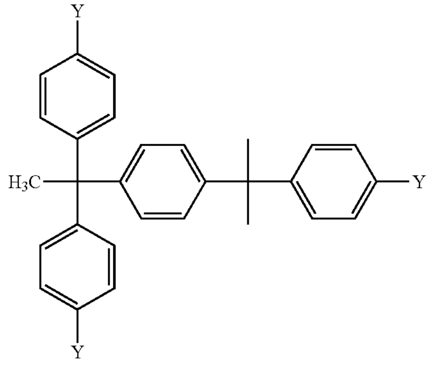

(Q-3)

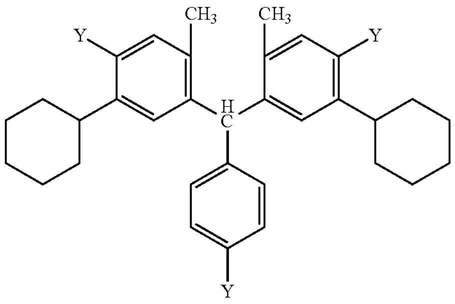

(Q-4)

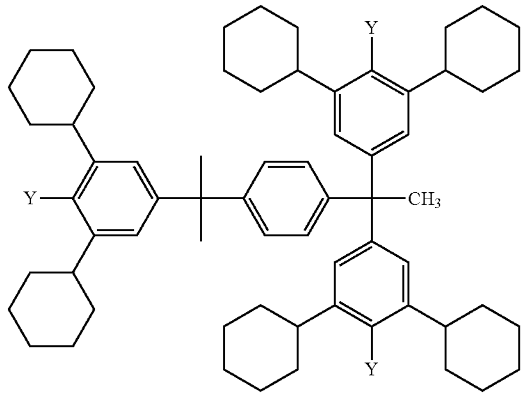

-continued
(Q-5)
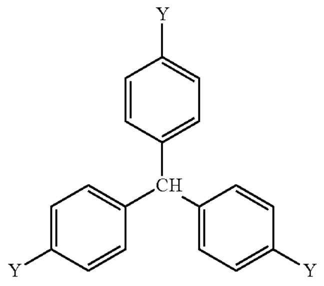
(Q-6)
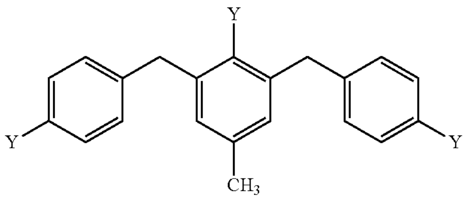
(Q-7)
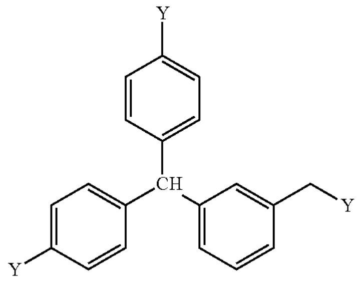
(Q-8)
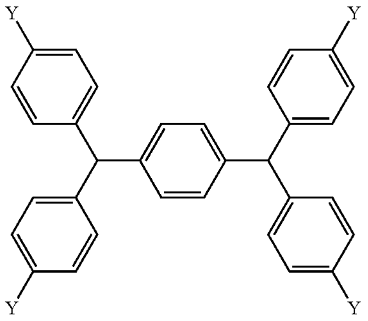
(Q-9)
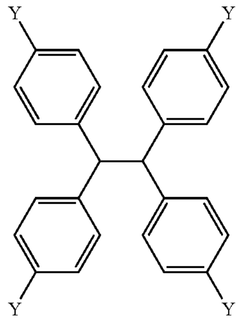
(Q-10)
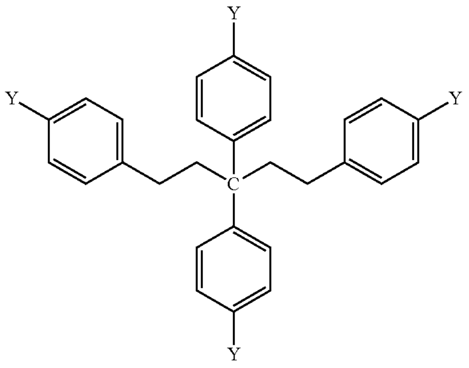
(Q-11)
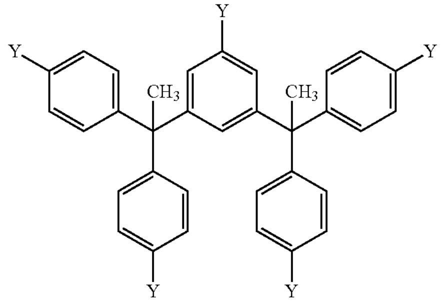
(Q-12)
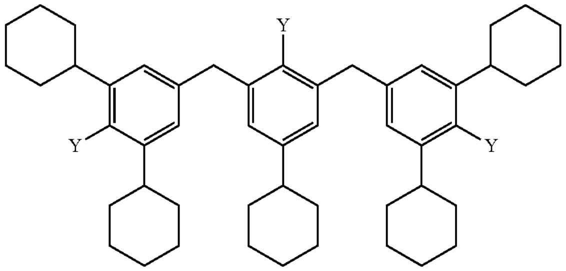

-continued
(Q-13)
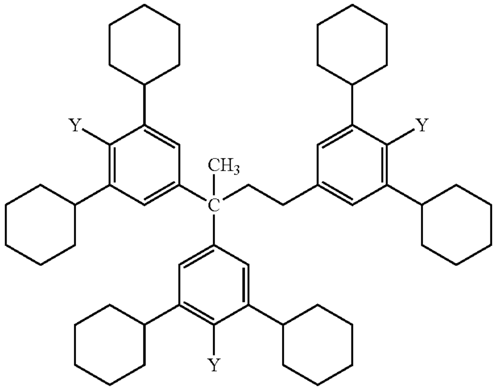
(Q-14)
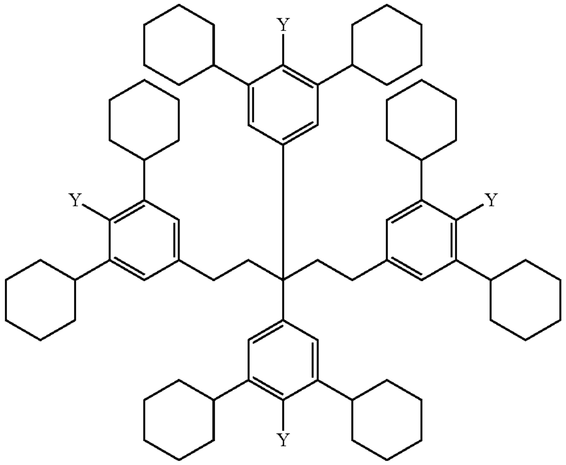
(Q-15)
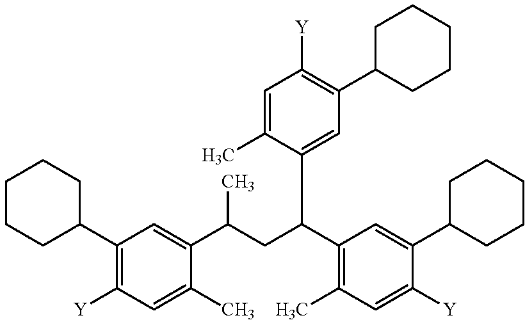
(Q-16)
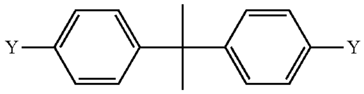
(Q-17)
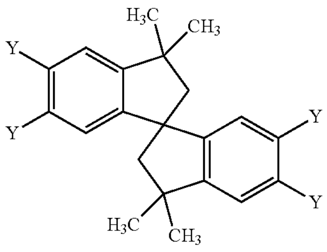
(Q-18)
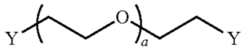
(Q-19)
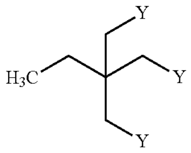
(Q-20)
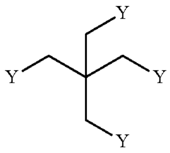
(Q-21)
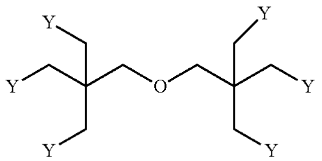
(Q-22)
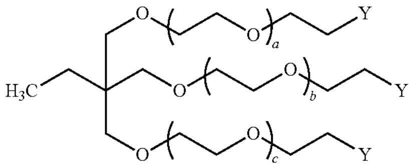
(Q-23)
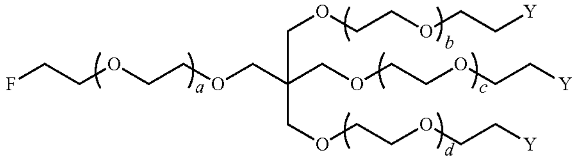

-continued (Q-24)

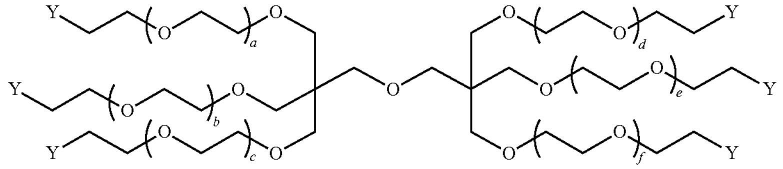

(Q-25)

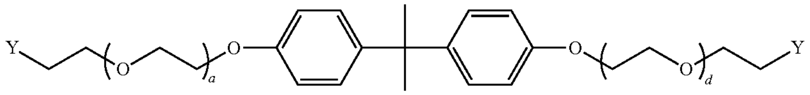

(Q-26)

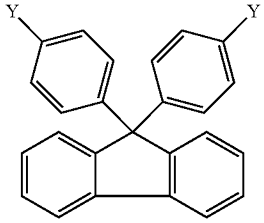

(Q-27)

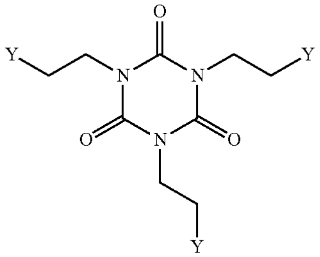

(Q-28)

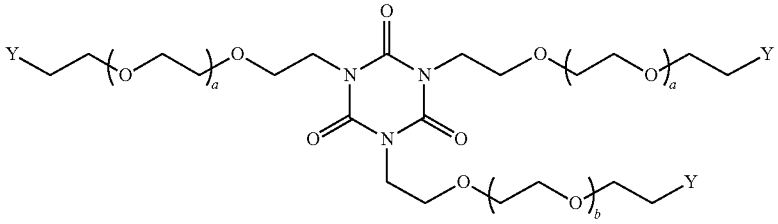

(Q-29)

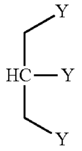

(Q-30)

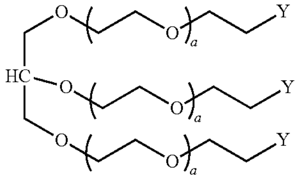

(A-31)

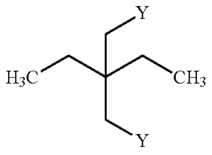

(Q-32)

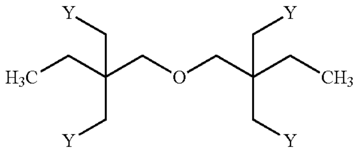

In the present invention, as the electrolytic polymerizable compound, it is also possible to use organic solid electrolyte interphase (SEI) agents that are ordinarily used as an additive for a liquid lithium ion battery (liquid LIB) electrolytic solution.

Examples thereof include the anionic addition-polymerizable monomers (isoprene, styrene, 2-vinylpyridine, 1-vinylimidazole, butyl acrylate, ethyl acrylate, methyl methacrylate, N-vinyl pyrrolidone, ethyl cinnamate, methyl cinnamate, ionone, myrcene, and the like) described in JP2000-199489A, aromatic compounds having a carbon-carbon double bond portion as a substituent (styrene-based compounds and the like) described in JP2004-103372A anion-polymerizable monomers (isoprene, 2-vinylpyridine, acrylic acid, methacrylic acid, acrylonitrile, styrene, butadiene, and the like) described in JP2005-142141A, electrolytic oxidation-polymerizable monomers (pyrrole, aniline, thiophene, derivatives thereof, and the like) and electrolytic reduction-polymerizable monomers (acrylonitrile, methacrylic acid ester, styrene, butadiene, methylenemalonic acid ester, α-cyanoacrylic acid ester, nitroethylene, vinylene carbonate, and the like) described in JP2006-216276A, and these SEI agents can be preferably used.

For example, the vinylene carbonate being used as an organic SEI agent represented by a structure in which $R^{12}$ and $R^{14}$ are hydrogen atoms, $R^{11}$ and $R^{13}$ are methoxy groups (or hydroxyl groups) and furthermore, $R^{11}$ and $R^{13}$ are linked together through a linking group (a carbonyl group that is a divalent organic group) in Formula (1) in the present invention [that is, $R^{11}$ and $R^{13}$ are bonded to each other and form —O—C(=O)—O—].

Here, the electrolytic polymerizable compounds represented by Formula (1) or (2) are classified as an unsaturated carbon compound, the electrolytic polymerizable compounds represented by Formula (3) are classified as a heteroaromatic compound, the electrolytic polymerizable compounds represented by Formula (4) are classified as a hetero-substituted aromatic compound, and the electrolytic polymerizable compounds represented by Formula (5) are classified as a cyclic saturated carbon compound.

Among these, it is preferable that the electrolytic polymerizable compounds represented by Formula (1) are a (meth) acrylic acid compound, a (meth)acrylamide compound, a styrene compound, or a vinyl compound, the electrolytic polymerizable compounds represented by Formula (2) are an acetylene compound, the electrolytic polymerizable compounds represented by Formula (3) are a thiophene compound, a furan compound, or a pyrrole compound, the electrolytic polymerizable compounds represented by Formula (4) are an aniline compound, a thiophenol compound, or a phenol compound, and the electrolytic polymerizable compounds represented by Formula (5) are a cyclopropane compound or a cyclobutane compound.

Particularly, it is preferable that the electrolytic polymerizable compounds represented by Formula (1a) are a (meth) acrylic acid compound, (meth)acrylamide compound, a styrene compound, or a vinyl compound, the electrolytic polymerizable compounds represented by Formula (2a) are an acetylene compound, the electrolytic polymerizable compounds represented by Formula (3a) are a thiophene compound, a furan compound, or a pyrrole compound, the electrolytic polymerizable compounds represented by Formula (4a) are an aniline compound, a thiophenol compound, or a phenol compound, and the electrolytic polymerizable compounds represented by Formula (5a) are a cyclopropane compound or a cyclobutane compound.

Specific examples of the compounds will be described below, but the present invention is not limited thereto.

1) Unsaturated Carbon-Based Compound

[(Meth)acrylic Acid Compound]

Mono-Substitution Products (Meth)acrylic acid, methyl (meth)acrylate, ethyl (meth) acrylate, propyl (meth)acrylate, butyl (meth)acrylate, isobutyl (meth)acrylate, pentyl (meth)acrylate, hexyl (meth)acrylate, heptyl (meth)acrylate, octyl (meth)acrylate, nonyl (meth)acrylate, decyl (meth)acrylate, dodecyl (meth)acrylate, stearyl (meth)acrylate, 2-hydroxyethyl (meth)acrylate, 2-methoxyethyl (meth)acrylate, polyethylene glycol mono (meth)acrylate, α-cyanoacrylic acid, methyl α-cyanoacrylate, ethyl α-cyanoacrylate, propyl α-cyanoacrylate, butyl α-cyanoacrylate, isobutyl α-cyanoacrylate, pentyl α-cyanoacrylate, hexyl α-cyanoacrylate, heptyl α-cyanoacrylate, octyl α-cyanoacrylate, nonyl α-cyanoacrylate, decyl α-cyanoacrylate, dodecyl α-cyanoacrylate, stearyl α-cyanoacrylate, cinnamic acid, methyl cinnamate, ethyl cinnamate, propyl cinnamate, butyl cinnamate, isobutyl cinnamate, pentyl cinnamate, hexyl cinnamate, heptyl cinnamate, octyl citrate, nonyl cinnamate, decyl cinnamate, dodecyl cinnamate, and stearyl cinnamate Di-Substitution Products Hexanediol di(meth)acrylate, polyethylene glycol di(meth)acrylate, 2-hydroxy-3-acryloyloxypropyl methacrylate, propoxylated ethoxylated bisphenol A di(meth)acrylate, ethoxylated bisphenol A di(meth)acrylate, 9,9-bis[4-(2-(meth)acryloyloxy ethoxy)phenyl]fluorene, propoxylated bisphenol A di(meth)acrylate, tricyclodecane dimethanol di(meth)acrylate, 1,10-decanediol di(meth)acrylate, 1,9-nonanediol di(meth)acrylate, dipropylene glycol di(meth) acrylate, tripropylene glycol di(meth)acrylate, polypropylene glycol di(meth)acrylate, and polytetramethylene glycol di(meth)acrylate Poly-Substitution Products Ethoxylated isocyanuric acid tri(meth)acrylate, ε-caprolactone-modified tris-(2-(meth)acryloxyethyl) isocyanurate, pentaerythritol tri(meth)acrylate, glycerin tri(meth)acrylate, dipentaerythritol tri(meth)acrylate, trimethylolpropane tri (meth)acrylate, ditrimethylolpropane tetra(meth)acrylate, ethoxylated pentaerythritol tetra(meth)acrylate, pentaerythritol tetra(meth)acrylate, dipentaerythritol poly(meth)acrylate, and dipentaerythritol hexa(meth)acrylate

[(Meth)acrylamide Compound]

Mono-Substitution Products (Meth)acrylamide, N,N-dimethyl (meth)acrylamide, fumaric acid diamide, maleic acid diamide, N-methyl (meth) acrylamide, N-t-butyl (meth)acrylamide, N-isopropyl (meth)acrylamide, and N-(hydroxymethyl) (meth)acrylamide Di-Substitution Products N,N'-methylene bis(meth)acrylamide and N,N'-ethylene bis(meth)acrylamide Poly-Substitution Products The acrylamide poly-substitution products described in Paragraphs 0018 to 0027 of JP2012-214561A can be preferably used.

[Styrene Compound]

Mono-Substitution Products

Styrene, α-methylstyrene, 4-methylstyrene, 2,6-dimethylstyrene, 3,5-dimethylstyrene, 4-trifluoromethylstyrene, 4-fluorostyrene, 4-chlorostyrene, and 4-methoxystyrene Di-Substitution Products p-divinylbenzene and m-divinylbenzene

[Vinyl Compound]

Mono-Substitution Products

Vinylene carbonate, 4,5-dimethyl-1,3-dioxole-2-one, ionone, myrcene, 14-chloromethyl-5-methyl-1,3-dioxole-2-one-dodecene, 1-octadecene, oleic acid, linoleic acid, linolenic acid, vinyl acetate, vinyl propionate, vinyl butanoate, vinyl hexanoate, vinyl octanoate, vinyl decanoate, vinyl dodecanoate, vinyl stearate, allyl acetate, allyl propionate, allyl butanoate, allyl hexanoate, allyl octanoate, allyl decanoate, allyl dodecanoate, allyl stearate, allyl stearate, vinyl acrylate, vinyl methacrylate, allyl methacrylate, allyl acrylate, ethyl vinyl ether, dodecyl vinyl ether, stearyl vinyl ether, and phenyl vinyl ether Di-Substitution Products Divinyl ether, divinyl succinate, divinyl glutarate, divinyl adipate, divinyl pimelate, divinyl suberate, divinyl azelate, divinyl sebacate, divinyl phthalate, divinyl isophthalate, divinyl terephthalate, diallyl ether, diallyl succinate, diallyl glutarate, diallyl adipate, diallyl pimelate, diallyl suberate, diallyl azelate, diallyl sebacate, diallyl phthalate, diallyl isophthalate, and diallyl terephthalate Poly-Substitution Products Butadiene, Isoprene, and Farnesyl Acetate

[Acetylene Compound]

Mono-Substitution Products 1-dodecene, 1-hexadecyne, 1-octadecyne, ethynylbenzene, propargyl alcohol, propargyl methyl ether, methyl propargylate, 2-(2-propynyloxy) ethylamine, benzyl-2-propynyl ether Di-Substitution Products 2,4-heptadecadiynic acid, 2,4-pentadecadiynic acid, 10,12-pentacosadiynic acid, 10,12-pentacosadiyne-1-ol, 4,6-nonadecadiyne-1-ol, 1-bromo-4,6-nonadecadiyne, 1-bromo-10,12-pentacosadiin, 10,12-nonacosadiynic acid, m-diethynylbenzene, p-diethynylbenzene, diethylene glycol bis(2-propynyl) ether, ethylene glycol 1,2-bis(2-propynyl) ether, 1,3-bis(2-propynyloxy) benzene Heteroaromatic Compound

[Thiophene Compound]

Mono-Substitution Products

Thiophene, 3-methylthiophene, 3-ethylthiophene, 3-butylthiophene, 2-methylthiophene, 3-pentylthiophene, 3-propylthiophene, 3-bromothiophene, 3-chlorothiophene, 3-vinyl thiophene, 3-cyanothiophene, 3-heptylthiophene, 3-hexylthiophene, 3-n-octylthiophene, 3-acetylthiophene, 2,5-dimethylthiophene, 3-dodecylthiophene, 3-decylthiophene, 3-(2-ethylhexyl) thiophene, thiophene-3-acetonitrile, 3-undecylthiophene, 3,4-dibromothiophene, 3-ethynylthiophene, 3-hexadecylthiophene, 3-tetradecylthiophene, 3,4-dihexylthiophene, 2,5-dichlorothiophene, 2,5-dibromothiophene 2,5-diiodothiophene, 3-octadecylthiophene, 2-thiophene carboxaldehyde, 2-methoxythiophene, tetrabromothiophene, 2,5-dibromo-3-hexylthiophene, cis-1,2-dicyano-1,2-bis (2,4,5-trimethyl-3-thienyl)ethene, trans-1,2-dicyano-1,2-bis (2,4,5-trimethyl-3-thienyl)ethene)

Di-Substitution Products

Bithiophene, 3,4'-dihexyl-2,2'-bithiophene, 3,3'-dihexyl-2,2'-bithiophene, 4,4'-dihexyl-2,2'-bithiophene, 5,5'-dibromo-2,2'-bithiophene, 4,4'-dibromo-2,2'-bithiophene, 3,3'-dibromo-2,2'-bithiophene, 5,5'-dibromo-3,3'-dihexyl-2,2'-bithiophene, 5,5'-dibromo-4,4'-dihexyl-2,2'-bithiophene, 3,3',5,5'-tetrabromo-2,2'-bithiophene, 4,4-bis(2-ethylhexyl)-4H-cyclopenta[2,1-b:3,4-b'] dithiophene, and 2,3,5,6-tetrabromothieno [3,2-b] thiophene Poly-Substitution Products α-quaterthiophene, α-quinqui thiophene, α-sexithiophene, α-septithiophene, α-octithiophene 2,5-di(2-thienyl)thieno[3,2-b]thiophene, 3'-bromo-2,2':5',2"-terthiophene, 1,3,5-tri(2-thienyl) benzene, and 3,5-dibromodithieno [3,2-b:2',3'-d] thiophene

[Furan Compound]

Mono-Substitution Products

Furan, 3-methylfuran, 2,5-dibromofuran, and 2,5-diphenyl furan

Di-Substitution Products

Difurfuryl disulfide and bis(2-methyl-3-furyl) disulfide

Poly-Substitution Products

Tri(2-furyl) phosphine

[Pyrrole Compound]

Mono-Substitution Products

Pyrrole, 1-methylpyrrole, 1-ethylpyrrole, 1-butylpyrrole, 1-hexylpyrrole, 1-octylpyrrole, 1-dodecylpyrrole, 1-octadecylpyrrole, 1-vinylpyrrole, 1-benzylpyrrole, 3-acetyl-1-methylpyrrole, 1-(2-hydroxyethyl) pyrrole, 1-(3-bromopropyl) pyrrole, 3-(1-pyrrolylmethyl) pyridine, carbazole, and N-ethylcarbazole 3) Hetero-Substituted Aromatic Compound

[Aniline Compound]

Mono-Substitution Products

Aniline, 2-methylaniline, 3-methylaniline, 2,6-dimethylaniline, 3,5-dimethylaniline, 2-methoxyaniline, and 3-methoxyaniline Di-Substitution Products 4,4'-diamino-2,2'-dimethyl-bibenzyl, 3,3'-benzophenone, m-tolidine, 2,2-bis (3-aminophenyl) hexafluoropropane, 2,2-bis (3-amino-4-methylphenyl) hexafluoropropane, 1,6-diaminopyrene, 1,8-diaminopyrene, 2,2-bis(3-amino-4-hydroxyphenyl) propane, 1,3-diaminopyrene, 3,3'-dimethylnaphthoquinone cytidine, 1,1'-binaphthyl-2,2'-diamine, 1,4-bis(4-amino-2-trifluoromethylphenoxy) benzene, 2,2-bis(3-amino-4-hydroxyphenyl) hexafluoropropane, 2,2'-bis (trifluoromethyl) benzidine, 2,6-diamino anthraquinone, and 1,5-diamino anthraquinone Poly-Substitution Products 3,3'-diaminobenzidine

[Thiophenol Compound]

Mono-Substitution Products

Thiophenol, 2-methylthiophenol, 3-methylthiophenol, 2,6-dimethylthiophenol, 3,5-dimethylthiophenol, 2-methoxythiophenol, and 3-methoxythiophenol Di-Substitution Products 4,4'-thiobisbenzenethiol

[Phenol Compound]

Mono-Substitution Products

Phenol, 2-methylphenol, 3-methylphenol, 2,6-dimethylphenol, 3,5-dimethylphenol, 2-methoxyphenol, and 3-methoxyphenol Di-Substitution Products Bisphenol A and bisphenol C 4) Cyclic Saturated Carbon Compound

[Cyclopropane Compound]

Mono-Substitution Products

Cyclopropane, 1,1,2,2-tetramethylcyclopropane, cyclopropanecarboxylic acid, cyclopropanecarboxylic acid chloride, cyclopropanecarbonitrile, bromocyclopropane, cyclopropanecarboxaldehyde, (chloromethyl) cyclopropane, cyclopropane acetylene, cyclopropylamine, cyclopropylmethylketone, cyclopropanemethanol, 1-cyclopropylethanol, 1-cyclopropylmethylamine, cyclopropanecarboxylic acid methyl ester, cyclopropanecarboxamide, 7,7-dichlorobicyclo[4.1.0]heptane, 1-methylcyclopropanecarboxylic acid methyl ester, cyclopropanesulfonamide, 1,1-cyclopropanedicarboxylic acid, 1,1-cyclopropanedical dimethyl cyclohexylcarboxylate, thujone, methyl 3-cyclopropyl-3-oxopropionate, 2,2,3,3-tetramethylcyclopropanecarboxylic acid, (+)-3-carene, cyclopropyl phenyl sulfide, 1-cyclopropylpiperazine, α-cyclopropylbenzyl alcohol, 3-oxabicyclo [3.1.0]hexane-2,4-dione, cyromazine, 2,2-dimethyl-3-(2-methyl-1-propenyl) cyclopropane-1-carboxylate, 6,6-dimethyl-5,7-dioxaspiro[2.5]octane-4,8-dione, caronic acid anhydride, and cyclopropyl 2-thienyl ketone Di-Substitution Products Dicyclopropyl ketone

[Cyclobutane Compound]

Mono-Substitution Products

Cyclobutane, 1,1,2,2-tetramethylcyclobutane, cyclobutane carboxylic acid, cyclobutane carboxylic acid chloride, cyclobutane carbonitrile, bromocyclobutane, cyclobutane carboxaldehyde, (chloromethyl) cyclobutane, cyclobutanol, aminocyclobutane, cyclobutane methanol, 2,2,4,4-tetramethyl-1,3-cyclobutanediol, (−)-β-pinene, cyclobutanecarboxylic acid ethyl ester, 1,1-cyclobutanedicarboxylic acid, (1S,2S,3R,5S)-(+)-2,3-pinanediol, (1R,2R,3S,5R)-(−)-2,3-pinanediol, 1,2,3,4-cyclobutanetetracarboxylic acid, (1R,2R,5R)-(+)-2-hydroxy-3-pinanone, (1S,2S,5S)-(−)-2-hydroxy-3-pinanone, β-caryophyllene, (1S)-(−)-α-pinene, (1R)-(+)-α-pinene, cyclobutyl phenyl ketone, (−)-verbenone, benzocyclobutene, α-pinene oxide, 1-phenylcyclobutanecarbonitrile, 1,2,3,4-cyclobutanetetracarboxylic dianhydride, 1,2,3,4-tetramethyl-1,2,3,4-cyclobutanetetracarboxylic dianhydride, tricyclo[6.4.0.0$^{2,7}$]dodecane-1,8:2,7-tetracarboxylic dianhydride, and 1,2,3,4-cyclobutanetetracarboxylic acid diimide Di-Substitution Products Dicyclobutyl ketone In the present invention, it is more preferable to respectively use an electrolytic polymerizable compound that is likely to be oxidation-polymerized with a solid electrolyte composition forming the positive electrode active material layer (hereinafter, also simply referred to as the composition for a positive electrode) and an electrolytic polymerizable compound that is likely to be reduction-polymerized with a solid electrolyte composition forming the negative electrode active material layer (hereinafter, also simply referred to as the composition for a negative electrode).

When all solid state secondary batteries made of the above-described constitution are charged and discharged, all solid state secondary batteries having an excellent ion conductivity and excellent cycle characteristics can be obtained, which is preferable.

Electrolytic polymerizable compounds that are likely to be oxidation-polymerized which are preferably used as the composition for a positive electrode preferably have a group capable of stabilizing radical cations being generated during initial charging and discharging electrolysis.

For example, electron-rich unsaturated bonds (also including unsaturated bonds in which an electron-donating group is substituted) or electron-donating hetero atoms (for example, an oxygen atom, a sulfur atom, and a nitrogen atom) are preferably present in the vicinity of reaction points.

Here, compounds having unsaturated bonds such as Formulae (1), (2), (1a), and (2a) are likely to be oxidation-polymerized, and thus $R^{11}$ to $R^{14}$, $R^{21}$, $R^{22}$, $R^{11a}$ to $R^{13a}$, $R^{21a}$, and $-L^1$-Q may be and are furthermore preferably electron-withdrawing groups such as an acyl group, an acyloxy group, and a carbamoyl group.

Specific examples include unsaturated carbon compounds represented by Formula (1) or (1a) which have electron-donating substituents, heteroaromatic compounds represented by Formula (3) or (3a), aromatic compounds having hetero substituents which are represented by Formula (4) or (4a), and the like.

Meanwhile, electron-donating groups refer to groups having a negative Hammett σp value.

Here, examples of the electron-donating substituents as $R^{11}$ to $R^{14}$ in Formula (1) or $R^{11a}$ to $R^{13a}$ in Formula (1a) include an alkyl group, a cycloalkyl group, an alkenyl group, an aryl group in which an electron-donating group is substituted, an alkoxy group, an aryloxy group, an alkylthio group, an arylthio group, an acylamino group, a hydroxyl group, a mercapto group, and an amino group, and an alkoxy group is preferred.

At least one substituent as $R^{11}$ to $R^{14}$ in Formula (1) and $R^{11a}$ to $R^{13a}$ and $-L^1$-Q in Formula (1a) is preferably an electron-donating group, an aryl group, an alkylcarbonyl group, an alkyl carbonyloxy group, an alkyloxycarbonyl group, or a carbamoyl group. The remaining substituents are preferably hydrogen atoms or alkyl groups.

The substituent as $R^{21}$ and $R^{22}$ in Formula (2) and $R^{21a}$ in Formula (2a) more preferably a hydrogen atom, an alkyl group, an alkenyl group or an aryl group.

The substituent as $R^{31}$ to $R^{34}$ in Formula (3) and $R^{31a}$ in Formula (3a) is more preferably a hydrogen atom, an alkyl group, an aryl group, a heteroaryl group, or a halogen atom and more preferably a hydrogen atom, an alkyl group, or a halogen atom.

$X^1$ is an oxygen atom, a sulfur atom, or $NR^{35}$ and preferably a sulfur atom or $NR^{35}$. $X^{11}$ represents an oxygen atom, a sulfur atom, or $NR^{35a}$ and preferably a sulfur atom or $NR^{35a}$. $R^{35}$ and $R^{35a}$ are preferably hydrogen atoms or alkyl groups and still more preferably hydrogen atoms.

The substituent as $R^{41}$ to $R^{45}$ in Formula (4) and $R^{41a}$ in Formula (4a) is more preferably a hydrogen atom, a hydroxyl group, a mercapto group, an amino group, an alkyl group, an aryl group, or an alkoxy group and still more preferably a hydrogen atom, an alkyl group, or an alkoxy group.

$X^2$ is $OR^{46}$, $SR^{47}$, or $NR^{48}R^{49}$ and preferably $OR^{46}$ or $NR^{48}R^{49}$. $X^{21}$ is $OR^{46a}$, $SR^{47a}$, or $NR^{48a}R^{49a}$ and preferably $OR^{46a}$ or $NR^{48a}R^{49a}$. $R^{46}$ to $R^{49}$ and $R^{46a}$ to $R^{49a}$ are preferably hydrogen atoms or alkyl groups and still more preferably hydrogen atoms.

Examples of the unsaturated carbon compound represented by Formula (1) or (1a) which has an electron-donating substituent include alkoxyvinyl compounds, alkylcarbonyloxyvinyl compounds, and the like, examples of the heteroaromatic compound represented by Formula (3) or (3a) include thiophene compounds, pyrrole compounds, furan compounds, and the like, and examples of the aromatic compound having a hetero substituent which is represented by Formula (4) or (4a) include aniline compounds, phenol compounds, thiophenol compounds, and the like.

Meanwhile, preferred examples of the respective compounds include the compounds exemplified above as the specific examples.

Meanwhile, electrolytic polymerizable compounds that are likely to be reduction-polymerized which are preferably used as the composition for a negative electrode preferably have a group capable of stabilizing radical anions being generated during initial charging and discharging electrolysis.

For example, electron-lacking unsaturated bonds or electron-withdrawing carbonyl group, cyano group, and trifluoromethyl group are preferably present in the vicinity of reaction points.

Specific examples include unsaturated carbon compounds represented by Formula (1) or (1a) which have electron-withdrawing substituents, and electron-lacking unsaturated carbon compounds represented by Formula (2) or (2a), and the like. Meanwhile, electron-withdrawing substituents refer to groups having a Hammett σp value of 0 or more.

Here, examples of the electron-withdrawing substituents as $R^{11}$ to $R^{14}$ in Formula (1) or $R^{11a}$ to $R^{13a}$ and $-L^1$-Q in Formula (1a) include a cyano group, a halogenated alkyl group, an alkyloxycarbonyl group, a halogenated aryl group, and an alkylcarbonyl group, and a cyano group, a halogenated alkyl group, and an alkyloxycarbonyl group are preferred.

Among these, in $R^{11}$ to $R^{14}$ in Formula (1) and $R^{11a}$ to $R^{13a}$ and $-L^1$-Q in Formula (1a), at least one substituent is preferably an electron-withdrawing group. The remaining substituents which are not electron-withdrawing groups are not particularly limited as long as the substituents form electron-lacking unsaturated bonds, but are preferably hydrogen atoms or alkyl groups.

The substituent as $R^{21}$ and $R^{22}$ in Formula (2) and $R^{21a}$ in Formula (2a) is preferably a hydrogen atom, an alkyl group, or a carboxy-substituted alkyl group.

Examples of the unsaturated carbon compound represented by Formula (1) or (1a) which has an electron-withdrawing substituent include (meth)acrylic acid compounds, (trifluoromethyl)acrylate compounds, and cyanoacrylate compounds, and examples of the electron-lacking unsaturated carbon compound represented by Formula (2) or (2a) include acetylene compounds and the like.

Meanwhile, preferred examples of the respective compounds include the compounds exemplified above as the specific examples.

In addition, the cyclic saturated carbon compounds represented by Formula (5) or (5a) can be preferably used in both of the composition for a positive electrode and the composition for a negative electrode, which is preferable.

$X^3$ in Formula (5) and $X^{31}$ in Formula (5a) are preferably methylene groups.

$R^{51}$ to $R^{54}$ in Formula (5) and $R^{51a}$ to $R^{53a}$ in Formula (5a) are more preferably hydrogen atoms and alkyl groups. In addition, $X^3$ and $R^{51}$ in Formula (5) and $X^{31}$ and $R^{51a}$ in Formula (5a) are more preferably bonded to each other and form a ring, and, in this case, rings to be formed are preferably cyclohexane rings or cyclopentane rings.

The electrolytic polymerizable compound being used in the present invention is more preferably an electrolytic polymerizable compound having the mother nucleus structure $Q^1$, and specific examples thereof include the following combinations.

Meanwhile, in the following tables, in the structures represented by Formulae (1) to (5) or (1a) to (5a), structures contributing to electrolytic polymerization are shown as electrolytic polymerization portions. In addition, broken lines in the 'electrolytic polymerization portion' column indicate bonding locations with the linking group $L^1$.

In addition, bonds "—" in the hetero atom Y indicated in a case in which there are a plurality of atoms being linked indicate a bond between the portion of "—" and the linking group $L^1$. For example, in O—C(=O)—, "O—C(=O)" is Q, the portion being bonded to $Q^1$ is the left O (oxygen atom), and the structure becomes $Q^1$-O—C(=O)-$L^1$-electrolytic polymerization portion.

TABLE 1

| | Mother nucleus structure $Q^1$ | Hetero linking group Y | Linking group $L^1$ | Electrolytic polymerization portion |
|---|---|---|---|---|
| Exemplary Compound 1 | Q-2 | O | $CH_2$ | 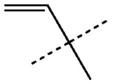 |
| Exemplary Compound 2 | Q-9 | O | $CH_2$ | 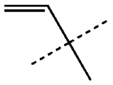 |
| Exemplary Compound 3 | Q-15 | O | $CH_2CH_2$ | 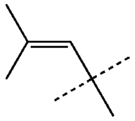 |
| Exemplary Compound 4 | Q-16 | O | $CH_2$ | 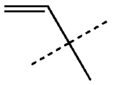 |
| Exemplary Compound 5 | Q-19 | O | $CH_2$ | 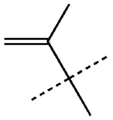 |
| Exemplary Compound 6 | Q-20 | O | $CH_2$ | 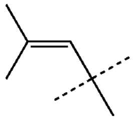 |
| Exemplary Compound 7 | Q-21 | O | $CH_2CH_2$ | 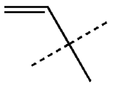 |
| Exemplary Compound 8 | Q-26 | O | $CH_2$ | 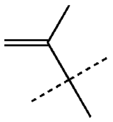 |
| Exemplary Compound 9 | Q-1 | O | $CH_2$ | 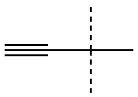 |
| Exemplary Compound 10 | Q-5 | O | $CH_2$ | 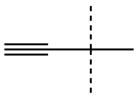 |

TABLE 1-continued

| | Mother nucleus structure $Q^1$ | Hetero linking group Y | Linking group $L^1$ | Electrolytic polymerization portion |
|---|---|---|---|---|
| Exemplary Compound 11 | Q-8 | O | $CH_2CH_2$ | 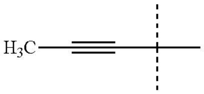 |
| Exemplary Compound 12 | Q-19 | O | $CH_2$ | 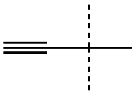 |
| Exemplary Compound 13 | Q-20 | O | $CH_2CH_2$ | 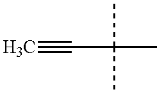 |
| Exemplary Compound 14 | Q-21 | O | $CH_2$ | 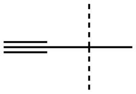 |
| Exemplary Compound 15 | Q-27 | O | $CH_2$ | 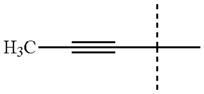 |
| Exemplary Compound 16 | Q-2 | O | Single bond | 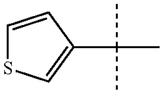 |
| Exemplary Compound 17 | Q-6 | O | Single bond | 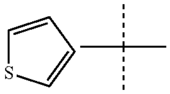 |
| Exemplary Compound 18 | Q-11 | O | Single bond | 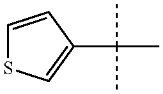 |
| Exemplary Compound 19 | Q-15 | O | Single bond | 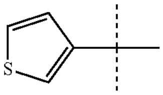 |
| Exemplary Compound 20 | Q-23 | O | Single bond | 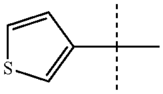 |

TABLE 2

| | Mother nucleus structure $Q^1$ | Hetero linking group Y | Linking group $L^1$ | Electrolytic polymerization portion |
|---|---|---|---|---|
| Exemplary Compound 21 | Q-2 | O | $CH_2CH_2$ | 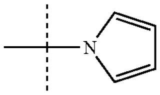 |
| Exemplary Compound 22 | Q-9 | O | $CH_2CH_2$ | 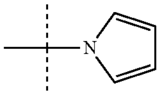 |

TABLE 2-continued

| | Mother nucleus structure $Q^1$ | Hetero linking group Y | Linking group $L^1$ | Electrolytic polymerization portion |
|---|---|---|---|---|
| Exemplary Compound 23 | Q-15 | O | $CH_2CH_2$ | 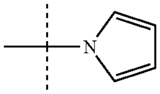 |
| Exemplary Compound 24 | Q-16 | O | $CH_2CH_2CH_2$ | 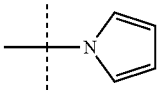 |
| Exemplary Compound 25 | Q-19 | O | $CH_2CH_2CH_2$ | 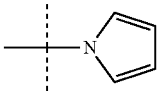 |
| Exemplary Compound 26 | Q-20 | O | $CH_2CH_2$ | 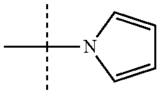 |
| Exemplary Compound 27 | Q-21 | O | $CH_2CH_2CH_2$ | 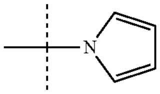 |
| Exemplary Compound 28 | Q-27 | Single bond | Single bond | 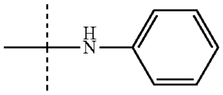 |
| Exemplary Compound 29 | Q-29 | Single bond | Single bond | 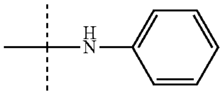 |
| Exemplary Compound 30 | Q-1 | O—C(═O)— | Single bond | 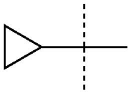 |
| Exemplary Compound 31 | Q-2 | O—C(═O)— | Single bond | 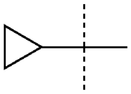 |
| Exemplary Compound 32 | Q-3 | O | $CH_2$ | 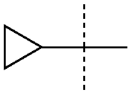 |
| Exemplary Compound 33 | Q-5 | O—C(═O)— | Single bond | 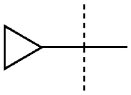 |
| Exemplary Compound 34 | Q-6 | O | $CH_2$ | 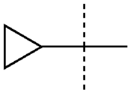 |
| Exemplary Compound 35 | Q-8 | O—C(═O)— | Single bond | 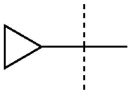 |
| Exemplary Compound 36 | Q-11 | O—C(═O)— | Single bond | 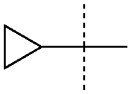 |

TABLE 2-continued

| | Mother nucleus structure $Q^1$ | Hetero linking group Y | Linking group $L^1$ | Electrolytic polymerization portion |
|---|---|---|---|---|
| Exemplary Compound 37 | Q-12 | O—C(═O)— | Single bond | 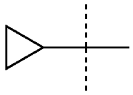 |
| Exemplary Compound 38 | Q-22 | O—C(═O)— | Single bond | 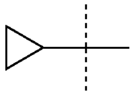 |
| Exemplary Compound 39 | Q-24 | O—C(═O)— | Single bond | 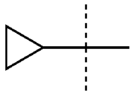 |
| Exemplary Compound 40 | Q-29 | O—C(═O)— | Single bond | 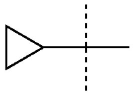 |

TABLE 3

| | Mother nucleus structure $Q^1$ | Hetero linking group Y | Linking group $L^1$ | Electrolytic polymerization portion |
|---|---|---|---|---|
| Exemplary Compound 41 | Q-1 | S | $CH_2$ | 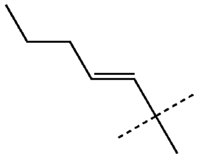 |
| Exemplary Compound 42 | Q-2 | S | $CH_2CH_2$ | 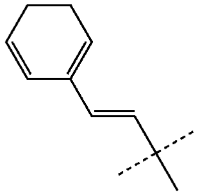 |
| Exemplary Compound 43 | Q-2 | O | $CH_2$ | 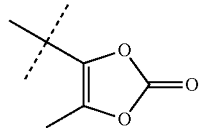 |
| Exemplary Compound 44 | Q-2 | O | $CH_2$ | 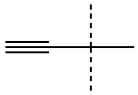 |
| Exemplary Compound 45 | Q-2 | O | $CH_2$ | 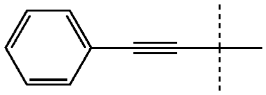 |
| Exemplary Compound 46 | Q-6 | O | $CH_2CH_2$ | 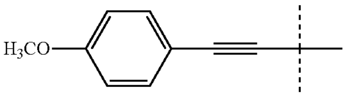 |

TABLE 3-continued

| | Mother nucleus structure $Q^1$ | Hetero linking group Y | Linking group $L^1$ | Electrolytic polymerization portion |
|---|---|---|---|---|
| Exemplary Compound 47 | Q-7 | S | $CH_2CH_2CH_2$ | 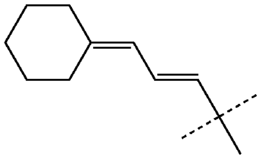 |
| Exemplary Compound 48 | Q-8 | Single bond | Single bond | 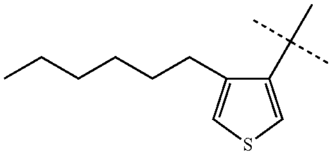 |
| Exemplary Compound 49 | Q-9 | Single bond | Single bond | 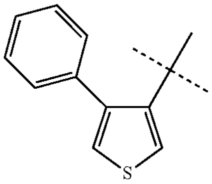 |
| Exemplary Compound 50 | Q-10 | S—C(═O)— | Single bond | 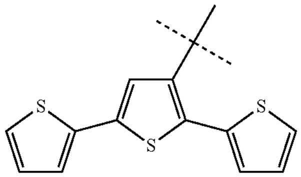 |
| Exemplary Compound 51 | Q-11 | S—C(═O)— | Single bond | 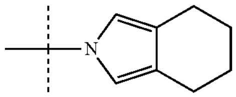 |
| Exennplary Compound 52 | Q-12 | S | $CH_2$ | 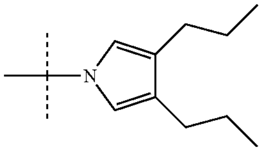 |
| Exemplary Compound 53 | Q-13 | O—C(═O)— | Single bond | 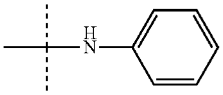 |
| Exemplary Compound 54 | Q-14 | S | $CH_2$ | 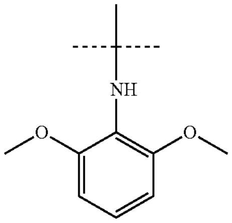 |
| Exemplary Compound 55 | Q-1 | O—C(═O)— | Single bond | 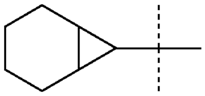 |
| Exemplary Compound 56 | Q-2 | O—C(═O)— | Single bond | 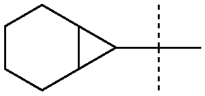 |

TABLE 3-continued

| | Mother nucleus structure $Q^1$ | Hetero linking group Y | Linking group $L^1$ | Electrolytic polymerization portion |
|---|---|---|---|---|
| Exemplary Compound 57 | Q-3 | O—C(=O)— | Single bond | 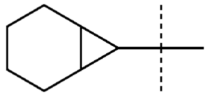 |
| Exemplary Compound 58 | Q-4 | O—C(=O)— | Single bond | 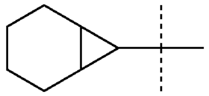 |
| Exemplary Compound 59 | Q-20 | O—C(=O)— | Single bond | 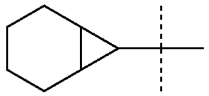 |
| Exemplary Compound 60 | Q-21 | O—C(=O)— | Single bond | 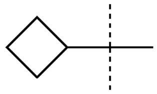 |

In the present specification, the expression of compounds (for example, when referred to as "~compound") is used to mention not only the compounds but also salts thereof and ions thereof.

In the present specification, substituents which are not clearly expressed as substituted or unsubstituted (which is also true for linking groups) may have an arbitrary substituent in the groups unless particularly otherwise described. This is also true for compounds which are not clearly expressed as substituted or unsubstituted. Examples of preferred substituents include the following substituent T. In addition, in a case in which substituents are simply expressed as "substituent", the substituent T is referred to.

Examples of the substituent include the following substituents.

Alkyl groups (preferably alkyl groups having 1 to 20 carbon atoms, for example, methyl, ethyl, isopropyl, t-butyl, pentyl, heptyl, 1-ethylpentyl, benzyl, 2-ethoxyethyl, 1-carboxymethyl, and the like), alkenyl groups (preferably alkenyl groups having 2 to 20 carbon atoms, for example, vinyl, allyl, oleyl, and the like), alkynyl groups (preferably alkynyl groups having 2 to 20 carbon atoms, for example, ethynyl, butadiynyl, phenylethynyl, and the like), cycloalkyl groups (preferably cycloalkyl groups having 3 to 20 carbon atoms, for example, cyclopropyl, cyclopentyl, cyclohexyl, 4-methylcyclohexyl, and the like), aryl groups (preferably aryl groups having 6 to 26 carbon atoms, for example, phenyl, 1-naphthyl, 4-methoxyphenyl, 2-chlorophenyl, 3-methylphenyl, and the like), heterocyclic groups (preferably heterocyclic groups having 2 to 20 carbon atoms, preferably heterocyclic groups of a five- or six-membered ring having at least one oxygen atom, sulfur atom, or nitrogen atom in the ring-constituting atom, for example, tetrahydropyranyl, tetrahydrofuranyl, 2-pyridyl, 4-pyridyl, 2-imidazolyl, 2-benzimidazolyl, 2-thiazolyl, 2-oxazolyl, and the like), alkoxy groups (preferably alkoxy groups having 1 to 20 carbon atoms, for example, methoxy, ethoxy, isopropyloxy, benzyloxy, and the like), alkenyloxy groups (preferably alkenyloxy groups having 2 to 20 carbon atoms, for example, vinyloxy, allyloxy, oleyloxy, and the like), alkynyloxy groups (preferably alkynyloxy groups having 2 to 20 carbon atoms, for example, ethynyloxy, phenylethynyloxy, and the like), cycloalkyloxy groups (preferably cycloalkyloxy groups having 3 to 20 carbon atoms, for example, cyclopropyloxy, cyclopentyloxy, cyclohexyloxy, 4-methylcyclohexyloxy, and the like), aryloxy groups (preferably aryloxy groups having 6 to 26 carbon atoms, for example, phenoxy, 1-naphthyloxy, 3-methylphenoxy, 4-methoxyphenoxy, and the like), alkoxycarbonyl groups (preferably alkoxycarbonyl groups having 2 to 20 carbon atoms, for example, ethoxycarbonyl, 2-ethylhexyloxycarbonyl, and the like), aryloxycarbonyl groups (preferably aryloxycarbonyl groups having 7 to 26 atoms, for example, phenoxycarbonyl, 1-naphthyloxycarbonyl, 3-methylphenoxycarbonyl, 4-methoxyphenoxycarbonyl, and the like), amino groups (preferably amino groups having 0 to 20 carbon atoms, including an alkylamino group, an alkenylamino group, an alkynylamino group, an arylamino group, and a heterocyclic amino group, for example, amino, N,N-dimethylamino, N,N-diethylamino, N-ethylamino, N-allylamino, N-ethynylamino, anilino, 4-pyridylamino, and the like), sulfamoyl groups (preferably sulfamoyl groups having 0 to 20 carbon atoms, for example, N,N-dimethylsulfamoyl, N-phenylsulfamoyl, and the like), acyl groups (including an alkanoyl group, an alkenoyl group, an alkynoyl group, a cycloalkanolyl group, an aryloyl group, and a heterocyclic carboxyl group, preferably acyl groups having 1 to 23 carbon atoms, for example, formyl, acetyl, propionyl, butyryl, pivaloyl, stearoyl, acryloyl, methacryloyl, crotonoyl, oleoyl, propioloyl, cyclopropanoyl, cyclopentanoyl, cyclohexanoyl, benzoyl, nicotinoyl, isonicotinoyl, and the like), acyloxy groups (including an alkanoyloxy group, an alkenoyloxy group, an alkynoyloxy group, a cycloalkanoyloxy group, an aryloyloxy group, and a heterocyclic carbonyloxy group, preferably acyloxy groups having 1 to 23 carbon atoms, for example, formyloxy, acetyloxy, propionyloxy, butyryloxy, pivaloyloxy, stearoyloxy, acryloyloxy, methacryloyloxy, crotonoyloxy, oleoyloxy, propioloyloxy, cyclopropanoyloxy, cyclopentanoyloxy, cyclohexanoyloxy, nicotinoyloxy, isonicotinoyloxy, and the like), carbamoyl groups (preferably carbamoyl groups having 1 to 20 carbon atoms, for example, N,N-dimethylcarbamoyl, N-phenylcarbamoyl, and the like), acylamino groups (preferably acylamino groups having 1 to 20 carbon atoms, for example, acetylamino, acryloylamino, methacryloylamino, benzoylamino, and the like), sulfonamido groups (including an alkylsulfonamido group and an arylsulfonamido group, preferably sulfonamido groups having 1 to 20 carbon atoms, for example, methanesulfonamido, benzenesulfonamido, and the like), alkylthio groups (preferably alkylthio groups having 1 to 20 carbon atoms, for example, methylthio, ethylthio, isopropylthio, benzylthio, and the like), arylthio groups (preferably arylthio groups having 6 to 26 carbon atoms, for example, phenylthio, 1-naphthylthio, 3-methylphenylthio, 4-methoxyphenylthio, and the like), alkylsulfonyl groups (preferably alkylsulfonyl groups having 1 to 20 carbon atoms, for example, methylsulfonyl, ethylsulfonyl, and the like), arylsulfonyl groups (preferably arylsulfonyl groups having 6 to 22 carbon atoms, for example, benzenesulfonyl and the like), alkylsilyl groups (preferably alkylsilyl groups having 1 to 20 carbon atoms, for example, monomethylsilyl, dimethylsilyl, trimethylsilyl, triethylsilyl, benzyldimethylsilyl, and the like), arylsilyl groups (preferably arylsilyl groups having 6 to 42 carbon atoms, for example, triphenylsilyl, dimethylphenylsilyl, and the like), phosphoryl groups (preferably phosphoric acid groups having 0 to 20 carbon atoms, for example, $—OP(═O)(R^P)_2$), phosphonyl groups (preferably phosphonyl groups having 0 to 20 carbon atoms, for example, $—P(═O)(R^P)_2$), phosphinyl groups (preferably phosphinyl groups having 0 to 20 carbon atoms, for example, $—P(R^P)_2$), a hydroxyl group, a mercapto group, a carboxyl group, a sulfo group, a cyano group, halogen atoms (for example, a fluorine atom, a chlorine atom, a bromine atom, an iodine atom, and the like).

In addition, in the respective groups exemplified as the substituent T, the substituent T may be further substituted. Examples thereof include aralkyl groups in which an alkyl group is substituted with an aryl group and halogenated alkyl groups in which an alkyl group is substituted with a halogen atom.

The linking group L is preferably a linking group made of hydrocarbon [an alkylene group having 1 to 10 carbon atoms (the number of carbon atoms is more preferably 1 to 6 and still more preferably 1 to 3), alkenylene group having 2 to 10 carbon atoms (the number of carbon atoms is more preferably 2 to 6 and still more preferably 2 to 4), an alkynylene group having 2 to 10 carbon atoms (the number of carbon atoms is more preferably 2 to 6 and still more preferably 2 to 4), an arylene group having 6 to 22 carbon atoms (the number of carbon atoms is more preferably 6 to 10), or a combination thereto], a linking group having a hetero atom [a carbonyl group (—CO—), a thiocarbonyl group (—CS—), an ether bond (—O—), a thioether bond (—S—), an imino group ($—NR^N—$ or $═NR^N$), an ammonium linking group ($—NR^N{}_2{}^+—$), a polysulfide group (the number of links of an S atom is preferably 2 to 8), a linking group in which a carbon atom is substituted with an imino bond ($R^N—N═C<$ or $—N═C(R^N)—$), a sulfonyl group ($—SO_2—$), a sulfinyl group (—SO—), a phosphoric acid linking group (—O—P)(OH)(O)—O—), a phosphonic acid linking group (—P(OH)(O)—O—), or a combination thereof], or a linking group obtained by combining these linking groups. Meanwhile, in a case in which substituents or linking groups are condensed together and thus form a ring, the linking group made of hydrocarbon may approximately form a double bond or a triple bond and link the groups. Rings being formed are preferably five-membered rings or six-membered rings. The five-membered rings are preferably nitrogen-containing five-membered rings, and examples thereof include a pyrrole ring, an imidazole ring, a pyrazole ring, an indazole ring, an indole ring, a benzimidazole ring, a pyrrolidine ring, an imidazolidine ring, a pyrazolidine ring, an indoline ring, a carbazole ring, and the like. Examples of the six-membered rings include a piperidine ring, a morpholine ring, a piperazine ring, and the like.

Meanwhile, when an aryl ring, a hetero ring, or the like is included, these rings may be a single ring or a condensed ring and may be, similarly, substituted or not substituted.

Here, $R^N$ represents a hydrogen atom or a substituent. Examples of the substituent include the substituent T, and an alkyl group (the number of carbon atoms is preferably 1 to 24, more preferably 1 to 12, still more preferably 1 to 6, and particularly preferably 1 to 3), an alkenyl group (the number of carbon atoms is preferably 2 to 24, more preferably 2 to 12, still more preferably 2 to 6, and particularly preferably 2 and 3), an alkynyl group (the number of carbon atoms is preferably 2 to 24, more preferably 2 to 12, still more preferably 2 to 6, and particularly preferably 2 and 3), an aralkyl group (the number of carbon atoms is preferably 7 to 22, more preferably 7 to 14, and particularly preferably 7 to 10), and an aryl group (the number of carbon atoms is preferably 6 to 22, more preferably 6 to 14, and particularly preferably 6 to 10) are preferred.

$R^P$ represents a hydrogen atom, a hydroxyl group, or a substituent other than a hydroxyl group. Examples of the substituent include the above-described substituent T, and an alkyl group (the number of carbon atoms is preferably 1 to 24, more preferably 1 to 12, still more preferably 1 to 6, and particularly preferably 1 to 3), an alkenyl group (the number of carbon atoms is preferably 2 to 24, more preferably 2 to 12, still more preferably 2 to 6, and particularly preferably 2 and 3), an alkynyl group (the number of carbon atoms is preferably 2 to 24, more preferably 2 to 12, still more preferably 2 to 6, and particularly preferably 2 and 3), an aralkyl group (the number of carbon atoms is preferably 7 to 22, more preferably 7 to 14, and particularly preferably 7 to 10), an aryl group (the number of carbon atoms is preferably 6 to 22, more preferably 6 to 14, and particularly preferably 6 to 10), an alkoxy group (the number of carbon atoms is preferably 1 to 24, more preferably 1 to 12, still more preferably 1 to 6, and particularly preferably 1 to 3), an alkenyl group (the number of carbon atoms is preferably 2 to 24, more preferably 2 to 12, still more preferably 2 to 6, and particularly preferably 2 and 3), an alkynyloxy group (the number of carbon atoms is preferably 2 to 24, more preferably 2 to 12, still more preferably 2 to 6, and particularly preferably 2 and 3), an aralkyloxy group (the number of carbon atoms is preferably 7 to 22, more preferably 7 to 14, and particularly preferably 7 to 10), and an aryloxy group (the number of carbon atoms is preferably 6 to 22, more preferably 6 to 14, and particularly preferably 6 to 10) are preferred.

The number of atoms constituting the linking group L is preferably 1 to 36, more preferably 1 to 24, still more preferably 1 to 12, and particularly preferably 1 to 6. The number of linking atoms in the linking group is preferably 10 or less and more preferably 8 or less. The lower limit is 1 or more.

Meanwhile, the number of atoms constituting the linking group L (the number of linking atoms) refers to the minimum number of atoms which are located in paths connecting the predetermined structural portions and participate in the linkage. For example, in the case of $—CH_2—C(═O)—O—$, the number of atoms constituting the linking group is six, but the number of linking atoms is three.

Specific examples of combinations of the linking groups include the following combinations: an oxycarbonyl bond (—OCO—), a carbonate bond (—OCOO—), an amide bond ($—CONR^N—$), an urethane bond ($—NR^NCOO—$), a urea bond ($—NR^NCONR^N—$), a (poly)alkyleneoxy bond (-(Lr- O)x-), a carbonyl (poly)oxyalkylene bond (—CO—(O-Lr)x-), a carbonyl (poly)alkyleneoxy bond (—CO-(Lr-O)x-), a carbonyloxy (poly)alkyleneoxy bond (—COO-(Lr-O)x-), a (poly)alkyleneimino bond (-(Lr-$NR^N$)x), an alkylene (poly)iminoalkylene bond (-Lr-($NR^N$-Lr)x-), a carbonyl (poly)iminoalkylene bond (—CO—($NR^N$-Lr)x-), a carbonyl (poly)alkyleneimino bond (—CO-(Lr-$NR^N$)x-), a (poly)ester bond (—(CO—O-Lr)x-, —(O—CO-Lr)x-, —(O-Lr-CO)x-, -(Lr-CO—O)x-, -(Lr-O—CO)x-), a (poly)amide bond (—(CO—$NR^N$-Lr)x-, —($NR^N$—CO-Lr)x-, —$NR^N$-Lr-CO)x-, -(Lr-CO—$NR^N$)x-, -(Lr-$NR^N$—CO)x-), and the like. x is an integer of 1 or more, preferably 1 to 500, and more preferably 1 to 100.

Lr is preferably an alkylene group, an alkenyl group, or an alkynylene group. The number of carbon atoms in Lr is preferably 1 to 12, more preferably 1 to 6, and particularly preferably 1 to 3 (here, for the alkenylene group and the alkynylene group, the lower limit of the number of carbon atoms is 2 or more). A plurality of Lr's, $R^N$'s, $R^P$'s, x's, and the like do not need to be identical to each other. The orientation of the linking groups is not limited to the above-described order and may be any orientation as long as the orientation is understood to be approximately in accordance with a predetermined chemical formula. For example, an amide bond (—CO$NR^N$—) is a carbamoyl bond (—$NR^N$CO—).

The electrolytic polymerizable compound being used in the present invention preferably has two or more electrolytic polymerization portions in the molecule since the number of crosslinking points increase and high bonding properties between the active material and the inorganic solid electrolyte are imparted.

The molecular weight of the electrolytic polymerizable compound being used in the present invention is less than 1,000 and more preferably 300 or more and less than 1,000.

Meanwhile, the molecular weight can be measured using a mass spectrometer (MS).

It is preferable that the electrolytic polymerizable compound being used in the present invention has a melting point at normal pressure of lower than 80° C. and a boiling point at normal pressure of 200° C. or higher.

Here, the normal pressure refers to 1 atmosphere and 101,325 Pa of the standard atmosphere.

The melting point at normal pressure is more preferably lower than 40° C. and still more preferably lower than 0° C. since the efficiency of electrolytic polymerization increases as the melting point at normal pressure decreases.

The boiling point at normal pressure is more preferably 250° C. or higher and still more preferably 300° C. or higher since, as the boiling point at normal pressure increases, the amount of the electrolytic polymerizable compound being volatilized during the manufacturing of solid batteries decreases, and the electrolytic polymerizable compound remains in the solid batteries, and thus the electrolytic polymerizable compound is electrolytic-polymerized, and sufficient performance cannot be exhibited.

Here, the melting point can be measured by means of differential scanning calorimetry (DSC), and the boiling point can be measured by means of gas chromatography.

The electrolytic polymerizable compound being used in the present invention is electrolytic-oxidation-polymerized or electrolytic-reduction-polymerized during the charging and discharging of the all solid state secondary battery, whereby a polymerized body is formed.

Specifically, in the electrolytic polymerizable compound, reduction polymerization is initiated from a charging and discharging potential ($Li/Li^+$-based) of 1.5 V or more and a polymerized body is formed in the negative electrode active material layer during the charging and discharging of the all solid state secondary battery. The charging and discharging potential at which reduction polymerization is initiated is preferably 1.7 V or more and more preferably 1.9 V or more.

In addition, in the electrolytic polymerizable compound, oxidation polymerization is initiated from a charging and discharging potential ($Li/Li^+$-based) of less than 4.5 V and a polymerized body is formed in the positive electrode active material layer during the charging and discharging of the all solid state secondary battery. The charging and discharging potential at which reduction polymerization is initiated is preferably less than 4.3 V and more preferably less than 4.2 V.

The charging and discharging potential may be specified from the peak. The peak of the potential can be specified by producing a three-pole cell made up of an operation electrode a reference electrode, and a counter electrode and carrying out an electrochemical measurement (cyclic voltammetry). The constitution of the three-pole cell and the measurement conditions of the electrochemical measurement are as described below.

<Constitution of Three-Pole Cell>

Operation electrode: An active material electrode produced on a platinum electrode using a sol-gel method or a sputtering method Reference electrode: Lithium Counter electrode: Lithium Dilution medium: EC/EMC=½ $LiPF_6$ 1 M, manufactured by Kishida Chemical Co., Ltd.

Here, EC represents ethylene carbonate, and EMC represents ethyl methyl carbonate.

<Measurement Conditions>

Scanning rate: 1 mV/s

Measurement temperature: 25° C.

The positive electrode potential ($Li/Li^+$-based) during charging and discharging is (Positive electrode potential)=(negative electrode potential)+(battery voltage).

In a case in which lithium titanate is used as the negative electrode, the negative electrode potential is set to 1.55 V. In a case in which graphite is used as the negative electrode, the negative electrode potential is set to 0.1 V. The battery voltage is observed during charging, and the positive electrode potential is computed.

In addition, in a case in which the sulfide-based solid electrolyte is used, the water content of the electrolytic polymerizable compound is preferably 100 ppm or less from the viewpoint of suppressing the generation of hydrogen sulfide attributed to a reaction between the sulfide-based solid electrolyte and water and a decrease in the ion conductivity.

The water content is computed by using an electrolytic polymerizable compound which has been dried in a vacuum at 80° C. as a specimen, measuring the amount (g) of moisture in the specimen using a Karl Fischer liquid AQUAMICRON AX (trade name, manufactured by Mitsubishi Chemical Corp.) and the Karl Fischer method, and dividing the measured amount (g) of moisture by the mass (g) of the specimen.

The content of the electrolytic polymerizable compound in the solid electrolyte composition is preferably 0.1 parts by mass or more, more preferably 0.3 parts by mass or more, and particularly preferably 1 part by mass or more with respect to 100 parts by mass of the inorganic solid electrolyte (including the active material in the case of being used).

The upper limit is preferably 20 parts by mass or less, more preferably 10 parts by mass or less, and particularly preferably 5 parts by mass or less.

The content of the electrolytic polymerizable compound in the solid content is preferably 0.1% by mass or more, more preferably 0.3% by mass or more, and particularly preferably 1% by mass or more of the solid electrolyte composition. The upper limit is preferably 20% by mass or less, more preferably 10% by mass or less, and particularly preferably 5% by mass or less.

When the amount of the electrolytic polymerizable compound being used is in the above-described range, it is possible to more effectively realize both of the bonding properties between the active material and the inorganic solid electrolyte and the properties of suppressing interface resistance.

Meanwhile, with the solid electrolyte composition of the present invention, not only the specific electrolytic polymerizable compound but also a binder described below or a variety of additives may be combined. The above-described content is specified as the total amount of the electrolytic polymerizable compound, but may be considered as the total amount of the electrolytic polymerizable compound being used in the present invention, the binder, and a variety of additives.

Hereinafter, a polymer having a molecular weight that is increased by the electrolytic oxidation polymerization or electrolytic reduction polymerization of the electrolytic polymerizable compound being used in the present invention (hereinafter, referred to as the electrolytic polymerization polymer) will be described.

(Electrolytic Polymerization Polymer)

The electrolytic polymerizable compound being used in the present invention is preferably used after being adjusted so that the electrolytic polymerization polymer being formed by means of electrolytic polymerization has physical properties described below.

The glass transition temperature (Tg) of the electrolytic polymerization polymer being used in the present invention is preferably lower than 50° C., more preferably −100° C. or higher and lower than 50° C., more preferably −80° C. or higher and lower than 30° C., and particularly preferably −80° C. or higher and lower than 0° C. When the glass transition temperature is in the above-described range, a favorable ion conductivity can be obtained.

The glass transition temperature is measured using a dried specimen and a differential scanning calorimeter "X-DSC7000" (trade name, SII•NanoTechnology Inc.) under the following conditions. The glass transition temperature of the same specimen is measured twice, and the measurement result of the second measurement is used.

Atmosphere of the measurement chamber: nitrogen (50 mL/min)

Temperature-increase rate: 5° C./min

Measurement-start temperature: −100° C.

Measurement-end temperature: 200° C.

Specimen plate: aluminum plate

Mass of the measurement specimen: 5 mg

Estimation of Tg: Tg is estimated by rounding off the middle temperature between the declination-start point and the declination-end point in the DSC chart to the integer.

The mass average molecular weight of the electrolytic polymerization polymer being used in the present invention is preferably 10,000 or more and less than 500,000, more preferably 15,000 or more and less than 200,000, and still more preferably 15,000 or more and less than 150,000.

When the mass average molecular weight of the polymer is in the above-described range, more favorable bonding properties develop.

As the mass average molecular weight of the electrolytic polymerization polymer being used in the present invention, a value measured by means of the following standard specimen conversion using gel permeation chromatography (GPC) is used. Regarding a measurement instrument and measurement conditions, the following conditions 1 are considered as the basic conditions, and the conditions 2 can be used depending on the solubility and the like of the specimen. Here, depending on the kind of the polymer, a more appropriate and proper carrier (eluent) and a column suitable for the above-described carrier may be selected and used.

(Conditions 1)

Measurement instrument: EcoSEC HLC-8320 (trade name, manufactured by Tosoh Corporation)

Column: Two columns of TOSOH TSKgel Super AWM-H (trade name, manufactured by Tosoh Corporation) are connected Carrier: 10 mM LiBr/N-methylpyrrolidone Measurement temperature: 40° C.

Carrier flow rate: 1.0 ml/min

Specimen concentration: 0.1% by mass

Detector: RI (refractive index) detector

Standard specimen: Polystyrene (Conditions 2)

Measurement instrument: Save as above

Column: A column obtained by connecting TOSOH TSKgel Super HZM-H,

TOSOH TSKgel Super HZ4000, and

TOSOH TSKgel Super HZ2000 (all are trade names, manufactured by Tosoh Corporation) is used Carrier: Tetrahydrofuran Measurement temperature: 40° C.

Carrier flow rate: 1.0 ml/min

Specimen concentration: 0.1% by mass

Detector: RI (refractive index) detector

Standard specimen: Polystyrene

Meanwhile, the electrolytic polymerization polymer may be any one of a block copolymer, an alternate copolymer, and a random copolymer.

The electrolytic polymerization polymer being formed in the vicinity of the active material more preferably does not easily hinder the conduction of electrons or ions. When the conduction of electrons or ions is hindered, resistance increases, and sufficient battery voltage cannot be obtained. From the viewpoint of this meaning, the electrolytic polymerization polymer being formed is preferably electron conductive rather than electron insulating.

Examples of electrolytic polymerizable compounds in which electron conductivity can be obtained by means of electrolytic polymerization include polythiophene, polyaniline, polypyrrole, polyacetylene, and monomer bodies thereof which are generally known as conductive polymers. That is, thiophene compounds, aniline compounds, pyrrole compounds, and acetylene compounds are preferred since electrolytic polymerization polymers being obtained are not insulating materials, and low resistance and high voltage can be obtained.

(Binder)

In the all solid state secondary battery of the present invention, at least one layer of the positive electrode active material layer, the negative electrode active material layer, or the inorganic solid electrolyte layer also preferably further contains a binder.

Generally, binders that can be used in the present invention are preferably binders being used as bonding agents for positive electrodes or negative electrodes of battery materials, are not particularly limited, and are preferably binders made of a resin described below.

Examples of fluorine-containing resins include polytetrafluoroethylene (PTFE), polyvinylene difluoride (PVdF), copolymers of polyvinylenedifluoride and hexafluoropropylene (PVdF-HFP), and the like.

Examples of hydrocarbon-based thermoplastic resins include polyethylene, polypropylene, styrene butadiene rubber (SBR), hydrogenated styrene butadiene rubber (HSBR), butylene rubber, acrylonitrile butadiene rubber, polybutadiene, polyisoprene, and the like.

These binders may be used singly or two or more binders may be used in combination.

The content of the binder is preferably 0.1 parts by mass or more, more preferably 0.3 parts by mass or more, and particularly preferably 1 part by mass or more with respect to 100 parts by mass of the solid electrolyte (including the active material in the case of being used). The upper limit is preferably 20 parts by mass or less, more preferably 10 parts by mass or less, and particularly preferably 5 parts by mass or less.

In the solid electrolyte composition for forming the positive electrode active material layer and the negative electrode active material layer, the content of the binder is preferably 0.1 parts by mass or more, more preferably 1 part by mass or more, and particularly preferably 10 parts by mass or more with respect to 100 parts by mass of the electrolytic polymerizable compound. The upper limit is preferably 100 parts by mass or less, more preferably 90 parts by mass or less, and particularly preferably 70 parts by mass or less.

In the solid electrolyte composition for forming the solid electrolyte layer, the content of the binder is preferably 50 parts by mass or more, more preferably 80 parts by mass or more, and particularly preferably 90 parts by mass or more with respect to 100 parts by mass of the electrolytic polymerizable compound. The upper limit is preferably 500 parts by mass or less, more preferably 400 parts by mass or less, and particularly preferably 350 parts by mass or less.

(Polymerization Initiator)

In the all solid state secondary battery of the present invention, at least one layer of the positive electrode active material layer, the negative electrode active material layer, or the inorganic solid electrolyte layer also preferably further contains a polymerization initiator.

The polymerization initiator is preferably a polymerization initiator which is decomposed by one electron oxidation or one electron reduction in portions in which migration of electrons may occur such as the positive electrode active material, the negative electrode active material, the conduction aid, and the collector and generates radicals or cations and, in the present invention, this polymerization initiator will be referred to as the electrolytic polymerization initiator. As the above-described electrolytic polymerization initiator, an arbitrary photopolymerization initiator exhibits the same effects.

The photopolymerization initiator is preferably a photo-radical polymerization initiator, and examples thereof include aromatic ketones, acylphosphine oxide compounds, aromatic onium salt compounds, organic peroxides, thio compounds, hexaarylbiimidazole compounds, ketoxime ester compounds, borate compounds, azinium compounds, metallocene compounds, active ester compounds, compounds having a carbon halogen bond, α-aminoketone compounds, and alkylamine compounds.

Examples of the photo-radical polymerization initiator include the radical polymerization initiators described in Paragraphs 0135 to 0208 of JP2006-085049A.

Due to excellent polymerization rates, the photo-radical polymerization initiator is preferably a photo-radical polymerization initiator selected from the group consisting of acylphosphine oxide compounds, ketoxime ester compounds, compounds having a carbon halogen bond, and α-aminoketone compounds and more preferably a photo-radical polymerization initiator selected from the group consisting of α-aminoketone compounds and acylphosphine oxide compounds. Meanwhile, the photo-radical polymerization initiator particularly preferably contains both of an α-aminoketone compound and an acylphosphine oxide compound in terms of the polymerization rate.

Examples of the acylphosphine oxide compounds include the compounds described in JP1988-40799B (JP-S63-40799B), JP1993-29234B (JP-H05-29234B), JP1998-95788A (JP-H10-95788A), JP1998-29997A (JP-H10-29997A), and the like.

As the acylphosphine oxide compounds, arbitrary commercially available products may be used, and examples of the commercially available products include IRGACURE (registered trademark) series and DAROCUR (registered trademark) series manufactured by BASF, for example, IRGACURE 819, IRGACURE 1800, IRGACURE 1870, DAROCU TPO (all trade names) and the like.

Examples of the ketoxime ester compounds include the compounds described in JP2006-516246A, JP2001-233842A, JP2004-534797A, JP2005-097141A, JP2006-342166A, and the like.

Examples of the compounds having a carbon halogen bond include triazine compounds, for example, the compounds described in JP1996-269049A (JP-H08-269049A), JP2005-503545A, Non-Patent Document J. Am. Chem. Soc., 1999, 121, pp. 6167 to 6175, and the like.

Examples of the α-aminoketone compounds include 2-methyl-1-phenyl-2-morpholinopropane-1-one, 2-methyl-1-[4-(hexyl)phenyl]-2-morpholinopropane-i-one, 2-ethyl-2-dimethylamino-1-(4-morpholinophenyl)-butanone, and the like.

As the α-aminoketone compounds, arbitrary commercially available products may be used, and examples of the commercially available products include IRGACURE (registered trademark) series and DAROCUR (registered trademark) series manufactured by BASF (for example, IRGACURE 907, 369, 379, and the like).

In addition, as the photopolymerization initiator, a photo-cationic polymerization initiator can also be preferably used.

Examples of the photo-cationic polymerization initiator include onium salt compounds such as ammonium salts, pyrylium salts, diazonium salts, phosphonium salts, sulfonium salts, and iodonium salts and sulfonate compounds such as imidosulfonate, oxime sulfonate, diazodisulfone, disulfone, and o-nitrobenzyl sulfonate.

As the kind of the photo-cationic polymerization initiator that can be used in the all solid state secondary battery of the present invention, specific compounds, and preferred examples, the compounds described in Paragraphs 0066 to 0122 of JP2008-13646A can be referred to.

Among the photo-cationic polymerization initiators, onium salt compounds are preferred, and sulfonium salts, iodonium salts, ammonium salts, and pyrylium salts are more preferred.

The photo-cationic polymerization initiators that can be used in the all solid state secondary battery of the present invention is particularly preferably a sulfonium salt represented by Formula (1) below. When the solid electrolyte composition of the present invention and the sulfonium salt represented by Formula (1) are jointly used, more favorable electrolytic polymerization properties can be obtained, and the battery voltage and cycle characteristics of the all solid state secondary battery improve.

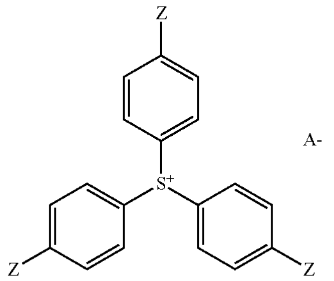

(I)

In Formula (1), $A^-$ represents an anion. Z represents a hydrogen atom, an alkyl group, an aryl group, a hydroxyl group, a halogen atom, an alkoxy group, an aryloxy group, an alkylthio group, or an arylthio group.

Examples of the anion (anion) represented by $A^-$ include sulfonate anions (for example, an alkylsulfonate anion and an arylsulfonate anion), benzoylformate anions, $PF_6^-$, $SbF_6^-$, $BF_4^-$, $ClO_4^-$, carboxylate anions (for example, an alkyl carboxylate anion, an aryl carboxylate anion, and an aralkyl carboxylate anion), sulfinate anions, sulfate anions, borate anions, sulfonylimide anions, bis(alkylsulfonyl) imide anions, tris(alkylsulfonyl) methyl anions, halogen anions, polymer-type sulfonate anions, polymer-type carboxylate anions, tetraaryl borate anions, fluoride ions, chloride ions, bromide ions, iodide ions, and the like.

Among these, non-nucleophilic anions are preferred.

The non-nucleophilic anions refer to anions having a remarkably low capability of developing nucleophilic reactions and capable of suppressing aging decomposition caused by intramolecular nucleophilic reactions. That is, the non-nucleophilic anions are anions that do not voluntarily cause intramolecular nucleophilic reactions when the solid electrolyte composition, the electrode sheet for a battery, and the all solid state secondary battery of the present invention are stored at −20° C. to 60° C.

Preferred examples of the non-nucleophilic anions include $PF_6^-$, $SbF_6^-$, $BF_4^-$, sulfonylimide anion, bis(alkylsulfonyl) imide anion, tris(alkylsulfonyl) methyl anion, and tetraaryl borate anion.

The content of the electrolytic polymerization initiator is preferably 0.1 parts by mass or more, more preferably 0.5 parts by mass or more, and particularly preferably 1 part by mass or more with respect to 100 parts by mass of the electrolytic polymerizable compound. The upper limit is preferably 50 parts by mass or less, more preferably 20 parts by mass or less, and particularly preferably 10 parts by mass or less.

(Lithium Salt)

In the all solid state secondary battery of the present invention, at least one layer of the positive electrode active material layer, the negative electrode active material layer, or the inorganic solid electrolyte layer also preferably further contains a lithium salt.

Lithium salts that can be used in the present invention are preferably lithium salts being ordinarily used in this kind of products and are not particularly limited, and preferred examples thereof include the following salts.

(L-1) Inorganic Lithium Salts

Examples thereof include the following compounds.

Inorganic fluoride salts such as $LiPF_6$, $LiBF_4$, $LiAsF_6$, and $LiSbF_6$

Perhalogen acids such as $LiClO_4$, $LiBrO_4$, and $LiIO_4$

Inorganic chloride salts such as $LiAlCl_4$ (L-2) Fluorine-Containing Organic Lithium Salts Examples thereof include the following compounds.

Perfluoroalkanesulfonate salts such as $LiCF_3SO_3$

Perfluoroalkanesulfonylimide salts such as $LiN(CF_3SO_2)_2$, $LiN(CF_3CF_2SO_2)_2$, $LiN(FSO_2)_2$, $LiN(CF_3SO_2)(C_4F_9SO_2)$ Perfluoroalkanesulfonyl methide salts such as $LiC(CF_3SO_2)_3$ Fluoroalkyl fluorophosphates salts such as $Li[PF_5(CF_2CF_2CF_3)]$, $Li[PF_4(CF_2CF_2CF_3)_2]$, $Li[PF_3(CF_2CF_2CF_3)_3]$, $Li[PF_5(CF_2CF_2CF_2CF_3)]$, $Li[PF_4(CF_2CF_2CF_2CF_3)_2]$, and $Li[PF_3(CF_2CF_2CF_2CF_3)_3]$ (L-3) Oxalate Borate Salts Examples thereof include the following compounds.

Lithium bis(oxalato)borate, lithium difluorooxalatoborate, and the like

Among these, $LiPF_6$, $LiBF_4$, $LiAsF_6$, $LiSbF_6$, $LiClO_4$, $Li(Rf^1SO_3)$, $LiN(Rf^1SO_2)_2$, $LiN(FSO_2)_2$, and $LiN(Rf^1SO_2)(Rf^2SO_2)$ are preferred, and lithium imide salts such as $LiPF_6$, $LiBF_4$, $LiN(Rf^1SO_2)_2$, $LiN(FSO_2)_2$, and $LiN(Rf^1SO_2)(Rf^2SO_2)$ are more preferred. Here, $Rf^1$ and $Rf^2$ each independently represent a perfluoroalkyl group.

Meanwhile, these lithium salts may be used singly or two or more lithium salts may be arbitrarily combined together.

The content of the lithium salt is preferably more than parts by mass and more preferably 5 parts by mass or more with respect to 100 parts by mass of the solid electrolyte. The upper limit is preferably 50 parts by mass or less and more preferably 20 parts by mass or less.

(Dispersion Medium)

In the solid electrolyte composition of the present invention, a dispersion medium dispersing the respective components described above may be used. Examples of the dispersion medium include water-soluble organic media. Specific examples of the dispersion medium include the following media.

Examples of alcohol compound solvents include methyl alcohol, ethyl alcohol, 1-propyl alcohol, 2-propyl alcohol, 2-butanol, ethylene glycol, propylene glycol, glycerin, 1,6-hexanediol, cyclohexanediol, sorbitol, xylitol, 2-methyl-2,4-pentanediol, 1,3-butanediol, and 1,4-butanediol.

Examples of ether compound solvents include alkylene glycol alkyl ethers (ethylene glycol monomethyl ether, ethylene glycol monobutyl ether, diethylene glycol, dipropylene glycol, propylene glycol monomethyl ether, diethylene glycol monomethyl ether, triethylene glycol, polyethylene glycol, dipropylene glycol monomethyl ether, tripropylene glycol monomethyl ether, diethylene glycol monobutyl ether, and the like), dimethyl ether, diethyl ether, tetrahydrofuran, cyclopentyl methyl ether, dimethoxyethane, and 1,4-dioxane.

Examples of amide compound solvents include N,N-dimethylformamide, N-methyl-2-pyrrolidone, N-ethyl-2-pyrrolidone, 2-pyrrolidinone, 1,3-dimethyl-2-imidazolidinone, ε-caprolactam, formamide, N-methylformamide, acetamide, N-methylacetamide, N,N-dimethylacetamide, N-methylpropionamide, and hexamethylphosphoric triamide.

Examples of ketone compound solvents include acetone, methyl ethyl ketone, methyl isobutyl ketone, diethyl ketone, dipropyl ketone, diisopropyl ketone, diisobutyl ketone, and cyclohexanone.

Examples of aromatic compound solvents include benzene, toluene, xylene, chlorobenzene, and dichlorobenzene.

Examples of aliphatic compound solvents include hexane, heptane, octane, decane, and dodecane.

Examples of ester compound solvents include ethyl acetate, propyl acetate, butyl acetate, ethyl butyrate, butyl butyrate, butyl valerate, γ-butyrolactone, heptane, and the like.

Examples of carbonate compound solvents include ethylene carbonate, dimethyl carbonate, diethyl carbonate, ethyl methyl carbonate, propylene carbonate, and the like.

Examples of nitrile compound solvents include acetonitrile, propionitrile, butyronitrile, isobutyronitrile, and benzonitrile.

In the present invention, among these, the ether compound solvents, the ketone compound solvents, the aromatic compound solvents, the aliphatic compound solvents, and the ester compound solvents are preferably used, and the aromatic compound solvents and the aliphatic compound solvents are more preferably used. The boiling point of the dispersion medium at normal pressure (one atmosphere) is preferably 50° C. or higher and more preferably 80° C. or higher. The upper limit is preferably 250° C. or lower and more preferably 220° C. or lower. The dispersion media may be used singly or two or more dispersion media may be used in combination.

In the present invention, the amount of the dispersion medium in the solid electrolyte composition can be set to an arbitrary amount in consideration of the viscosity and the drying load of the solid electrolyte composition. Generally, the amount in the solid electrolyte composition is preferably 20 to 99% by mass.

(Positive Electrode Active Material)

To the solid electrolyte composition of the present invention, a positive electrode active material may be added. The solid electrolyte composition containing the positive electrode active material can be used as a composition for positive electrode materials. As the positive electrode active material, transition metal oxides are preferably used, and, among these, the positive electrode active material preferably has transition metals $M^a$ (one or more elements selected from Co, Ni, Fe, Mn, Cu, and V). In addition, mixing elements $M^b$ (metal elements belonging to Group I (Ia) of the periodic table other than lithium, elements belonging to Group II (IIa), Al, Ga, In, Ge, Sn, Ph, Sb, Bi, Si, P, B, and the like) may be mixed into the positive electrode active material.

Examples of the transition metal oxides include specific transition metal oxides including transition metal oxides represented by any one of Formulae (MA) to (MC) below and additionally include $V_2O_5$, $MnO_2$, and the like. As the positive electrode active material, a particulate positive electrode active material may be used.

Specifically, transition metal oxides capable of reversibly intercalating and deintercalating lithium ions can be used, and the specific transition metal oxides described above are preferably used.

Preferred examples of the transition metal oxides include oxides including the transition metal element $M^a$ and the like. At this time, the mixing elements $M^b$ (preferably Al) may be mixed into the positive electrode active material. The amount mixed is preferably 0 to 30 mol % with respect to the amount of the transition metal. Transition metal oxides synthesized by mixing Li and the transition metal so that the molar ratio of $Li/M^a$ reaches 0.3 to 2.2 are more preferred.

[Transition Metal Oxide Represented by Formula (MA) (Bedded Salt-Type Structure)]

As lithium-containing transition metal oxides, among them, transition metal oxides represented by Formula (MA) below are preferred.

$Li_{aa}M^1O_{bb}$ Formula (MA)

In Formula (MA), $M^1$ is the same as $M^a$, and a preferred range thereof is also identical. aa represents 0 to 1.2 (preferably 0.2 to 1.2) and is preferably 0.6 to 1.1. bb represents 1 to 3 and is preferably 2. A part of $M^1$ may be substituted with the mixing element $M^b$.

The transition metal oxides represented by Formula (MA) typically have a bedded salt-type structure.

The transition metal oxides represented by Formula (MA) are more preferably transition metal oxides represented by individual formulae described below.

$Li_gCoO_k$ Formula (MA-1)

$Li_gNiO_k$ Formula (MA-2)

$Li_gMnO_k$ Formula (MA-3)

$Li_gCo_jNi_{1-j}O_k$ Formula (MA-4)

$Li_gNi_jMn_{1-j}O_k$ Formula (MA-5)

$Li_gCo_jNi_iAl_{1-j-i}O_k$ Formula (MA-6)

$Li_gCo_jNi_iMn_{1-j-i}O_k$ Formula (MA-7)

Here, g is the same as aa and a preferred range thereof is also identical. j represents 0.1 to 0.9. i represents 0 to 1. Here, 1-j-i reaches 0 or more, k is the same as bb, and a preferred range thereof is also identical.

Specific examples of these transition metal oxides include $LiCoO_2$ (lithium cobalt oxide [LCO]), $LiNi_2O_2$ (lithium nickelate), $LiNi_{0.85}Co_{0.01}Al_{0.05}O_2$ (lithium nickel cobalt aluminum oxide [NCA]), $LiNi_{0.33}Co_{0.33}Mn_{0.33}O_2$ (lithium nickel manganese cobalt oxide [NMC]), and $LiNi_{0.5}Mn_{0.5}O_2$ (lithium manganese nickelate).

Although there is partial duplication in expression, preferred examples of the transition metal oxides represented by Formula (MA) include transition metal oxides represented by the following formulae when expressed in a different manner.

$Li_gNi_{xc}Mn_{yc}Co_{zc}O_2$ ($xc>0.2$, $yc>0.2$, $zc\geq0$, $xc+yc+zc=1$) (i)

Typical Transition Metal Oxides:

$Li_gNi_{1/3}Mn_{1/3}Co_{1/3}O_2$ $Li_gNi_{1/2}Mn_{1/2}O_2$ $Li_gNi_{xc}Co_{yd}Al_{zd}O_2$ ($xd>0.7$, $yd>0.1$, $0.1>zd\geq0.05$, $xd+yd+zd=1$) (ii)

Typical Transition Metal Oxides:

$Li_gNi_{0.8}Co_{0.15}Al_{0.05}O_2$

[Transition Metal Oxide Represented by Formula (MB) (Spinel-Type Structure)]

As lithium-containing transition metal oxides, among them, transition metal oxides represented by Formula (MB) below are also preferred.

$Li_{cc}M^2{}_2O_{dd}$ Formula (MB)

In Formula (MB), $M^2$ is the same as $M^a$, and a preferred range thereof is also identical. cc represents 0 to 2 and is preferably 0.2 to 2 and more preferably 0.6 to 1.5. dd represents 3 to 5 and is preferably 4.

The transition metal oxides represented by Formula (MB) are more preferably transition metal oxides represented by individual formulae described below.

$Li_{mm}Mn_2O_{nn}$ Formula (MB-1)

$Li_{mm}Mn_{pp}Al_{2-pp}O_{nn}$ Formula (MB-2)

$Li_{mm}Mn_{pp}Ni_{2-pp}O_{nn}$ Formula (MB-3)

mm is the same as cc and a preferred range thereof is also identical. nn is the same as dd and a preferred range thereof is also identical. pp represents 0 to 2.

Examples of these transition metal oxides include $LiMn_2O_4$, $LiMn_{1.5}Ni_{0.5}O_4$.

Preferred examples of the transition metal oxides represented by Formula (MB) further include transition metal oxides represented by individual formulae described below.

$LiCoMnO_4$ Formula (a)

$Li_2FeMn_3O_8$ Formula (b)

$Li_2CuMn_3O_8$ Formula (c)

$Li_2CrMn_3O_8$ Formula (d)

$Li_2NiMn_3O_8$ Formula (e)

From the viewpoint of a high capacity and a high output, among the above-described transition metal oxides, electrodes including Ni are still more preferred.

[Transition Metal Oxide Represented by Formula (MC)]

Lithium-containing transition metal oxides are preferably lithium-containing transition metal phosphorus oxides, and, among these, transition metal oxides represented by Formula (MC) below are also preferred.

$Li_{ee}M^3(PO_4)_{ff}$ Formula (MC)

In Formula (MC), ee represents 0 to 2 (preferably 0.2 to 2) and is preferably 0.5 to 1.5. ff represents 1 to 5 and is preferably 1 to 2.

$M^3$ represents one or more elements selected from the group consisting of V, Ti, Cr, Mn, Fe, Co, Ni, and Cu. $M^3$ may be substituted with not only the mixing element $M^b$ but also other metal such as Ti, Cr, Zn, Zr, or Nb. Specific examples include olivine-type iron phosphate salts such as $LiFePO_4$ and $Li_3Fe_2(PO_4)_3$, iron pyrophosphates such as $LiFeP_2O_7$, cobalt phosphates such as $LiCoPO_4$, monoclinic nasicon-type vanadium phosphate salt such as $Li_3V_2(PO_4)_3$ (lithium vanadium phosphate).

Meanwhile, the aa, cc, g, mm, and ee values representing the composition of Li are values that change due to charging and discharging and are, typically, evaluated as values in a stable state when Li is contained. In Formulae (a) to (e), the composition of Li is expressed using specific values, but these values also change due to the operation of batteries.

The average particle diameter of the positive electrode active material being used in the all solid state secondary battery of the present invention is not particularly limited. Meanwhile, the average particle diameter is preferably 0.1 μm to 50 μm. In order to provide a predetermined particle diameter to the positive electrode active material an ordinary crusher or classifier may be used. Positive electrode active materials obtained using a firing method may be used after being washed with water, an acidic aqueous solution, an alkaline aqueous solution, or an organic solvent. The average particle diameter of the positive electrode active material particles is measured using the same method as the method for measuring the average particle diameter of inorganic solid electrolyte particles described in the section of examples described below.

The concentration of the positive electrode active material is not particularly limited. Meanwhile, the concentration in the solid electrolyte composition is preferably 20 to 90% by mass and more preferably 40 to 80% by mass with respect to 100% by mass of the solid component. Meanwhile, when a positive electrode layer includes another inorganic solid (for example, a solid electrolyte), the above-described concentration is interpreted to include the concentration of the inorganic solid.

(Negative Electrode Active Material)

To the solid electrolyte composition of the present invention, a negative electrode active material may be added. The solid electrolyte composition containing the negative electrode active material can be used as a composition for negative electrode materials. As the negative electrode active material, negative electrode active materials capable of reversibly intercalating and deintercalating lithium ions are preferred. These materials are not particularly limited, and examples thereof include carbonaceous materials, metal oxides such as tin oxide and silicon oxide, metal complex oxides, a lithium single body or lithium alloys such as lithium aluminum alloys, metals capable of forming alloys with lithium such as Sn and Si, and the like. These materials may be used singly or two or more materials may be jointly used in an arbitrary combination and fractions. Among these, carbonaceous materials or lithium complex oxides are preferably used in terms of safety. In addition, the metal complex oxides are preferably capable of absorbing and emitting lithium. The materials are not particularly limited, but preferably contain at least one atom selected from titanium or lithium as a constituent component from the viewpoint of high-current density charging and discharging characteristics.

The carbonaceous materials being used as the negative electrode active material are materials substantially made of carbon. Examples thereof include petroleum pitch, natural graphite, artificial graphite such as highly oriented pyrolytic graphite, and carbonaceous material obtained by firing a variety of synthetic resins such as PAN-based resins or furfuryl alcohol resins. Furthermore, examples thereof also include a variety of carbon fibers such as PAN-based carbon fibers, cellulose-based carbon fibers, pitch-based carbon fibers, vapor-grown carbon fibers, dehydrated PVA-based carbon fibers, lignin carbon fibers, glassy carbon fibers, and active carbon fibers, mesophase microspheres, graphite whisker, flat graphite, and the like.

These carbonaceous materials can also be classified into non-graphitizable carbon materials and graphite-based carbon materials depending on the degree of graphitization. In addition, the carbonaceous materials preferably have the surface separation, the density, and the sizes of crystallites described in JP1987-22066A (JP-S62-22066A), JP1990-6856A (JP-H02-6856A), and JP1991-45473A (JP-H03-45473A). The carbonaceous materials do not need to be a sole material, and it is also possible to use the mixtures of a natural graphite and a synthetic graphite described in JP1993-90844A (JP-H05-90844A), the graphite having a coated layer described in JP1994-4516A (JP-H06-4516A), and the like.

The metal oxides and the metal complex oxides being applied as the negative electrode active material are particularly preferably amorphous oxides, and furthermore, chalcogenides which are reaction products between a metal element and an element belonging to Group XVI of the periodic table are also preferably used. The amorphous oxides mentioned herein refer to oxides having a broad scattering band having a peak of a 2θ value in a range of 20° to 40° in an X-ray diffraction method in which CuKα rays are used and may have crystalline diffraction lines. The highest intensity in the crystalline diffraction line appearing at the 2θ value of 40° or more and 70° or less is preferably 100 times or less and more preferably five times or less of the diffraction line intensity at the peak of the broad scattering line appearing at the 2θ value of 20° or more and 40° or less and still more preferably does not have any crystalline diffraction lines.

In a compound group consisting of the amorphous oxides and the chalcogenides, amorphous oxides of semimetal elements and chalcogenides are more preferred, and elements belonging to Groups XIII (IIIB) to XV (VB) of the periodic table, oxides made of one element or a combination of two or more elements of Al, Ga, Si, Sn, Ge, Pb, Sb, and Bi, and chalcogenides are still more preferred. Specific examples of preferred amorphous oxides and chalcogenides include $Ga_2O_3$, SiO, GeO, SnO, $SnO_2$, PbO, $PbO_2$, $Pb_2O_3$, $Pb_2O_4$, $Pb_3O_4$, $Sb_2O_3$, $Sb_2O_4$, $Sb_2O_5$, $Bi_2O_3$, $Bi_2O_4$, $SnSiO_3$, GeS, SnS, $SnS_2$, PbS, $PbS_2$, $Sb_2S_3$, $Sb_2S_5$, $SnSiS_3$, and the like. In addition, these amorphous oxides may be complex oxides with lithium oxide, for example, $Li_2SnO_2$.

The average particle diameter of the negative electrode active material is preferably 0.1 μm to 60 μm. In order to provide a predetermined particle diameter, a well-known crusher or classifier is used. For example, a mortar, a ball mill, a sand mill, an oscillatory ball mill, a satellite ball mill, a planetary ball mill, a swirling airflow-type jet mill, a sieve, or the like is preferably used. During crushing, it is also possible to carry out wet-type crushing in which water or an organic solvent such as methanol is made to coexist as necessary. In order to provide a desired particle diameter, classification is preferably carried out. The classification method is not particularly limited, and it is possible to use a sieve, a wind powder classifier, or the like depending on the necessity. Both of dry-type classification and wet-type classification can be carried out. The average particle diameter of the negative electrode active material particles is measured using the same method as the method for measuring the average particle diameter of the inorganic solid electrolyte particles described in the section of examples described below.

The compositional formula of the compound obtained using the firing method can be computed using inductively coupled plasma (ICP) emission spectrometry as the measurement method or from the mass difference of powder before and after firing as a convenient method.

Preferred examples of negative electrode active materials that can be jointly used in the amorphous oxide negative electrode active material mainly containing Sn, Si, or Ge include carbon materials capable of absorbing and emitting lithium ions or lithium metals, lithium alloys, and metals capable of forming alloys with lithium.

The negative electrode active material preferably contains titanium atoms. More specifically, $Li_4Ti_5O_{12}$ is preferred since the volume fluctuation during the absorption and emission of lithium ions is small and thus the high-speed charging and discharging characteristics are excellent and the deterioration of electrodes is suppressed, whereby it becomes possible to improve the service lives of lithium ion secondary batteries. When a specific negative electrode and, furthermore, a specific electrolytic solution are combined together, the stability of secondary batteries improves under a variety of operation conditions.

In the all solid state secondary battery of the present invention, it is also preferable to apply negative electrode active materials containing Si elements. Generally, Si negative electrodes are capable of absorbing a larger number of Li ions than current carbon negative electrodes (graphite, acetylene black, and the like). That is, since the amount of Li ions absorbed per mass increases, it is possible to increase the battery capacities. As a result, there is an advantage of becoming capable of elongating the battery-operating time, and the use in vehicle batteries and the like is expected in the future. On the other hand, it is known that the volume significantly changes due to the absorption and emission of Li ions, and there is also an example in which the volume expands approximately 1.2 to 1.5 times in carbon negative electrodes, but expands approximately three times in Si negative electrodes. Repetition of this expansion and contraction (repetition of charging and discharging) leads to insufficient durability of electrode layers, and examples thereof include a likelihood of the occurrence of insufficient contact and shortening of the cycle service lives (battery service lives).

According to the solid electrolyte composition of the present invention, favorable durability (strength) is exhibited even in electrode layers which significantly expand or contract, and it is possible to more effectively exhibit the excellent advantages.

The concentration of the negative electrode active material is not particularly limited, but is preferably 10 to 80% by mass and more preferably 20 to 70% by mass with respect to 100% by mass of the solid component in the solid electrolyte composition. Meanwhile, when a negative electrode layer includes another inorganic solid (tbr example, a solid electrolyte), the above-described concentration is interpreted to include the concentration of the inorganic solid.

Meanwhile, in the above-described embodiment, an example in which the positive electrode active material or the negative electrode active material is added to the solid electrolyte composition according to the present invention has been described, but the present invention is not interpreted to be limited thereto.

For example, paste including a positive electrode active material or a negative electrode active material may be prepared using an ordinary binder instead of the specific electrolytic polymerizable compound described above. Here, in the present invention, it is preferable to combine the specific electrolytic polymerizable compound described above with the positive electrode active material or the negative electrode active material and use the combination as described above.

In addition, to the active material layers in the positive electrode and the negative electrode, a conduction aid may be appropriately added as necessary. As an ordinary conduction aid, it is possible to add graphite, carbon black, acetylene black, Ketjenblack, a carbon fiber, metal powder, a metal fiber, a polyphenylene derivative, or the like as an electron-conducting material.

<Collector (Metal Foil)>

The collector of the positive or negative electrode is preferably an electron conductor that does not chemically change. The collector of the positive electrode is preferably a collector obtained by treating the surface of aluminum or stainless steel with carbon, nickel, titanium, or silver in addition to aluminum, stainless steel, nickel, titanium, or the like, and, among these, aluminum and aluminum alloys are more preferred. The collector of the negative electrode is preferably aluminum, copper, stainless steel, nickel, or titanium and more preferably aluminum, copper, or a copper alloy.

Regarding the shape of the collector, generally, collectors having a film sheet-like shape are used, but it is also possible to use nets, punched collectors, lath bodies, porous bodies, foams, compacts of fiber groups, and the like.

The thickness of the collector is not particularly limited, but is preferably 1 μm to 500 μm. In addition, the surface of the collector is preferably provided with protrusions and recesses by means of a surface treatment.

<Production of All Solid State Secondary Battery>

The all solid state secondary battery may be produced using an ordinary method. Specific examples thereof include a method in which the solid electrolyte composition of the present invention is applied onto a metal foil that serves as the collector and an electrode sheet for a battery on which a coated film is formed is produced.

For example, a composition serving as a positive electrode material is applied onto a metal foil which is the positive electrode collector and then dried, thereby forming a positive electrode active material layer. Next, the solid electrolyte composition is applied onto a positive electrode sheet for a battery and then dried, thereby forming a solid electrolyte layer. Furthermore, a composition serving as a negative electrode material is applied and dried thereon, thereby forming a negative electrode active material layer. A collector (metal foil) for the negative electrode is overlaid thereon, whereby it is possible to obtain a structure of the all solid state secondary battery in which the solid electrolyte layer is sandwiched between the positive electrode layer and the negative electrode layer. Meanwhile, the respective compositions described above may be applied using an ordinary method. At this time, after the application of each of the composition forming the positive electrode active material layer, the composition forming the inorganic solid electrolyte layer (the solid electrolyte composition), and the composition forming, the negative electrode active material layer, a drying treatment may be carried out or the drying treatment may be carried out after the application of multiple layers. The drying temperature is not particularly limited, but is preferably 30° C. or higher and more preferably 60° C. or higher. The upper limit is preferably 300° C. or lower, more preferably 250° C. or lower, and still more preferably 200° C. or lower from the viewpoint of suppressing the volatilization of the electrolytic polymerizable compound being used in the present invention. When the compositions are heated in the above-described temperature range, it is possible to remove the dispersion medium and cause the compositions to fall into a solid state. When the all solid state secondary battery produced above is polymerized as described below, it is possible to obtain all solid state secondary batteries exhibiting a favorable ion conductivity and favorable cycle characteristics.

<Production of All Solid State Secondary Battery Formed by Polymerizing Electrolytic Polymerizable Compound by Means of Charging and Discharging>

The all solid state secondary battery of the present invention contains the electrolytic polymerizable compound that forms a polymerized body by means of electrolytic oxidation polymerization or electrolytic reduction polymerization. Therefore, when the all solid state secondary battery manufactured using the above-described method is charged or discharged at least once, it is possible to obtain all solid state secondary batteries formed by polymerizing the electrolytic polymerizable compound.

The electrolytic polymerization polymer is formed by the action of oxidation and reduction by electrons and is thus formed on the active material surface or the conduction aid surface in the positive electrode active material layer or the negative electrode active material layer serving as an electron shuttle. Specifically, the electrolytic polymerization polymer is formed by means of polymerization of the electrolytic polymerizable compound being contained in the positive electrode active material layer or the negative electrode active material layer together with the inorganic solid electrolyte on the electrode surface after the assembly of batteries. In addition, the electrolytic polymerizable compound may be polymerized intentionally by applying voltage before the first charging and discharging of batteries or may be formed in the charging and discharging process of batteries.

Compared with all solid state secondary batteries produced using a solid electrolyte composition containing a polymer, all solid state secondary batteries which are produced using the solid electrolyte composition containing the electrolytic polymerizable compound, electrolytic-polymerized by means of charging and discharging, and are polymerized have higher battery voltage (lower resistance) and superior cycle characteristics.

The reason therefor is not clear, but it is assumed that, whereas the polymer is uniformly present in the electrodes in the former all solid state secondary batteries, in the latter all solid state secondary batteries, the electrolytic polymerization polymer is formed in a high density in local portions of the surfaces of ions and electron active particles such as active materials or conduction aids, and thus the ion conduction is not hindered, and bonding properties are excellent.

In addition, an oxidized film or reduced film is formed between the inorganic solid electrolyte and the active material, whereby side reactions or decomposition between the active material and the inorganic solid electrolyte is suppressed, and this oxidized film or reduced film also improves bonding properties. Furthermore, the electrolytic polymerization polymer has an electric conductivity and thus also functions as a conduction aid and improves the electron conductivity. As a result, it is possible to provide all solid state secondary batteries which have excellent cycle characteristics and are capable of producing high voltage outputs.

Furthermore, in a case in which the sulfide-based inorganic solid electrolyte is used, particularly, it is possible to effectively suppress the decomposition of the inorganic solid electrolyte by water.

Here, in order to obtain the electrolytic polymerization polymer having effects of protecting favorable inorganic solid electrolytes and improving bonding properties and electron conductivity, the satisfaction of the following conditions is also preferably applied.

That is, the amount of the electrolytic polymerizable compound added is preferably small since the film thickness decreases, and the area of the electrolytic polymerization polymer in contact with the active materials is preferably large. In addition, the ball mill mixing time of the positive electrode or negative electrode composition is preferably longer since the interaction between the electrolytic polymerizable compound and the active materials improves.

<Applications of All Solid State Secondary Battery>

The all solid state secondary battery of the present invention can be applied to a variety of applications. Application aspects are not particularly limited, and, in the case of being mounted in electronic devices, examples thereof include notebook computers, pen-based input personal computers, mobile personal computers, e-book players, mobile phones, cordless phone handsets, pagers, handy terminals, portable faxes, mobile copiers, portable printers, headphone stereos, video movies, liquid crystal televisions, handy cleaners, portable CDs, mini discs, electric shavers, transceivers, electronic notebooks, calculators, memory cards, portable tape recorders, radios, backup power supplies, and the like. Additionally, examples of consumer applications include automobiles, electric vehicles, motors, lighting equipment, toys, game devices, road conditioners, watches, strobes, cameras, medical devices (pacemakers, hearing aids, shoulder massage devices, and the like), and the like. Furthermore, the all solid state secondary battery can be used for a variety of military applications and universe applications. In addition, the all solid state secondary battery can also be combined with solar batteries.

Among these, the all solid state secondary battery is preferably applied to applications for which a high capacity and high rate discharging characteristics are required. For example, in electricity storage facilities expected to have a high capacity in the future, high reliability becomes essential, and furthermore, the satisfaction of battery performance is required. In addition, high-capacity secondary batteries are mounted in electric vehicles and the like and are assumed to be used in domestic applications in which charging is carried out every day, and thus better reliability for overcharging is required. According to the present invention, it is possible to preferably cope with above-described application aspects and exhibit excellent effects.

According to the preferred embodiment of the present invention, individual application aspects as described below are derived.

(1) Solid electrolyte compositions including active materials capable of intercalating and deintercalating ions of metals belonging to Group I or II of the periodic table (electrode compositions for positive electrodes and negative electrodes)

(2) Electrode sheets for a battery in which a film of the solid electrolyte composition is formed on a metal foil (3) All solid state secondary batteries equipped with a positive electrode active material layer, a negative electrode active material layer, and a solid electrolyte layer in which at least any of the positive electrode active material layer, the negative electrode active material layer, or the solid electrolyte layer are layers constituted of the solid electrolyte composition (4) Methods for manufacturing electrode sheets for a battery in which the solid electrolyte composition is disposed on a metal foil, and a film thereof is formed (5) Methods for manufacturing an all solid state secondary battery in which all solid state secondary batteries are manufactured through the method for manufacturing an electrode sheet for a battery (6) All solid state secondary batteries formed by electrolytic oxidation-polymerizing or electrolytic reduction-polymerizing the electrolytic polymerizable compound by charging or discharging the all solid state secondary battery at least once In addition, in the preferred embodiment of the present invention, the electrolytic polymerization polymer is formed by means of charging and discharging after the manufacturing of the all solid state secondary battery, and thus it is possible to easily manufacture all solid state secondary batteries exhibiting effects of protecting the inorganic solid electrolyte and improving the bonding properties and electron conductivity at the same time.

All solid state secondary batteries refer to secondary batteries in hick the positive electrode, the negative electrode, and the electrolyte are all constituted of solid. In other words, all solid state secondary batteries are differentiated from electrolytic solution-type secondary batteries in which a carbonate-based solvent is used as the electrolyte. Among these, the present invention is assumed to be an inorganic all solid state secondary battery. All solid state secondary batteries are classified into organic (high-molecular-weight) all solid state secondary batteries in which a high-molecular-weight compound such as polyethylene oxide is used as the electrolyte and inorganic all solid state secondary batteries in which Li—P—S, LLT, LLZ, or the like is used. Meanwhile, the application of high-molecular-weight compounds to inorganic all solid state secondary batteries is not inhibited, and high-molecular-weight compounds can be applied as the positive electrode active material, the negative electrode active material, and the binder of the inorganic solid electrolyte particles.

Inorganic solid electrolytes are differentiated from electrolytes in which the above-described high-molecular-weight compound is used as an ion conductive medium (high-molecular-weight electrolyte), and inorganic compounds serve as ion conductive media. Specific examples thereof include Li—P—S, LLT, and LLZ. Inorganic solid electrolytes do not emit positive ions (Li ions) and exhibit an ion transportation function. In contrast, there are cases in which materials sewing as an ion supply source which is added to electrolytic solutions or solid electrolyte layers and emits positive ions (Li ions) are referred to as electrolytes; however, when differentiated from electrolytes as the ion transportation materials, the materials are referred to as “electrolyte salts” or “supporting electrolytes”. Examples of the electrolyte salts include lithium bistrifluoromethanesulfonylimide (LiTFSI).

In the present invention, “compositions” refer to mixtures obtained by mixing two or more components. Here, compositions may partially include agglomeration or uneven distribution as long as the compositions substantially maintain uniformity and exhibit desired effects.

Examples

Hereinafter, the present invention will be described in more detail on the basis of examples. Meanwhile, the present invention is not interpreted to be limited thereto. In the following examples, “parts” and “%” are mass-based unless particularly otherwise described.

[Synthesis of Electrolytic Polymerizable Compound of the Present Invention]

(Synthesis of Exemplary Compound 40)

Glycerin (9.2 g) was added to a 500 mL three-neck flask and was dissolved in dimethylacetamide (100 mL). Cyclopropanecarboxylic acid chloride (33.1 g) was added to the solution being stirred in an ice bath for 30 minutes while maintaining the inner temperature at 10° C. or lower, and the mixture was further stirred at room temperature for three hours. The obtained reaction solution was added to ethyl acetate (500 mL) and washed with saturated saline three times. The obtained organic layer was dried with magnesium sulfate and condensed under reduced pressure, thereby obtaining a coarse body (31.1 g). This coarse body was purified by means of column chromatography (developing solvent:hexane/ethyl acetate=4/1), thereby obtaining an electrolytic polymerizable compound illustrated as Exemplary Compound 40 (10.8 g) (light yellow oil).

(Synthesis of Exemplary Compound 44)

α,α,α'-tris(4-hydroxyphenyl)-1-ethyl-4-isopropylbenzene (manufactured by Tokyo Chemical industry Co., Ltd.) (10.2 g) was added to a 500 mL three-neck flask and was dissolved in dimethylacetamide (100 mL). Potassium carbonate (10 g) and propargyl bromide (manufactured by Tokyo Chemical Industry Co., Ltd.) (3.5 g) were added thereto and stirred at room temperature for two hours. The obtained reaction solution was added to ethyl acetate (500 mL) and washed with saturated saline three times. The obtained organic layer was dried with magnesium sulfate and then condensed under reduced pressure, thereby obtaining a coarse body (10.9 g). This coarse body was purified by means of column chromatography (developing solvent: hexane/ethyl acetate=8/1), thereby obtaining an electrolytic polymerizable compound illustrated as Exemplary Compound 44 (8.8 g) (light yellow oil).

Here, the molecular weights, boiling points and inciting points at normal pressure of electrolytic polymerizable compounds used in the examples are summarized in Table 4 below.

Meanwhile, the melting points were measured by means of differential scanning calorimetry (DSC), and the boiling points were measured by means of gas chromatography. ">350" in the table indicates that the boiling point is higher than 350° C.

Fritsch Japan Co., Ltd.), the all amount of the mixture of the lithium sulfide and the phosphorus pentasulfide was injected thereinto, and the container was completely sealed in an argon atmosphere. The container was set in a planetary ball mill P-7 (trade name) manufactured by Fritsch Japan Co. Ltd., mechanical milling was carried out at a temperature of 25° C. and a rotation speed of 510 rpm for 20 hours, thereby obtaining yellow powder (6.20 g) of a sulfide solid electrolyte material (Li—P—S-based glass).

Example 1

Manufacturing of Solid Electrolyte Composition (1) Manufacturing of Solid Electrolyte Composition (K-1)

180 zirconia beads having a diameter of 5 mm were injected into a 45 mL zirconia container (manufactured by Fritsch Japan Co., Ltd.), and an inorganic solid electrolyte LLZ ($Li_7La_3Zr_2O_{12}$, lithium lanthanum zirconate, average particle diameter: 5.06 μm, manufactured by Toshima Manufacturing Co., Ltd.) (9.0 g), PVdf (0.3 g) as a binder, dipentaerythritol hexaacrylate (manufactured by Shin-Nakamura Chemical Co., Ltd., trade name "NK ESTER A-DPH") (0.1 g), and toluene (15.0 g) as a dispersion medium were injected thereinto. After that, the container was set in a planetary ball mill P-7 (trade name) manufactured by Fritsch Japan Co., Ltd., the components were continuously stirred at a temperature of 25° C. and a rotation speed of 300 rpm for two hours, thereby manufacturing a solid electrolyte composition (K-1).

(2) Manufacturing of Solid Electrolyte Composition (K-2)

180 zirconia beads having a diameter of 5 mm were injected into a 45 mL zirconia container (manufactured by Fritsch Japan Co., Ltd.), and the Li—P—S-based glass synthesized above (9.0 g), PVdF (0.3 g) as a binder, dipentaerythritol hexaacrylate (manufactured by Shin-Nakamura Chemical Co. Ltd., trade name "NK ESTER A-DPH") (0.1 g), and heptane (15.0 g) as a dispersion medium were injected thereinto. After that, the container was set in a planetary ball mill P-7 (trade name) manufactured by Fritsch Japan Co., Ltd., the components were continuously stirred at a temperature of 25° C. and a rotation speed of 300 rpm for two hours, thereby manufacturing a solid electrolyte composition (K-2).

TABLE 4

| Electrolytic polymerizable compound | | Molecular | Melting | Boiling |
|---|---|---|---|---|
| No. | Compound name | weight | point (° C.) | point (° C.) |
| A-1 | Dipentaerythritol hexaacrylate | 578 | −32 | >350 |
| A-2 | Pentaerythritol tetraacrylate | 352 | 30 | >350 |
| A-3 | p-Divinylbenzene | 130 | 31 | 220 |
| A-4 | Divinyl adipate | 198 | 28 | 261 |
| A-5 | Diallyl phthalate | 246 | −70 | 305 |
| A-6 | 10,12-pentacosadiynoic acid | 375 | 63 | >350 |
| A-7 | Diethylene glycol bis(2-propynyl)ether | 182 | −45 | 260 |
| A-8 | 1-Benzylpyrrole | 157 | 15 | 290 |
| A-9 | 3,5-Dimethylaniline | 121 | 8 | 220 |
| A-10 | 1,6-Diaminopyrene | 232 | 230 | >350 |
| A-11 | 2,2-Bis(3-aminophenyl)hexafluoropropane | 334 | 86 | >350 |
| A-12 | 2,2-Bis(3-amino-4-hydroxyphenyl)hexafluoropropane | 336 | 160 | >350 |
| A-13 | 3,3'-Dihexyl-2,2'-bithiophene | 334 | 20 | >350 |
| A-14 | Exemplary Compound 40 synthesized above | 296 | −15 | >350 |
| A-15 | Exemplary Compound 44 synthesized above | 537 | 121 | >350 |

Synthesis of Sulfide-Based Inorganic Solid Electrolyte (Li—P—S-Base Glass)

The sulfide solid electrolyte of the present invention was synthesized with reference to a non-patent document of T. Ohtomo, A. Hayashi, M. Tatsumisago, Y. Tsuchida, S. Hama, K. Kawamoto, Journal of Power Sources, 233, (2013), pp. 231 to 235 and A. Hayashi, S. Hama, H. Morimoto, M. Tatsumisago, T. Minami, Chem. Lett., (2001), pp. 872 and 873.

Specifically, in a globe box under an argon atmosphere (dew point: −70° C.), lithium sulfide ($Li_2S$, manufactured by Aldrich-Sigma, Co. LLC. Purity: >99.98%) (2.42 g) and diphosphorus pentasulfide ($P_2S_5$, manufactured by Aldrich-Sigma, Co. LLC. Purity: >99%) (3.90 g) were respectively weighed, injected into an agate mortar, and mixed using an agate muddler for five minutes. Meanwhile, the molar ratio between $Li_2S$ and $P_2S_5$ was set to 75:25. The components were mixed together for five minutes on the agate mortar using an agate muddler.

66 zirconia beads having a diameter of 5 mm were injected into a 45 mL zirconia container (manufactured by (3) Manufacturing of Solid Electrolyte Compositions (K-3) to (K-10) and (HK-1)

Solid electrolyte compositions (K-3) to (K-10) and (HK-1) were manufactured using the same method as for the solid electrolyte compositions (K-1) and (K-2) except for the fact that the constitutions were changed as shown in Table 5 below.

The constitutions of the solid electrolyte compositions are summarized in Table 5 below.

Here, the solid electrolyte compositions (K-1) to (K-10) are the solid electrolyte composition of the present invention, and the solid electrolyte composition (HK-1) is a comparative solid electrolyte composition.

Meanwhile, "-" indicates that the corresponding component was not used or, accordingly, the content of the component was 0 parts by mass.

TABLE 5

| Solid | Electrolytic polymerizable compound | | Solid electrolyte | | Binder | | Dispersion medium | |
|---|---|---|---|---|---|---|---|---|
| electrolyte composition | Kind | Parts by mass | Kind | Parts by mass | Kind | Parts by mass | Kind | Parts by mass |
| K-1 | A-1 | 0.1 | LLZ | 9.0 | PVdF | 0.3 | Toluene | 5.0 |
| K-2 | A-1 | 0.1 | Li—P—S | 9.0 | PVdF | 0.3 | Heptane | 5.0 |
| K-3 | A-3 | 0.1 | LLZ | 9.0 | SBR | 0.3 | Toluene | 5.0 |
| K-4 | A-4 | 0.1 | Li—P—S | 9.0 | SBR | 0.3 | Heptane | 5.0 |
| K-5 | A-5 | 0.1 | Li—P—S | 9.0 | PVdF | 0.1 | Octane | 5.0 |
| K-6 | A-6 | 0.1 | Li—P—S | 9.0 | PVdF | 0.1 | Octane | 5.0 |
| K-7 | A-8 | 0.5 | Li—P—S | 9.0 | PVdF-HFP | 0.3 | Toluene | 5.0 |
| K-8 | A-9 | 0.5 | Li—P—S | 9.0 | PVdF-HFP | 0.3 | Toluene | 5.0 |
| K-9 | A-11 | 0.5 | Li—P—S | 9.0 | — | — | Heptane | 5.0 |
| K-10 | A-13 | 0.5 | Li—P—S | 9.0 | — | — | Heptane | 5.0 |
| HK-1 | — | — | Li—P—S | 9.0 | PVdF-HFP | 0.3 | Heptane | 5.0 |

<Note in TABLE 5>

LLZ: $Li_7La_3Zr_2O_{12}$ (lithium lanthanum zirconate, average particle diameter: 5.06 μm, manufactured by Toshima Manufacturing Co., Ltd.)

Li—P—S: Li—P—S-based glass synthesized above

PVdF: Polyvinylene difluoride

SBR: Styrene butadiene rubber

PVdF-HFP: Polyvinylene difluoride-hexafluoropropyl copolymer (the molar ratio of PVdF:HFP is 90:10)

(Measurement of Average Particle Diameter of Inorganic Solid Electrolyte Particles)

The average particle diameter of the inorganic solid electrolyte particles was measured in the following order. Inorganic particles were dispersed using water (heptane in a case in which a substance that was unstable in water was dispersed), thereby preparing 1% by mass of a dispersion liquid. The volume-average particle diameter of the inorganic solid electrolyte particles was measured using this dispersion liquid specimen and a "laser diffraction/scattering-type particle size distribution measurement instrument LA-920" (trade name, manufactured by Horiba Ltd.).

Manufacturing of Composition for Secondary Battery Positive Electrode (1) Manufacturing of Composition for Positive Electrode (U-1)

180 zirconia beads having a diameter of 5 mm were injected into a 45 mL zirconia container (manufactured by Fritsch Japan Co., Ltd.), and an inorganic solid electrolyte LLZ ($Li_7La_3Zr_2O_{12}$, lithium lanthanum zirconate, average particle diameter: 5.06 μm, manufactured by Toshima Manufacturing Co., Ltd.) (2.7 g), PVdF (0.3 g) as a binder, dipentaerythritol hexaacrylate (manufactured by Shin-Nakamura Chemical Co., Ltd., trade name "NK ESTER A-TMMT") (0.5 g), and toluene (12.3 as a dispersion medium were injected thereinto. After that, the container was set in a planetary ball mill P-7 (trade name) manufactured by Fritsch Japan Co., Ltd., the components were continuously dispersed mechanically at a temperature of 25° C. and a rotation speed of 300 rpm for two hours, then, LCO ($LiCoO_2$, lithium cobalt oxide, manufactured by Nippon Chemical Industrial Co., Ltd.) (7.0 g) was injected into the container as an active material, similarly, the container was set in a planetary ball mill P-7 (trade name), and the components were continuously mixed together at a temperature of 25° C. and a rotation speed of 100 rpm for 15 minutes, thereby manufacturing a composition for a positive electrode (U-1).

(2) Manufacturing of Composition for Positive Electrode (U-2)

180 zirconia beads having a diameter of 5 mm were injected into a 45 mL zirconia container (manufactured by Fritsch Japan Co., Ltd.), and the Li—P—S-based glass synthesized above (2.7 g), PVdF (0.3 g) as a binder, dipentaerythritol hexaacrylate (manufactured by Shin-Nakamura Chemical Co Ltd., trade name "NK ESTER A-TMMT") (0.5 g), and heptane (12.3 g) as a dispersion medium were injected thereinto. After that, the container was set in a planetary ball mill P-7 (trade name) manufactured by Fritsch Japan Co., Ltd., the components were continuously mixed at a temperature of 25° C. and a rotation speed of 300 rpm for two hours, then, NMC ($Li(Ni_{1/3}Mn_{1/3}Co_{1/3})O_2$ nickel, manganese, lithium cobalt oxide, manufactured by Nippon Chemical Industrial Co., Ltd.) (7.0 g) was injected into the container as an active material, similarly, the container was set in a planetary ball mill P-7 (trade name), and the components were continuously mixed together at a temperature of 25° C. and a rotation speed of 200 rpm for 15 minutes, thereby manufacturing a composition for a positive electrode (U-2).

(3) Manufacturing of Compositions for Positive Electrode (U-3) to (U-10) and (HU-1)

Compositions for the positive electrode (U-3) to (U-10) and (HU-1) were manufactured using the same method as for the compositions for the positive electrode (U-1) and (U-2) except for the fact that the constitutions were changed as shown in Table 6 below.

The constitutions of the compositions for the positive electrode are summarized in Table 6 below.

Here, the compositions for the positive electrode (U-1) to (U-10) are the composition for the positive electrode of the present invention, and the composition for the positive electrode (HU-1) is a comparative composition for the positive electrode.

Meanwhile, "-" indicates that the corresponding component was not used or, accordingly, the content of the component was 0 parts by mass.

TABLE 6

| Composition | Electrolytic polymerizable compound | | Solid electrolyte | | Positive electrode active material | | Binder | | Dispersion medium | |
|---|---|---|---|---|---|---|---|---|---|---|
| for positive electrode | Kind | Parts by mass | Kind | Parts by mass | Kind | Parts by mass | Kind | Parts by mass | Kind | Parts by mass |
| U-1 | A-2 | 0.5 | LLZ | 2.7 | LCO | 7.0 | PVdF | 0.3 | Toluene | 12.3 |
| U-2 | A-2 | 0.5 | Li—P—S | 2.7 | NMC | 7.0 | PVdF | 0.3 | Heptane | 12.3 |
| U-3 | A-4 | 0.5 | LLZ | 2.7 | LCO | 7.0 | SBR | 0.3 | Toluene | 12.3 |
| U-4 | A-4 | 0.5 | Li—P—S | 2.7 | NMC | 7.0 | SBR | 0.3 | Heptane | 12.3 |
| U-5 | A-7 | 0.5 | Li—P—S | 2.7 | LCO | 7.0 | PVdF | 0.1 | Octane | 12.3 |
| U-6 | A-8 | 0.5 | Li—P—S | 2.7 | NMC | 7.0 | PVdF | 0.1 | Octane | 12.3 |
| U-7 | A-11 | 0.5 | Li—P—S | 2.7 | NMC | 7.0 | PVdF-HFP | 0.3 | Toluene | 12.3 |
| U-8 | A-12 | 0.5 | Li—P—S | 2.7 | NMC | 7.0 | PVdF-HFP | 0.3 | Toluene | 12.3 |
| U-9 | A-13 | 0.8 | Li—P—S | 2.7 | NMC | 7.0 | — | — | Heptane | 12.3 |
| U-10 | A-14 | 0.8 | Li—P—S | 2.7 | NMC | 7.0 | — | — | Heptane | 12.3 |
| HU-1 | — | — | Li—P—S | 2.7 | NMC | 7.0 | PVdF-HFP | 0.3 | Heptane | 12.3 |

Meanwhile, to the composition for a positive electrode U-10, in addition to the composition shown in TABLE 6, an electrolytic polymerization initiator (triphenylsulfonium iodide (manufactured by Tokyo Chemical Industry Co., Ltd)) (0.01 parts by mass) was added.
<Note in TABLE 6>

LLZ: $Li_7La_3Zr_2O_{12}$ lithium lanthanum zirconate (average particle diameter: 5.06 μm, manufactured by Toshima Manufacturing Co., Ltd.)

Li—P—S: Li—P—S-based glass synthesized above

LCO: $LiCoO_2$ lithium cobalt oxide

NMC: $Li(Ni_{1/3}Mn_{1/3}Co_{1/3})O_2$ nickel, manganese, lithium cobalt oxide

PVdF: Polyvinylene difluoride

SBR: Styrene butadiene rubber

PVdF-HFP: Polyvinylene difluoride-hexafluoropropyl copolymer (the molar ratio of PVdF:HFP is 90:10)

Meanwhile, to the composition for a positive electrode U-10, in addition to the composition shown in Table 6, an electrolytic polymerization initiator (triphenylsulfonium iodide (manufactured by Tokyo Chemical Industry Co., Ltd.)) (0.01 parts by mass) was added.

Preparation of Composition for Secondary Battery Negative Electrode (1) Manufacturing of Composition for Negative Electrode (S-1)

180 zirconia beads having a diameter of 5 mm were injected into a 45 mL zirconia container (manufactured by Fritsch Japan Co., Ltd.), and an inorganic solid electrolyte LLZ ($Li_7La_3Zr_2O_{12}$, lithium lanthanum zirconate, average particle diameter: 5.06 μm, manufactured by Toshima Manufacturing Co., Ltd.) (5.0 g), PVdF (0.3 g) as a binder, dipentaerythritol hexaacrylate (manufactured by Shin-Nakamura Chemical Co Ltd., trade name "NK ESTER A-DPH") (0.5 g), and toluene (12.3 g) as a dispersion medium were injected thereinto. The container was set in a planetary ball mill P-7 (trade name) manufactured by Fritsch Japan Co., Ltd., the components were continuously dispersed mechanically at a temperature of 25° C. and a rotation speed of 300 rpm for two hours, then, acetylene black (7.0 g) was injected into the container, similarly, the container was set in a planetary ball mill P-7 (trade name) manufactured by Fritsch Japan Co., Ltd., and the components were continuously mixed together at a temperature of 25° C. and a rotation speed of 100 rpm for 15 minutes, thereby manufacturing a composition for a negative electrode (S-1).

(2) Manufacturing of Composition for Negative Electrode (S-2)

180 zirconia beads having a diameter of 5 mm were injected into a 45 mL zirconia container (manufactured by Fritsch Japan Co., Ltd.), and the Li—P—S-based glass synthesized above (5.0 g), PVdF (0.3 g) as a binder, dipentaerythritol hexaacrylate (manufactured by Shin-Nakamura Chemical Co., Ltd., trade name "NK ESTER A-DPH") (0.5 g), and heptane (12.3 g) as a dispersion medium were injected thereinto. The container was set in a planetary ball mill P-7 (trade name) manufactured by Fritsch Japan Co., Ltd., the components were continuously mixed at a temperature of 25° C. and a rotation speed of 300 rpm for two hours, then, acetylene black (7.0 g) was injected into the container, similarly, the container was set in a planetary ball mill P-7 (trade name) manufactured by Fritsch Japan Co., Ltd., and the components were continuously mixed together at a temperature of 25° C. and a rotation speed of 200 rpm for 15 minutes, thereby manufacturing a composition for a negative electrode (S-2).

(3) Manufacturing of Compositions for Negative Electrode (S-3) to (S-10) and (HS-1)

Compositions for the negative electrode (S-3) to (S-10) and (HS-1) were manufactured using the same method as for the compositions for the negative electrode (S-1) and (S-2) except for the fact that the constitutions were changed as shown in Table 7 below.

The constitutions of the compositions for the negative electrode are summarized in Table 7 below.

Here, the compositions for the negative electrode (S-1) to (S-10) are the composition for the positive electrode of the present invention, and the composition for the negative electrode (HS-1) is a comparative composition for the positive electrode.

Meanwhile, "-" indicates that the corresponding component was not used or, accordingly, the content of the component was 0 parts by mass.

TABLE 7

| Composition for negative electrode | Electrolytic polymerizable compound Kind | Parts by mass | Solid electrolyte Kind | Parts by mass | Negative electrode active material Kind | Parts by mass | Binder Kind | Parts by mass | Dispersion medium Kind | Parts by mass |
|---|---|---|---|---|---|---|---|---|---|---|
| S-1 | A-1 | 0.5 | LLZ | 5.0 | AB | 7.0 | PVdF | 0.3 | Toluene | 12.3 |
| S-2 | A-1 | 0.5 | Li—P—S | 5.0 | AB | 7.0 | PVdF | 0.3 | Heptane | 12.3 |
| S-3 | A-4 | 0.5 | LLZ | 5.0 | AB | 7.0 | SBR | 0.3 | Toluene | 12.3 |
| S-4 | A-4 | 0.5 | Li—P—S | 5.0 | AB | 7.0 | SBR | 0.3 | Heptane | 12.3 |
| S-5 | A-5 | 0.5 | Li—P—S | 5.0 | AB | 7 0 | PVdF | 0.1 | Heptane | 12.3 |
| S-6 | A-7 | 0.5 | Li—P—S | 5.0 | AB | 7.0 | PVdF | 0.1 | Heptane | 12.3 |
| S-7 | A-10 | 0.5 | Li—P—S | 5.0 | AB | 7.0 | PVdF-HFP | 0.3 | Heptane | 12.3 |
| S-8 | A-12 | 0.5 | Li—P—S | 5.0 | AB | 7.0 | PVdF-HFP | 0.3 | Heptane | 12.3 |
| S-9 | A-13 | 0.8 | Li—P—S | 5.0 | AB | 7.0 | — | — | Heptane | 12.3 |
| S-10 | A-14 | 0.8 | Li—P—S | 5.0 | AB | 7.0 | — | — | Heptane | 12.3 |
| S-11 | A-15 | 0.5 | Li—P—S | 5.0 | AB | 7.0 | PVdF-HFP | 0.1 | Heptane | 12.3 |
| HS-1 | — | — | Li—P—S | 5.0 | AB | 7.0 | PVdF-HFP | 0.3 | Heptane | 12.3 |

Meanwhile, to the coposition for a negative electrode S-10, in addition to the composition shown in TABLE 7, an electrolytic polymerization initiator (diphenyliodonium iodide (manufactured by Tokyo Chemical Industry Co., Ltd)) (0.01 parts by mass) was added.

<Note in TABLE 7>

LLZ: $Li_7La_3Zr_2O_{12}$ (lithium lanthanum zirconate, average particle diameter: 5.06 μm, manufactured by Toshima Manufacturing Co., Ltd.)

Li—P—S: Li—P—S-based glass synthesized above

PVdF: Polyvinylene difluoride

SBR: Styrene butadiene rubber

PVdF-HFP: Polyvinylene difluoride-hexafluoropropyl copolymer (the molar ratio of PVdF:HFP is 90:10)

AB: Acetylene black

Manufacturing of Positive Electrode Sheet for Secondary Battery

The composition for a secondary battery positive electrode manufactured above was applied onto a 20 μm-thick aluminum foil using an applicator capable of adjusting the clearance, heated at 80° C. for one hour, then, furthermore, heated at 110° C. for one hour, and a coating solvent was dried. After that, the composition was heated and pressurized using a heat press machine so as to obtain an arbitrary density, thereby manufacturing a positive electrode sheet for a secondary battery.

Manufacturing of Electrode Sheet for Secondary Battery

The solid electrolyte composition manufactured above was applied onto positive electrode sheet for a secondary battery manufactured above using an applicator capable of adjusting the clearance, heated at 80° C. for one hour, and then, furthermore, heated at 110° C. for one hour. After that, the composition for a secondary battery negative electrode manufactured above was further applied onto the dried solid electrolyte composition, heated at 80° C. for one hour, and then, furthermore, heated at 110° C. for one hour. A 20 μm-thick copper foil was placed on the negative electrode layer, heated and pressurized using a heat press machine so as to obtain an arbitrary density, thereby manufacturing Test Nos. 101 to 110 and c11 of the electrode sheets for a secondary battery shown in Table 8. These electrode sheets for a secondary battery have the constitution of FIG. 1. The positive electrode layer, the negative electrode layer, and the solid electrolyte layer respectively have film thicknesses shown in Table 8 below.

Manufacturing of all Solid State Secondary Battery

Figure 2:
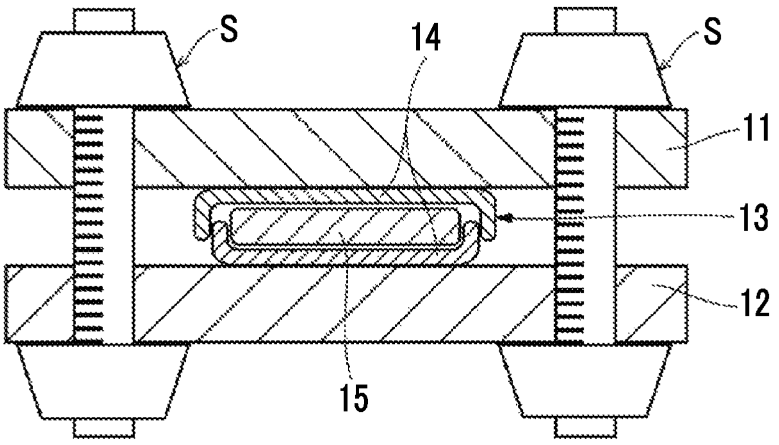
FIG. 2 is a vertical cross-sectional view schematically illustrating a testing device used in examples.

A disc-shaped piece having a diameter of 14.5 mm was cut out from the electrode sheet for a secondary battery 15 manufactured above, put into a 2032-type stainless steel coin case 14 into which a spacer and a washer were combined, and a confining pressure (a screw-fastening pressure: 8 N) was applied from the outside of the coin case 14 using a testing body illustrated in FIG. 2, thereby manufacturing all solid state secondary batteries of Test Nos. 101 to 110 and c11 shown in Table 8 below. Meanwhile, in FIG. 2, reference sign 11 indicates an upper portion-supporting plate, reference sign 12 indicates a lower portion-supporting plate, and reference sign S indicates a spring.

On the all solid state secondary batteries of Test Nos. 101 to 110 and c11 manufactured above, the following evaluations were carried out.

<Evaluation of Battery Voltage>

The battery voltage of the all solid state secondary battery manufactured above was measured using a charging and discharging evaluation device "TOSCAT-3000" (trade name: manufactured by Toyo System Co., Ltd.).

Charging was carried out at a current density of 2 $A/m^2$ until the battery voltage reached 4.2 V, and, after the battery voltage reached 4.2 V, constant-voltage charging was carried out until the current density reached less than 0.2 $A/m^2$. Discharging was carried out at a current density of 2 $A/m^2$ until the battery voltage reached 3.0 V. This charging and discharging was repeated, the battery voltage after 5 mAh/g discharging in the third cycle was read and was evaluated using the following standards. Meanwhile, the evaluation ranking of "C" or higher are the pass levels of the present testing.

(Evaluation Standards)

A: 4.0 V or more

B: 3.9 V or more and less than 4.0 V

C: 3.8 V or more and less than 3.9 V

D: Less than 3.8 V

<Evaluation of Cycle Characteristics>

The cycle characteristics of the all solid state secondary battery manufactured above were measured using a charging and discharging evaluation device "TOSCAT-3000" (trade name: manufactured by Toyo System Co., Ltd.).

Charging and discharging was carried out under the same conditions as those in the battery voltage evaluation. The discharge capacity in the third cycle was considered as 100, and the cycle characteristics were evaluated using the following standards from the number of times of the cycle when the discharging capacity reached less than 80. Meanwhile, the evaluation ranking of "B" or higher are the pass levels of the present testing.

(Evaluation Standards)

A: 50 times or more

B: 40 times or more and less than 50 times

C: 30 times or more and less than 40 times

D: Less than 30 times

The constitutions and the evaluation results of the electrode sheets for a secondary battery and the all solid state secondary batteries are summarized in Table 8 below.

Here, Test Nos. 101 to 110 are electrode sheets for a secondary battery and all solid state secondary batteries in which the electrolytic polymerizable compound being used in the present invention was used, and Test No. c11 are electrode sheets for a secondary battery and all solid state secondary batteries in which the comparative polymer was used.

Meanwhile, in Table 8 below, battery voltage is abbreviated as voltage.

What is claimed is:

1. An all solid state secondary battery comprising:

a positive electrode active material layer;

an inorganic solid electrolyte layer; and a negative electrode active material layer in this order, wherein at least one layer of the positive electrode active material layer, the inorganic solid electrolyte layer, or the negative electrode active material layer includes an electrolytic polymerizable compound and an inorganic solid electrolyte, the electrolytic polymerizable compound is an electrolytic polymerizable compound having a molecular weight of less than 1,000 which is represented by any one of Formulae (1) to (5) below, and an inorganic solid electrolyte contains a metal belonging to Group I or II of the periodic table and has an ion conductivity of the metal being contained,

TABLE 8

| | Positive electrode layer | | Solid electrolyte layer | | Negative electrode layer | | Battery evaluation | |
|---|---|---|---|---|---|---|---|---|
| Test No. | Composition | Film thickness (μm) | Composition | Film thickness (μm) | Composition | Film thickness (μm) | Voltage | Cycle characteristics |
| 101 | U-2 | 80 | K-2 | 30 | S-2 | 80 | C | B |
| 102 | U-4 | 84 | K-4 | 34 | S-4 | 82 | C | B |
| 103 | U-5 | 87 | K-5 | 32 | S-5 | 83 | B | B |
| 104 | U-6 | 72 | K-6 | 33 | S-6 | 85 | B | B |
| 105 | U-7 | 89 | K-7 | 34 | S-7 | 72 | A | B |
| 106 | U-8 | 76 | K-8 | 33 | S-8 | 81 | B | A |
| 107 | U-9 | 81 | K-9 | 32 | S-9 | 86 | A | A |
| 108 | U-10 | 83 | K-10 | 33 | S-10 | 87 | A | A |
| 109 | U-9 | 86 | K-5 | 32 | S-11 | 78 | A | A |
| 110 | U-9 | 75 | K-5 | 31 | S-5 | 79 | A | A |
| c11 | HU-1 | 82 | HK-1 | 30 | HS-1 | 80 | D | D |

The all solid state secondary battery of the present invention containing the electrolytic polymerizable compound being used in the present invention in the positive electrode active material layer, the negative electrode active material layer, and the inorganic solid electrolyte layer exhibited a high ion conductivity (high battery voltage) and high cycle characteristics.

The present invention has been described together with the embodiment; however, unless particularly specified, the present inventors do not intend to limit the present invention in any detailed portion of the description and consider that the present invention is supposed to be broadly interpreted within the concept and scope of the present invention described in the claims.

EXPLANATION OF REFERENCES

1: negative electrode collector
2: negative electrode active material layer
3: solid electrolyte layer
4: positive electrode active material layer
5: positive electrode collector
6: operation portion
10: all solid state secondary battery
11: upper portion-supporting plate
12: lower portion-supporting plate
13: coin battery
14: coin case
15: electrode sheet for secondary battery
S: screw

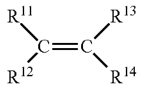

(1)

$$R^{21}—C\equiv C—R^{22}$$

(2)

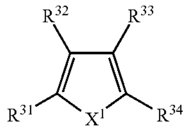

(3)

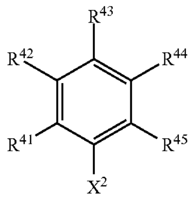

(4)

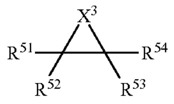

(5)

in Formulae (1) to (5), $R^{11}$ to $R^{14}$, $R^{21}$, $R^{22}$, $R^{31}$ to $R^{34}$, $R^{41}$ to $R^{45}$, and $R^{51}$ to $R^{54}$ each independently represent a hydrogen atom, an alkyl group, an alkenyl group, an alkynyl group, an aryl group, a heteroaryl group, an alkylcarbonyl group, an alkylcarbonyloxy group, an alkyloxycarbonyl group, a carbamoyl group, an acylamino group, an alkoxy group, a formyl group, an aryloxy group, a cyano group, a carboxyl group, a hydroxyl group, a mercapto group, an amino group, or a halogen atom; $X^1$ represents an oxygen atom, a sulfur atom, or $NR^{35}$; $R^{35}$ represents a hydrogen atom, an alkyl group, or an aryl group; $X^2$ represents $OR^{46}$, $SR^{47}$, or $NR^{48}R^{49}$; $R^{46}$ to $R^{49}$ each independently represent a hydrogen atom, an alkyl group, or an aryl group; $X^3$ represents a methylene group or an ethylene group, $R^{11}$ and $R^{12}$, $R^{13}$ and $R^{14}$, $R^1$ and $R^{13}$, $R^{12}$ and $R^{14}$, $R^{21}$ and $R^{22}$, $R^{31}$ and $R^{32}$, $R^{32}$ and $R^{33}$, $R^{33}$ and $R^{34}$, $X^1$ and $R^{31}$, $X^1$ and $R^{34}$, $R^{41}$ and $R^{42}$, $R^{42}$ and $R^{43}$, $R^{43}$ and $R^{44}$, $R^{44}$ and $R^{45}$, $X^2$ and $R^{41}$, $X^2$ and $R^{45}$, and $X^3$ and $R^{51}$ may form a ring together through a single bond or a linking group; and, substituents of $R^{11}$ to $R^{14}$, $R^{21}$, $R^{22}$, $R^{31}$ to $R^{35}$, $R^{41}$ to $R^{49}$, and $R^{51}$ to $R^{54}$ may further have a substituent.

2. The all solid state secondary battery according to claim 1, wherein the electrolytic polymerizable compound is represented by any one of Formulae (1a) to (5a) below, (1a)

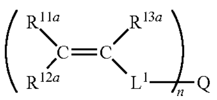

(2a)

$(R^{21a}-C\equiv C-L^1)_n Q$ (3a)

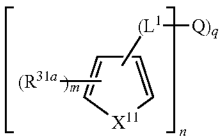

(4a)

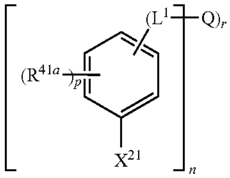

(5a)

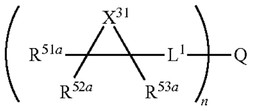

in Formulae (1a) to (5a), $R^{11a}$ to $R^{13a}$, $R^{21a}$, $R^{31a}$, $R^{41a}$ and $R^{51a}$ to $R^{53a}$ each independently represent a hydrogen atom, an alkyl group, an alkenyl group, an alkynyl group, an aryl group, a heteroaryl group, an alkylcarbonyl group, an alkylcarbonyloxy group, an alkyloxycarbonyl group, a carbamoyl group, an acylamino group, an alkoxy group, a formyl group, an aryloxy group, a cyano group, a carboxyl group, a hydroxyl group, a mercapto group, an amino group, or a halogen atom; $X^{11}$ represents an oxygen atom, a sulfur atom, or $NR^{35a}$; $R^{35a}$ represents a hydrogen atom, an alkyl group, or -$L^1$-Q; $X^{21}$ represents $OR^{46a}$, $SR^{47a}$, or $N(R^{48a})(R^{49a})$; $R^{46a}$ to $R^{49a}$ each independently represent a hydrogen atom, an alkyl group, or -$L^1$-Q; $X^{31}$ represents a methylene group or an ethylene group;

$R^{11a}$ and $R^{12a}$, $R^{11a}$ and $R^{13a}$, $X^{11}$ and $R^{31a}$, $X^{21}$ and $R^{41a}$, and $X^{31}$ and $R^{51a}$ may form a ring together through a single bond or a linking group; in a case in which there are a plurality of $R^{31a}$'s and $R^{41a}$'s, $R^{31a}$'s and $R^{41a}$'s may form a ring together through a single bond or a linking group; $L^1$ represents a single bond or a divalent linking group, and Q represents a single bond or a di- to octavalent organic group; n represents an integer of 2 to 8, m represents an integer of 0 to 3, p represents an integer of 0 to 4, q represents 0 or 1, and r represents 0 or 1; here, in the case of q=0, $X^{11}$ is $NR^{35a}$ and $R^{35a}$ is -$L^1$-Q, and, in the case of r=0, $R^{46a}$, $R^{47a}$, and $R^{48a}$ or $R^{49a}$ is -$L^1$-Q.

3. The all solid state secondary battery according to claim 1, wherein the electrolytic polymerizable compound represented by Formula (1) is a (meth)acrylic acid compound, a (meth)acrylamide compound, a styrene compound, or a vinyl compound, the electrolytic polymerizable compound represented by Formula (2) is an acetylene compound, the electrolytic polymerizable compound represented by Formula (3) is a thiophene compound, a furan compound, or a pyrrole compound, the electrolytic polymerizable compound represented by Formula (4) is an aniline compound, a thiophenol compound, or a phenol compound, and the electrolytic polymerizable compound represented by Formula (5) is a cyclopropane compound or a cyclobutane compound.

4. The all solid state secondary battery according to claim 3, wherein the electrolytic polymerizable compound represented by Formulae (1) to (5) is an electrolytic polymerizable compound represented by Formulae (1a) to (5a) below, (1a)

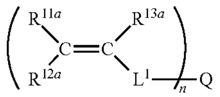

(2a)

$(R^{21a}-C\equiv C-L^1)_n Q$ (3a)

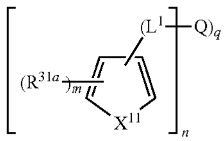

(4a)

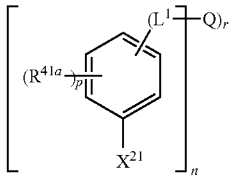

(5a)

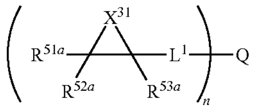

in Formulae (1a) to (5a), $R^{11a}$ to $R^{13a}$, $R^{21a}$, $R^{31a}$, $R^{41a}$ and $R^{51a}$ to $R^{53a}$ each independently represent a hydrogen atom, an alkyl group, an alkenyl group, an alkynyl group, an aryl group, a heteroaryl group, an alkylcarbonyl group, an alkylcarbonyloxy group, an alkyloxycarbonyl group, a carbamoyl group, an acylamino group, an alkoxy group, a formyl group, an aryloxy group, a cyano group, a carboxyl group, a hydroxyl group, a mercapto group, an amino group, or a halogen atom; $X^{11}$ represents an oxygen atom, a sulfur atom, or $NR^{35a}$; $R^{35a}$ represents a hydrogen atom, an alkyl group, or $-L^1-Q$; $X^{21}$ represents $OR^{46a}$, $SR^{47a}$, or $N(R^{48a})(R^{49a})$; $R^{46a}$ to $R^{49a}$ each independently represent a hydrogen atom, an alkyl group, or $-L^1-Q$; $X^{31}$ represents a methylene group or an ethylene group; $R^{11a}$ and $R^{12a}$, $R^{11a}$ and $R^{13a}$, $X^{11}$ and $R^{31a}$, $X^{21}$ and $R^{41a}$, and $X^{31}$ and $R^{51a}$ may form a ring together through a single bond or a linking group; in a case in which there are a plurality of $R^{31a}$'s and $R^{41a}$'s, $R^{31a}$'s and $R^{41a}$'s may form a ring together through a single bond or a linking group; $L^1$ represents a single bond or a divalent linking group, and Q represents a single bond or a di- to octavalent organic group; n represents an integer of 2 to 8, m represents an integer of 0 to 3, p represents an integer of 0 to 4, q represents 0 or 1, and r represents 0 or 1; here, in the case of q=0, $X^{11}$ is $NR^{35a}$ and $R^{35a}$ is $-L^1-Q$, and, in the case of r=0, $R^{46a}$, $R^{47a}$, and $R^{48a}$ or $R^{49a}$ is $-L^1-Q$.

5. The all solid state secondary battery according to claim 1, wherein a molecular weight of the electrolytic polymerizable compound is 300 or more and less than 1,000.

6. The all solid state secondary battery according to claim 1, wherein a melting point of the electrolytic polymerizable compound at normal pressure is lower than 80° C., and a boiling point of the electrolytic polymerizable compound at normal pressure is 200° C. or higher.

7. The all solid state secondary battery according to claim 1, wherein at least one layer of the positive electrode active material layer, the negative electrode active material layer, or the inorganic solid electrolyte layer further contains a polymerization initiator.

8. The all solid state secondary battery according to claim 7, wherein the polymerization initiator is an onium salt compound.

9. The all solid state secondary battery according to claim 1, wherein at least one layer of the positive electrode active material layer, the negative electrode active material layer, or the inorganic solid electrolyte layer further contains a binder.

10. The all solid state secondary battery according to claim 1, wherein the inorganic solid electrolyte is a sulfide-based inorganic solid electrolyte.

11. The all solid state secondary battery according to claim 1, wherein the inorganic solid electrolyte is an oxide-based inorganic solid electrolyte.

12. The all solid state secondary battery according to claim 11, wherein the inorganic solid electrolyte is selected from compounds of the following formulae, $Li_{xa}La_{ya}TiO_3$ xa=0.3 to 0.7, ya=0.3 to 0.7

$Li_7La_3Zr_2O_{12}$ $Li_{3.5}Zn_{0.25}GeO_4$ $LiTi_2P_3O_{12}$ $Li_{1+xb+yb}(Al,Ga)_{xb}(Ti,Ge)_{2-xb}Si_{yb}P_{3-yb}O_{12}$ $0 \le xb \le 1$, $0 \le yb \le 1$ $Li_3PO_4$

LiPON

LiPOD

D is at least one selected from Ti, V, Cr, Mn, Fe, Co, Ni, Cu, Zr, Nb, Mo, Ru, Ag, Ta, W, Pt, or Au;

LiAON

A is at least one selected from Si, B, Ge, Al, C, or Ga.

13. A solid electrolyte composition being used for an all solid state secondary battery, comprising:

an electrolytic polymerizable compound having a molecular weight of less than 1,000 which is represented by any one of Formulae (1) to (5) below; and an inorganic solid electrolyte containing a metal belonging to Group I or II of the periodic table and having an ion conductivity of the metal being contained, (1)

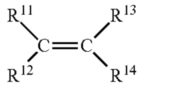

(2)

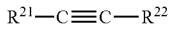

(3)

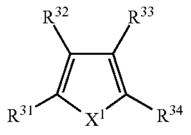

(4)

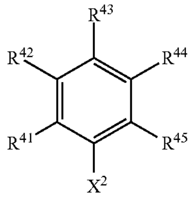

(5)

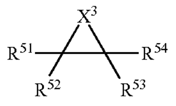

in Formulae (1) to (5), $R^{11}$ to $R^{14}$, $R^{21}$, $R^{22}$, $R^{31}$ to $R^{34}$, $R^{41}$ to $R^{45}$, and $R^{51}$ to $R^{54}$ each independently represent a hydrogen atom, an alkyl group, an alkenyl group, an alkynyl group, an aryl group, a heteroaryl group, an alkylcarbonyl group, an alkylcarbonyloxy group, an alkyloxycarbonyl group, a carbamoyl group, an acylamino group, an alkoxy group, a formyl group, an aryloxy group, a cyano group, a carboxyl group, a hydroxyl group, a mercapto group, an amino group, or a halogen atom; $X^1$ represents an oxygen atom, a sulfur atom, or $NR^{35}$; $R^{35}$ represents a hydrogen atom, an alkyl group, or an aryl group; $X^2$ represents $OR^{46}$, $SR^{47}$, or $NR^{48}R^{49}$; $R^{46}$ to $R^{49}$ each independently represent a hydrogen atom, an alkyl group, or an aryl group; $X^3$ represents a methylene group or an ethylene group, $R^{11}$ and $R^{12}$, $R^{13}$ and $R^{14}$, $R^{11}$ and $R^{13}$, $R^{12}$ and $R^{14}$, $R^{21}$ and $R^{22}$, $R^{31}$ and $R^{32}$, $R^{32}$ and $R^{33}$, $R^{33}$ and $R^{34}$, $X^1$ and $R^{31}$, $X^1$ and $R^{34}$, $R^{41}$ and $R^{42}$, $R^{42}$ and $R^{43}$, $R^{43}$ and $R^{44}$, $R^{44}$ and $R^{45}$, $X^2$ and $R^{41}$, $X^2$ and $R^{45}$, and $X^3$ and $R^{51}$ may form a ring together through a single bond or a linking group; in addition, substituents of $R^1$ to $R^{14}$, $R^{21}$, $R^{22}$, $R^{31}$ to $R^{35}$, $R^{41}$ to $R^{49}$, and $R^{51}$ to $R^{54}$ may further have a substituent, wherein a content of the electrolytic polymerizable compound is 0.1 parts by mass or more and 10 parts by mass or less with respect to 100 parts by mass of the inorganic solid electrolyte.

14. The solid electrolyte composition according to claim 13, wherein the content of the electrolytic polymerizable compound is 0.1 parts by mass or more and 5 parts by mass or less with respect to 100 parts by mass of the inorganic solid electrolyte.

15. An electrode sheet for a battery, comprising a metal foil and an electrolyte film coated thereon, wherein the film was prepared from the composition according to claim 13.

16. A method for manufacturing an electrode sheet for a battery, comprising: a step of applying and driving the solid electrolyte composition according to claim 13 on a metal foil to form a film thereof, and a step of heating and pressurizing the film.

17. A method for manufacturing an all solid state secondary battery comprising: a step of applying a composition serving as a positive electrode material onto a metal foil which is a positive electrode collector, thereby forming a positive electrode active material layer to obtain a positive electrode sheet for a battery; a step of applying the solid electrolyte composition according to claim 13 onto the positive electrode sheet for a battery, thereby forming a solid electrolyte layer; a step of applying a composition serving as a negative electrode material thereon, thereby forming a negative electrode active material layer; and a step of overlying a metal foil for the negative electrode thereon.

18. A method of manufacturing the all solid state secondary battery of claim 1, comprising a step of electrolytic oxidation polymerization or electrolytic reduction polymerization of the electrolytic polymerizable compound by charging or discharging the all solid state secondary battery at least once, wherein the electrolytic polymerizable compound is a compound in which, during the charging and discharging of the all solid state secondary battery, reduction polymerization is initiated and a polymerized body is generated in the negative electrode active material layer or a compound in which, during the charging and discharging of the all solid state secondary battery, oxidation polymerization is initiated and a polymerized body is generated in the positive electrode active material layer.

* * * * *